US006856047B2

(12) United States Patent
Murabayashi et al.

(10) Patent No.: US 6,856,047 B2
(45) Date of Patent: Feb. 15, 2005

(54) POWER SOURCE APPARATUS

(75) Inventors: Haruyasu Murabayashi, Kyoto (JP); Takashi Horie, Kyoto (JP); Masashi Isozumi, Kyoto (JP); Yasuhiro Tsubota, Kyoto (JP); Tsunetoshi Ooba, Kyoto (JP); Hideki Kobori, Kyoto (JP); Takatoshi Ootomo, Kyoto (JP); Katsuya Marumo, Kyoto (JP); Tetsuya Yamamoto, Kyoto (JP)

(73) Assignee: Omron Corporation, Kyoto (JP)

( * ) Notice: Subject to any disclaimer, the term of this patent is extended or adjusted under 35 U.S.C. 154(b) by 90 days.

(21) Appl. No.: 10/149,514
(22) PCT Filed: Oct. 2, 2001
(86) PCT No.: PCT/JP01/08669
§ 371 (c)(1),
(2), (4) Date: Oct. 7, 2002
(87) PCT Pub. No.: WO02/29964
PCT Pub. Date: Apr. 11, 2002

(65) Prior Publication Data
US 2003/0058595 A1 Mar. 27, 2003

(30) Foreign Application Priority Data
Oct. 2, 2000 (JP) ............................. 2000-302346
Oct. 17, 2000 (JP) ............................. 2000-316450
Oct. 17, 2000 (JP) ............................. 2000-316588

(51) Int. Cl.$^7$ ................................................ H02J 7/00
(52) U.S. Cl. ........................ 307/150; 307/18; 307/80
(58) Field of Search .......................... 307/64, 65, 150, 307/147, 151, 43, 80; 323/272, 284, 282, 268; 361/334, 395, 728, 380

(56) References Cited

U.S. PATENT DOCUMENTS 4,194,147 A * 3/1980 Payne et al. ................ 323/284
5,089,937 A * 2/1992 Carrubba et al. ........... 361/732

FOREIGN PATENT DOCUMENTS

| JP | 05-276745 | 10/1993 |
| JP | 09-028079 | 1/1997 |
| JP | 2000-253580 | 9/2000 |

* cited by examiner

Primary Examiner—Rajnikant B. Patel
(74) Attorney, Agent, or Firm—Foley & Lardner LLP

(57) ABSTRACT

A power source apparatus with a saving in wiring, large noise immunity and an additional function is achieved by connecting AC input bus lines (Vin+), (Vin−), DC output bus lines (Vo+), (Vo−) and a current balance signal bus line (CB) for connecting first, second, third power source units 1, 2, 3 through connectors to form a module power source and connecting an additional function unit 4 for adding a predetermined additional function to the module power source using the bus lines to this module power source through a connector.

52 Claims, 45 Drawing Sheets

POWER SOURCE APPARATUS

TECHNICAL FIELD

The present invention relates to a power source apparatus constructed so that a module power source formed by connecting at least one or more power source units is provided and an additional function unit having a predetermined function is added in order to add the predetermined function to this module power source.

BACKGROUND ART

Conventionally, in the case of connecting an additional function apparatus for adding some additional function to a power source apparatus, the power source apparatus has been connected to the additional function apparatus through external wiring. Particularly, the number of wirings is large in connections of the additional function apparatus having plural additional functions and the wiring has become complicated.

For example, in the case of building a power source system having a backup function using a battery, as shown in FIG. 46, it was necessary to externally wire DC output terminals 801A, 801B of a power source apparatus 800 to DC input terminals 811A, 811B of an uninterruptible power supply apparatus 810 which is an additional function apparatus. Incidentally, in the drawing, numeral 309 is a battery and numeral 38 is a load and numeral 37 is an external commercial AC power source.

However, according to the conventional power source apparatus, since this power source apparatus is connected to the additional function apparatus through external wiring, in connections of the additional function apparatus having plural additional functions, the wiring becomes complicated and is not practical and also because of the complicated wiring, it is susceptible to noise and a malfunction tends to occur and commercialization is obstructed.

Also, according to the conventional power source apparatus, as shown in FIG. 46, in the case of building the power source system, it is necessary to externally wire the DC output terminals 801A, 801B of the power source apparatus 800 to the DC input terminals 811A, 811B of the uninterruptible power supply apparatus 810, so that the number of man-hours is taken in this wiring.

The present invention is implemented in view of the above point, and an object of the invention is to provide a power source apparatus, which enables a saving in wiring, and has large noise immunity and an additional function.

Also, another object of the invention is to provide a power source apparatus in which a DC bus line of an uninterruptible power supply unit can be connected to a DC output bus line of each a power source unit in a one-touch manner and the need for wiring between the plural power source units connected in parallel and the uninterruptible power supply unit is eliminated to result in a saving in man-hours by the amount of the wiring.

SUMMARY OF THE INVENTION

In order to achieve the above objects, a power source apparatus of the present invention comprises a module power source formed by connecting at least one or more power source units having bus lines, and is constructed so that an additional function unit for adding a predetermined additional function to the module power source is connected to the module power source by connector connection means.

The bus lines are at least one of an AC input bus line for supplying an AC inputted from the outside to a power source circuit of the power source unit, a DC output bus line for outputting a DC converted by the power source circuit, a first signal bus line used in control means for making output currents of plural power source units uniform, and a second signal bus line used for detecting a state of each the power source unit.

The power source unit is a unit comprising a power source circuit for inputting an AC from, for example, a commercial AC power source and converting this AC into a DC.

The module power source corresponds to a power source capable of obtaining an arbitrary power source capacity according to the number of power source units by connecting at least one or more power source units to, for example, a DIN rail.

Therefore, according to the power source apparatus of the present invention, a power source apparatus with a saving in wiring, large noise immunity and an additional function can be achieved by connecting bus lines for connecting the power source units, that is, the AC input bus line, the DC output bus line and the signal bus line through connectors to form a module power source and connecting the additional function unit to this module power source through a connector to add the additional function unit.

Also, when the additional function unit has an interface with the outside, a signal can be inputted and outputted to an external device using this interface.

Incidentally, the power source unit indicates, for example, a relatively small switching power source and so on. Also, the power source circuit indicates, for example, a separately excited type switching power source circuit and so on. Also, the AC input bus line is connected to an AC input terminal for guiding an external commercial AC to the power source circuit, and is built into the power source unit. Also, the DC output bus line indicates a bus line, which is connected to the output side of the power source circuit and passes a DC converted by this power source circuit. Also, detection of a state of each the power source unit indicates that of input voltage, input current, output voltage, output current, temperature, and so on.

Also, the signal bus line indicates a current balance signal bus line etc. for passing a signal used in control means for making output currents of the respective power source units uniform when plural power source units are connected in parallel. Also, the additional function unit is a rush current prevention unit, a branching unit, an output abnormal unit, an output characteristic improvement unit, and so on.

Also, a power source apparatus of the present invention is constructed so that the additional function unit has a function of inputting an external AC to make a predetermined conversion, and supplies the AC in which the predetermined conversion is made to the power source units using the AC input bus line.

Therefore, according to the power source apparatus of the present invention, after inputting an external AC and making some conversion, the AC after this conversion can be supplied to the power source units using the AC input bus line.

Also, a power source apparatus of the present invention is constructed so that the additional function unit is a rush current prevention unit having a rush current prevention function of preventing a rush current of an external commercial AC power source.

Therefore, according to the power source apparatus of the present invention, since the additional function unit is the rush current prevention unit having the rush current prevention function, a rush current in the whole system of the power source apparatus can be prevented and the same rush current value as that of the case of using one power source apparatus can be achieved and equipment with small surge current immunity can be used.

Also, a power source apparatus of the present invention is constructed so that the additional function unit has a function of making a predetermined conversion to a DC inputted, and inputs the DC using the DC output bus line of the power source units and supplies the DC in which the predetermined conversion is made to a load.

Therefore, according to the power source apparatus of the present invention, after inputting a DC and making some conversion, the DC after this conversion can be supplied to a load using the DC output bus line.

Also, a power source apparatus of the present invention is constructed so that the additional function unit is an output abnormal detection unit having means for producing a signal output or a display output of the result in the case of detecting that at least any one of plural DC outputs are abnormal.

Therefore, according to the power source apparatus of the present invention, since the additional function unit is the output abnormal detection unit comprising a function of detecting output abnormality, a safe state can be ensured.

Also, a power source apparatus of the present invention is constructed so that the additional function unit is a branching unit having a terminal for branching a DC output of the module power source into plural portions to connect a load, a function of disconnecting a supply line of the module power source when an output current flowing through this terminal is detected and also this detected current reaches a setting value, a function of disconnecting the supply line of the module power source when an overvoltage from the module power source is detected, a function of reporting an abnormal state of current or voltage, and a reset function capable of releasing disconnection of the supply line.

Therefore, according to the power source apparatus of the present invention, since the additional function unit is the branching unit comprising plural protection functions and branching functions, by unifying the plural protection functions, troublesome wiring processing is eliminated and a safer branching function can be provided and it can contribute to miniaturization of the whole system.

Also, a power source apparatus of the present invention is constructed so that the additional function unit has a function of making a predetermined conversion to an AC inputted, and inputs an AC using the AC input bus line of one power source unit and also makes a predetermined conversion to this AC and inputs the AC in which this predetermined conversion is made to the AC input bus line of the other power source unit.

Therefore, according to the power source apparatus of the present invention, after making some conversion to an AC inputted using the AC input bus line of one power source unit by the additional function unit, the AC can be supplied to the AC input bus line of the other power source unit.

Also, a power source apparatus of the present invention is constructed so that the additional function unit is a separator having a function of making only a connection between the AC input bus line of one power source unit and the AC input bus line of the other power source unit.

Therefore, according to the power source apparatus of the present invention, since the additional function unit is the separator comprising a function of making only a connection between the AC input bus lines of the two power source units, the power source units having different output voltages can be connected mutually without wiring, and also when the power source units having the different output voltages can be connected and parallel running is performed every the power source units having the different output voltages, connection can be made without mutual wiring. Also, plural power source units having input system wiring of only one place and different output voltages can be driven.

Also, a power source apparatus of the present invention is constructed so that the additional function unit has a function of making a predetermined conversion to a DC inputted, and inputs a DC using the DC output bus line of one power source unit and also makes a predetermined conversion to this DC and inputs the DC in which this predetermined conversion is made to the DC output bus line of the other power source unit.

Therefore, according to the power source apparatus of the present invention, after an AC inputted to one power source unit is supplied to the additional function unit and some conversion is made by this additional function unit, the AC after the conversion can be supplied to the other power source unit.

Also, a power source apparatus of the present invention is constructed so that the additional function unit is a series connection unit having a series connection function of connecting a minus side line of the DC output bus line of one power source unit to a plus side line of the DC output bus line of the other power source unit.

Therefore, according to the power source apparatus of the present invention, since the additional function unit is the series connection unit having the series connection function, connections can be made by the same wiring as the case of using a single power source apparatus, and the number of man-hours of wiring similar to that of the single power source apparatus can be achieved.

Also, in order to achieve the above objects, a power source apparatus of the present invention is constructed so that the additional function unit is an uninterruptible power supply unit having a DC bus line for making connection to the connector connection means and backup means for backing up the power source units of the module power source through this DC bus line.

Incidentally, the connector connection means is desirably formed of connector connection means of the power source unit side and connector connection means of the uninterruptible power supply unit side, and the connector connection means of the power source unit side is a DC output side connector and the connector connection means of the uninterruptible power supply unit side is a DC input side connector.

Therefore, according to the power source apparatus of the present invention, since the additional function unit is the uninterruptible power supply unit, the DC bus line of the uninterruptible power supply unit can be connected to the DC output bus line of each the power source unit in a one-touch manner by the connector connection means, so that the need for wiring between the uninterruptible power supply unit and the plural power source units connected in parallel is eliminated to result in a saving in man-hours by the amount of the wiring.

Also, a power source apparatus of the present invention is constructed so that the backup means has DC supply means for supplying a DC inputted to the DC bus line to a load, charging means for making step-up and step-down conversions of the DC to charge a battery, and discharging means for supplying the DC from the battery to the load at the time of a power failure and a peak load.

Therefore, according to the power source apparatus of the present invention, while supplying a DC inputted to the DC bus line to the load, step-up and step-down conversions are made to charge the battery and the DC can be supplied from the battery to the load at the time of a power failure and a peak load.

In this manner, a DC can be supplied from the uninterruptible power supply unit to the load at the required time (for example, at the time of the power failure) and also, the peak load exceeding the rated load of the power source system can be supplied from the uninterruptible power supply unit in a short time.

Also, a power source apparatus of the present invention is constructed so that the backup means has DC supply means for supplying a DC inputted to the DC bus line to a load, charging means for making step-up and step-down conversions of the DC to charge a battery, DC power source supplement means for accumulating the DC in a capacitor as electrical energy, and discharging means for emitting the electrical energy from the capacitor and supplementing a DC from the battery and supplying the DC to the load at the time of a power failure.

Incidentally, an ICU circuit, which is a rush current unit, is preferably used as the DC power source supplement means.

Therefore, according to the power source apparatus of the present invention, while supplying a DC inputted to the DC bus line to the load, step-up and step-down conversions are made to charge the battery and also electrical energy is accumulated in the capacitor and in the case of a power failure or a peak load, the electrical energy is emitted from the capacitor and a DC from the battery can be supplemented to supply it to the load.

In this manner, when the battery cannot cope due to abrupt variations in the load, the electrical energy accumulated in the capacitor is emitted and a DC from the battery can be supplemented to cope with the variations in the load.

Also, a power source apparatus of the present invention is constructed so that the backup means has DC supply means for supplying the DC inputted to the DC bus line to a load, charging means for making step-up and step-down conversions of the DC to charge a battery, and discharging means for making a step-down conversion of a DC from the battery and supplying the DC in which this step-down conversion is made to the load through the DC output bus line of the power source units at the time of a power failure and a peak load.

Therefore, according to the power source apparatus of the present invention, while supplying a DC inputted to the DC bus line to the load, step-up and step-down conversions are made to charge the battery and step-down conversion of the DC from the battery can be made to be supplied to the load through the DC output bus line of the power source units at the time of a power failure.

In this manner, electric power can be supplied from the uninterruptible power supply unit to the load via the plural power source units connected in parallel.

Also, a power source apparatus of the present invention is constructed so that the additional function unit is an output characteristic improvement unit comprising an output characteristic improvement circuit for stabilizing an output voltage of the module power source.

The output characteristic improvement circuit corresponds to a circuit for stabilizing an output voltage of the whole module power source.

Therefore, according to the power source apparatus of the present invention, it is constructed so that the output characteristic improvement unit comprising the output characteristic improvement circuit for stabilizing an output voltage of the module power source is connected to the module power source as the additional function unit and, that is, the output voltage of the whole module power source can be stabilized by one output characteristic improvement circuit without providing the output characteristic improvement circuits in the individual power source units, and also there is no need to provide the output characteristic improvement circuits in the individual power source units, so that cost reduction in the power source units and miniaturization of the size can be achieved.

Also, a power source apparatus of the present invention is constructed so that the output characteristic improvement circuit has a step-up circuit for supplying an output voltage of the module power source from the power source unit of the output end side of the module power source and stepping up this output voltage, and a series regulator circuit for stabilizing the output voltage stepped up by this step-up circuit and outputting this stabilized output voltage as the output voltage of the module power source.

Therefore, according to the power source apparatus of the present invention, it is constructed so that the output characteristic improvement circuit comprises a step-up circuit for supplying an output voltage of the module power source from the power source unit of the output end side of the module power source and stepping up this output voltage, and a series regulator circuit for stabilizing the output voltage stepped up by this step-up circuit and outputting this stabilized output voltage as the output voltage of the module power source, so that the output characteristic improvement circuit can be formed in a simple configuration.

Also, a power source apparatus of the present invention is constructed so that the step-up circuit supplies an output voltage of the module power source through the DC output bus line of the power source unit of the output end side of the module power source.

Therefore, according to the power source apparatus of the present invention, since it is constructed so that the step-up circuit supplies an output voltage of the module power source through the DC output bus line of the power source unit of the output end side of the module power source, the output voltage of the whole module power source can be stabilized by one output characteristic improvement circuit without providing the output characteristic improvement circuits in the individual power source units, and also there is no need to provide the output characteristic improvement circuits in the individual power source units, so that cost reduction in the power source units and miniaturization of the size can be achieved.

Also, a power source apparatus of the present invention comprises a module power source formed by connecting at least one or more power source units having bus lines, and is constructed so that the power source unit has a power source circuit, adjusting means for adjusting an output voltage from the power source circuit, switching means for performing on-off control of an adjusting operation of this adjusting means, and control means for setting a reference adjustment value with reference to an output voltage value associated with the power source unit in which the adjusting operation of the adjusting means is in an on control state by the switching means out of the power source units inside the module power source while off control of the adjusting operation of the adjusting means is performed by the switching means and adjusting the output voltage from the power source circuit based on this reference adjustment value.

The power source unit is a unit comprising a power source circuit for inputting an AC from, for example, a commercial AC power source and converting this AC into a DC.

The module power source corresponds to a device capable of obtaining an arbitrary power source capacity according to the number of power source units by connecting at least one or more power source units to, for example, a DIN rail.

The adjusting means corresponds to a voltage adjusting volume, which is provided in the individual power source unit and adjusts an output voltage from this power source unit.

The switching means corresponds to a switch etc. which is provided in the individual power source unit and performs on-off control of an adjusting operation of the adjusting means in response to a switching manipulation and, for example, when off control of the adjusting operation of the adjusting means is performed in response to the switching manipulation of the switching means, the adjusting operation of the adjusting means becomes fixed and when on control of the adjusting operation of the adjusting means is performed, the adjusting operation of the adjusting means operates.

The control circuit is provided in the individual power source unit, and sets a reference adjustment value with reference to an output voltage value associated with the power source unit in which an adjusting operation of the adjusting means is in an on control state by the switching means out of the power source units inside the power source apparatus while off control of the adjusting operation of the adjusting means is performed by the switching means, and adjusts an output voltage from the power source circuit based on this reference adjustment value.

The reference adjustment value is a value set with reference to an output voltage value associated with the power source unit in which an adjusting operation of the adjusting means is in an on control state.

Therefore, according to the power source apparatus of the present invention, it is constructed so that a reference adjustment value is set with reference to an output voltage value associated with the power source unit in which an adjusting operation of the adjusting means is in an on control state by the switching means out of the power source units inside this power source apparatus while off control of the adjusting operation of the adjusting means is performed and an output voltage from the power source circuit is adjusted based on this reference adjustment value, that is, it is constructed so that the output voltage from the power source circuit is adjusted in the side of the individual power source units based on the reference adjustment value, so that, for example, an output voltage adjusting operation between the power source units at the time of parallel running suffices by merely performing an adjusting operation of the adjusting means of the power source unit in the on control state, and the output voltage adjusting operation of the plural power source units can be performed by a single output voltage adjusting operation.

A power source apparatus of the present invention is constructed so that the reference adjustment value is set to an average value of output voltage values set to each the power source unit inside the module power source.

In the reference adjustment value, output voltage values every the power source unit inside the module power source are detected and these output voltage values every the power source unit are added to calculate an average value and this average value is set to the reference adjustment value.

Therefore, according to the power source apparatus of the present invention, it is constructed so that the reference adjustment value is set to an average value of output voltage values of the power source units of the whole power source apparatus and the output voltage from the power source circuit is adjusted based on this average value, that is, it is constructed so that the output voltage from the power source circuit is adjusted in the side of the individual power source units based on the average value of the output voltage values of all the power source units, so that, for example, an output voltage adjusting operation between the power source units at the time of parallel running is improved.

A power source apparatus of the present invention is constructed so that the reference adjustment value is set to the lowest output voltage value of output voltage values set to each the power source unit inside the module power source.

In the reference adjustment value, output voltage values every the power source unit inside the power source apparatus are detected and the lowest output voltage value is retrieved from these output voltage values and this lowest output voltage value is set to the reference adjustment value.

Therefore, according to the power source apparatus of the present invention, it is constructed so that the reference adjustment value is set to the lowest output voltage value of output voltage values set to the power source units and the output voltage value from the power source circuit is adjusted based on this lowest output voltage value, that is, it is constructed so that the output voltage from the power source circuit is adjusted in the side of the individual power source units based on the lowest output voltage value of the output voltage values of all the power source units, so that, for example, an output voltage adjusting operation between the power source units at the time of parallel running is improved.

A power source apparatus of the present invention is constructed so that the reference adjustment value is set to the highest output voltage value of output voltage values set to each the power source unit inside the module power source.

In the reference adjustment value, output voltage values every the power source unit inside the module power source are detected and the highest output voltage value is retrieved from these output voltage values and this highest output voltage value is set to the reference adjustment value.

Therefore, according to the power source apparatus of the present invention, it is constructed so that the reference adjustment value is set to the highest output voltage value of output voltage values set to the power source units and the output voltage value from the power source circuit is adjusted based on this highest output voltage value, that is, it is constructed so that the output voltage value from the power source circuit is adjusted in the side of the individual power source units based on the highest output voltage value of the output voltage values of all the power source units, so that, for example, an output voltage adjusting operation between the power source units at the time of parallel running is improved.

A power source apparatus of the present invention is constructed so that each the power source unit has output current balance monitoring means for monitoring an output current from other power source units, and reference adjustment value detection means for detecting the reference adjustment value based on a monitor result from this output current balance monitoring means.

The output current balance monitoring means is a circuit for monitoring an output current from other power source units through, for example, a current balance bus, and the reference adjustment value detection means is a circuit for detecting the reference adjustment value based on a monitor result from an output current balance circuit, and these output current balance monitoring means and reference adjustment value detection means correspond to, for example, a parallel running control circuit.

Therefore, according to the power source apparatus of the present invention, it is constructed so that the reference adjustment value is detected based on a monitor result from the output current balance monitoring means of each the power source unit, so that the output voltage value can be adjusted by the power source unit itself in which off control of an adjusting operation of the adjusting means is performed based on this reference adjustment value.

A power source apparatus of the present invention is constructed so that each the power source unit has overvoltage protection means for setting an overvoltage value associated with an output voltage from the power source circuit and stopping and controlling the present output voltage when the present output voltage value exceeds the overvoltage value.

The overvoltage protection means corresponds to an overvoltage protection circuit which is provided every power source unit and stops and controls the present output voltage when the output voltage value of the power source unit exceeds the overvoltage value so as not to break a device acting as a load due to an overvoltage from the power source apparatus.

Therefore, according to the power source apparatus of the present invention, it is constructed so that an output voltage of the power source unit is stopped and controlled when the output voltage value of the power source unit exceeds the overvoltage value, so that a device acting as a load of the power source apparatus can be protected by an operation of overvoltage protection when an overvoltage is applied to the power source unit.

A power source apparatus of the present invention is constructed so that each the power source unit has a switch for performing off control of an adjusting operation of the adjusting means by the switching means inside the power source unit connected when a normal connection between the power source units is made, and on control of the adjusting operation of the adjusting means is performed by the switching means in response to a switching manipulation of the switching means.

It is constructed so that the power source unit is provided with the switch and has a configuration in which this switch performs a switching operation when the power source units connect mutually, and the switching means is switched so that the adjusting operation of the adjusting means becomes the off control when this switch performs the switching operation.

Therefore, according to the power source apparatus of the present invention, since the switch performs a switching operation when the power source units connect mutually, it is constructed so that an adjusting operation of the adjusting means inside the individual power source units becomes the off control automatically and on control of the adjusting operation of the adjusting means is performed in response to a switching manipulation of the switching means, so that the switching operation of the switching means associated with the individual power source units is improved.

BEST MODE FOR CARRYING OUT THE INVENTION

Figure 1:
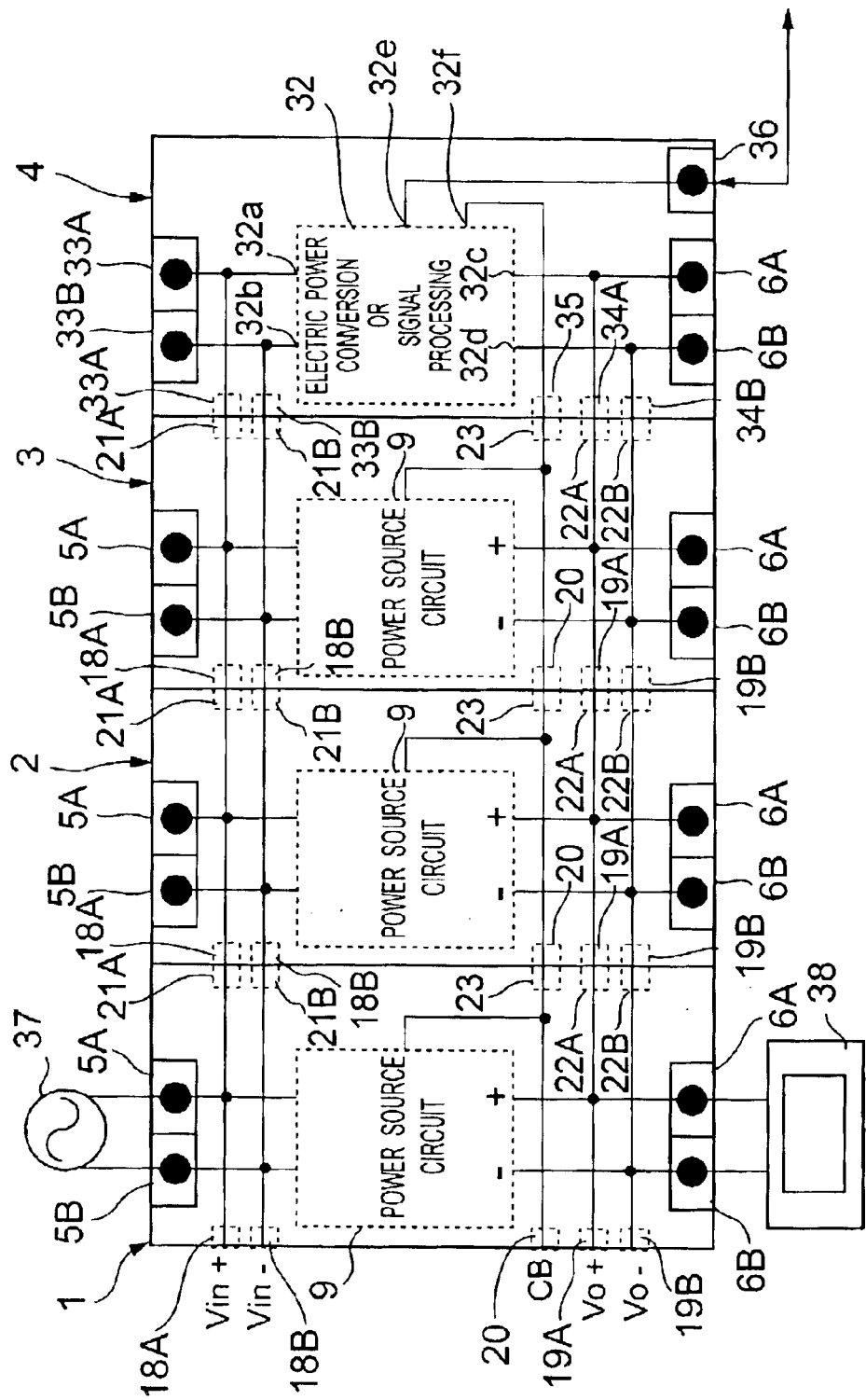
FIG. 1 is a configuration explanatory diagram of a power source apparatus (first embodiment) according to the present invention.

A power source apparatus according to the present invention will be described below based on an embodiment shown in the drawings.

Incidentally, the power source apparatus in this embodiment is applied to a relatively small switching power source and is described, but the power source apparatus of the present invention is not limited to this switching power source.

(First Embodiment)

Figure 2:
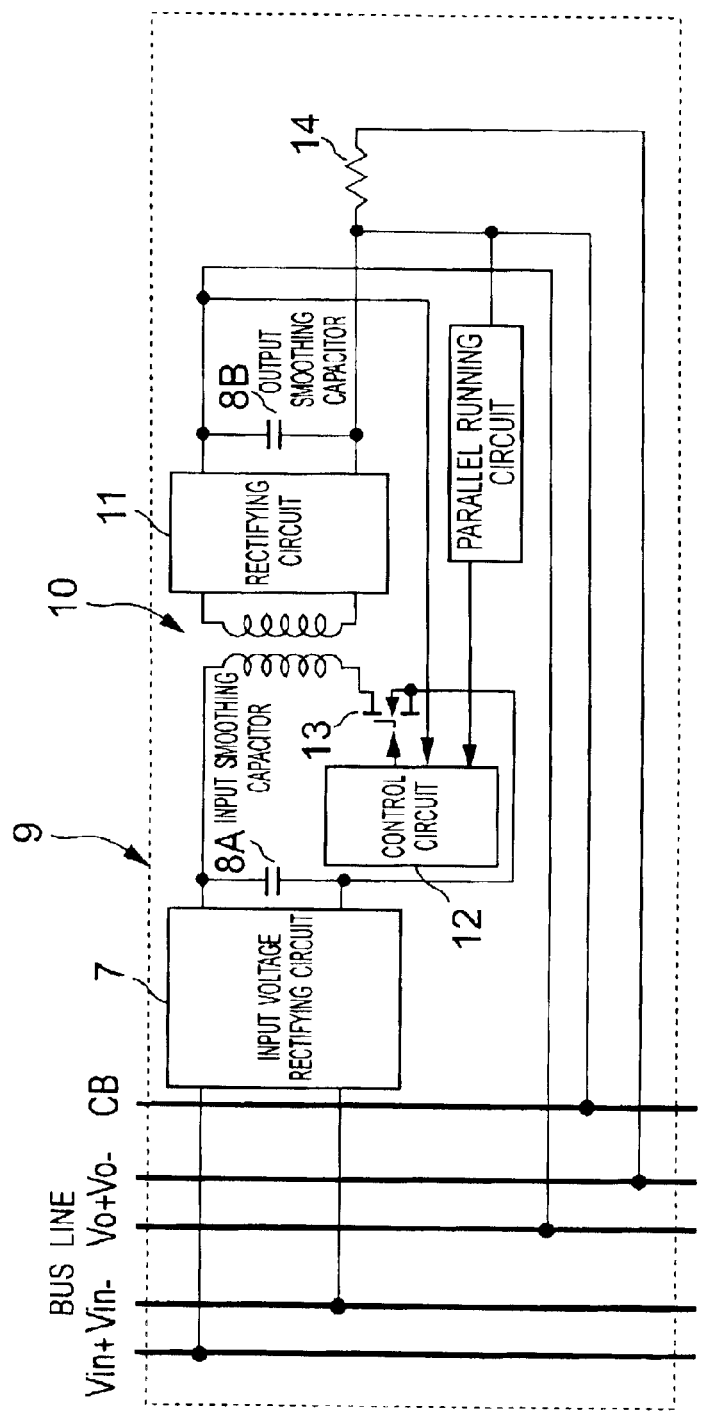
FIG. 2 is an explanatory diagram of a power source circuit in the power source apparatus (first embodiment)

A first embodiment of a power source apparatus according to the present invention is shown in FIGS. 1 and 2.

In these drawings, numeral 1 is a first power source unit, and numeral 2 is a second power source unit, and numeral 3 is a third power source unit, and numeral 4 is an additional function unit. Then, connections between the first power source unit 1 and the second power source unit 2 and between the second power source unit 2 and the third power source unit 3 are respectively made by connector connection means and a module power source is formed of these units.

The first power source unit 1 is a switching power source, for example, for input of 100 to 240 V AC, output of 24 V DC and output of 2.5 A, 60 W in which a required part for power source circuit is built into a rectangular parallelepiped-shaped casing with a front panel shape formed in a longitudinally elongated rectangle.

Then, AC input terminals 5A, 5B, DC output terminals 6A, 6B, AC input bus lines (bus line) (Vin+), (Vin−), DC output bus lines (bus line) (Vo+), (Vo−) and a current balance signal bus line (signal bus line) (bus line) (CB) are placed in the first power source unit 1.

The AC input terminals 5A, 5B are installed in the upper portion of a front panel and guides an external commercial AC of 100 to 240 V AC to a power source circuit 9 and are connected to the AC input bus lines (Vin+), (Vin−). Also, the DC output terminals 6A, 6B are installed in the lower portion of the front panel and outputs 24 V DC, and it is formed in a configuration of two pairs of DC output terminals in which there are two plus side + and two minus side − and one plus side pairs up with one minus side.

Then, the DC output terminal 6A (plus side +) is connected to the DC output bus line (Vo+) and the DC output terminal 6B (minus side −) is connected to the DC output bus line (Vo−).

The power source circuit 9 is constructed so as to convert an AC inputted from the outside through the AC input terminals 5A, 5B into a stabilized output voltage of 24 V DC and output it to the outside through the DC output terminals 6A, 6B, and this power source circuit 9 is a switching power source circuit and it is constructed so that an external commercial AC is rectified by an input voltage rectifying circuit 7 and an input smoothing capacitor 8A to obtain a DC voltage and this DC voltage is switched by a switch element 13 to convert it into a high-frequency pulse and this high-frequency pulse is transformed by a high-frequency transformer 10 and is again returned to a DC by a high-frequency rectifying circuit 11 and an output smoothing capacitor 8B. Also, in the case that variations in output voltage occur, it is constructed so that a pulse width or a switching frequency at the time when the switch element 13 performs switching is changed to perform constant-voltage control by a control circuit 12.

Then, the input side of the power source circuit 9 is connected to the AC input bus lines (Vin+), (Vin−) and also, the output side of the power source circuit 9 is connected to the DC output bus lines (Vo+), (Vo−).

Also, the current balance signal bus line (CB) is used in control means (not shown) for making output currents of respective power source units uniform when plural power source units are connected in parallel. Then, this current balance signal bus line (CB) detects an output current by a resistor 14 and outputs a signal by a voltage in proportion to this output current.

The first, second, third power source units 1, 2, 3 have AC input side connectors 18A, 18B, DC input side connectors 19A, 19B and a current balance signal input side connector 20 in one side of a side panel of the power source units, and also have AC output side connectors 21A, 21B, DC output side connectors 22A, 22B and a current balance signal output side connector 23 in the other side of the side panel, and the AC input side connectors 18A, 18B are mutually connected to the AC output side connectors 21A, 21B through the AC input bus lines (Vin+), (Vin−), and the DC input side connectors 19A, 19B are mutually connected to the DC output side connectors 22A, 22B through the DC output bus lines (Vo+), (Vo−), and the current balance signal input side connector 20 is mutually connected to the current balance signal output side connector 23 through the current balance signal bus line (CB).

The additional function unit 4 has AC input terminals 30A, 30B, DC output terminals 31A, 31B, an interface connection terminal 36, an electric power conversion or signal processing circuit 32, AC input side connectors 33A, 33B, DC input side connectors 34A, 34B and a current balance signal input side connector 35, and the AC input side connectors 33A, 33B are connected to the AC input bus lines (Vin+), (Vin−), and the DC input side connectors 34A, 34B are connected to the DC output bus lines (Vo+), (Vo−), and the current balance signal input side connector 35 is connected to the current balance signal bus line (CB).

The electric power conversion or signal processing circuit 32 provides AC input terminal portions 32a, 32b, DC output terminal portions 32c, 32d, a current balance signal input terminal portion 32e and an interface connection terminal portion 32f, and the AC input terminal portions 32a, 32b are connected to the AC input bus lines (Vin+), (Vin−), and the DC output terminal portions 32c, 32d are connected to the DC output bus lines (Vo+), (Vo−), and the current balance signal input terminal portion 32e is connected to the current balance signal bus line (CB), and the interface connection terminal portion 32f is connected to the interface connection terminal 36.

The first, second, third power source units 1, 2, 3 and the additional function unit 4 are mounted on a DIN rail (not shown) and are connected in parallel in this order.

That is, in the right neighborhood of the first power source unit 1, the second, third power source units 2, 3 and the additional function unit 4 are placed in this order, and the AC output side connectors 21A, 21B, the DC output side connectors 22A, 22B and the current balance signal output side connector 23 of the first power source unit 1 are respectively connected to the AC input side connectors 18A, 18B, the DC input side connectors 19A, 19B and the current balance signal input side connector 20 of the second power source unit 2.

Also, the AC output side connectors 21A, 21B, the DC output side connectors 22A, 22B and the current balance signal output side connector 23 of the second power source unit 2 are respectively connected to the AC input side connectors 18A, 18B, the DC input side connectors 19A, 19B and the current balance signal input side connector 20 of the third power source unit 3.

Then, the AC output side connectors 21A, 21B, the DC output side connectors 22A, 22B and the current balance signal output side connector 23 of the third power source unit 3 are respectively connected to the AC input side connectors 33A, 33B, the DC input side connectors 34A, 34B and the current balance signal input side connector 35 of the additional function unit 4.

Therefore, the individual AC input bus lines (Vin+), (Vin−) of the first, second, third power source units 1, 2, 3 and the additional function unit 4 are unified with the bus lines range in this order, and the individual DC output bus lines (Vo+), (Vo−) of the first, second, third power source units 1, 2, 3 and the additional function unit 4 are unified with the bus lines range in this order, and also the individual current balance signal bus lines (CB) of the first, second, third power source units 1, 2, 3 and the additional function unit 4 are unified with the bus lines range in this order.

Then, an external commercial AC power source 37 is connected to the AC input terminals 5A, 5B of the first power source unit 1, and a load 38 is connected to the DC output terminals 6A, 6B of the first power source unit 1. Also, an external apparatus (not shown) is connected to the interface connection terminal 36.

Next, an operation of the power source apparatus formed as mentioned above will be described.

As a result of supplying an AC power source inputted from the AC input terminals 5A, 5B of the first power source unit 1 to each of the second, third power source units 2, 3, a DC converted by the power source circuit 9 of each of the power source units 1, 2, 3 can be outputted individually from each of the DC output terminals 6A, 6B and the load 38 can be driven.

Also, as a result of supplying the AC power source inputted from the AC input terminals 5A, 5B of the first power source unit 1 to the additional function unit 4 through the second, third power source units 2, 3, a DC into which electric power conversion is made in this additional function unit 4 is outputted from the DC output terminals 31A, 31B and also, a DC converted by the power source circuit 9 is outputted from the DC output terminals 31A, 31B of the additional function unit 4 through the DC output bus lines (Vo+), (Vo−). Also, a control signal can be outputted to the external apparatus connected to the interface connection terminal 36 of the additional function unit 4.

Also, the current balance signal bus line (CB) is used in control means for making output currents of respective power source units uniform when plural power source units are connected in parallel. Here, this current balance signal bus line (CB) detects an output current by the resistor 14, so that an output is produced by a voltage in proportion to the output current. Therefore, by using a signal of this current balance signal bus line (CB), use can be made as information about the output current, namely a load state.

The first embodiment of the power source apparatus according to the present invention described above is constructed so that the first, second, third power source units 1, 2, 3 and the additional function unit 4 are connected in parallel on the DIN rail in this order, but the power source apparatus according to the present invention may be constructed so as to connect the additional function unit 4 to the first power source unit 1 through a connector.

Also, in the first embodiment of the power source apparatus according to the present invention described above, the external commercial AC power source 37 is connected to the AC input terminals 5A, 5B of the first power source unit 1 and the load 38 is connected to the DC output terminals 6A, 6B of the first power source unit 1, but the external commercial AC power source 37 and the load 38 may be connected to any power source unit.

In accordance with the first embodiment of the power source apparatus according to the present invention described above, a power source apparatus with a saving in wiring, large noise immunity and an additional function can be achieved by respectively connecting bus lines for connecting the first, second, third power source units 1, 2, 3, that is, the AC input bus lines (Vin+), (Vin−), the DC output bus lines (Vo+), (Vo−) and the current balance signal bus line (CB) through connectors to form a module power source and connecting the additional function unit to this module power source through a connector to add the additional function unit.

(Second Embodiment)

Figure 3:
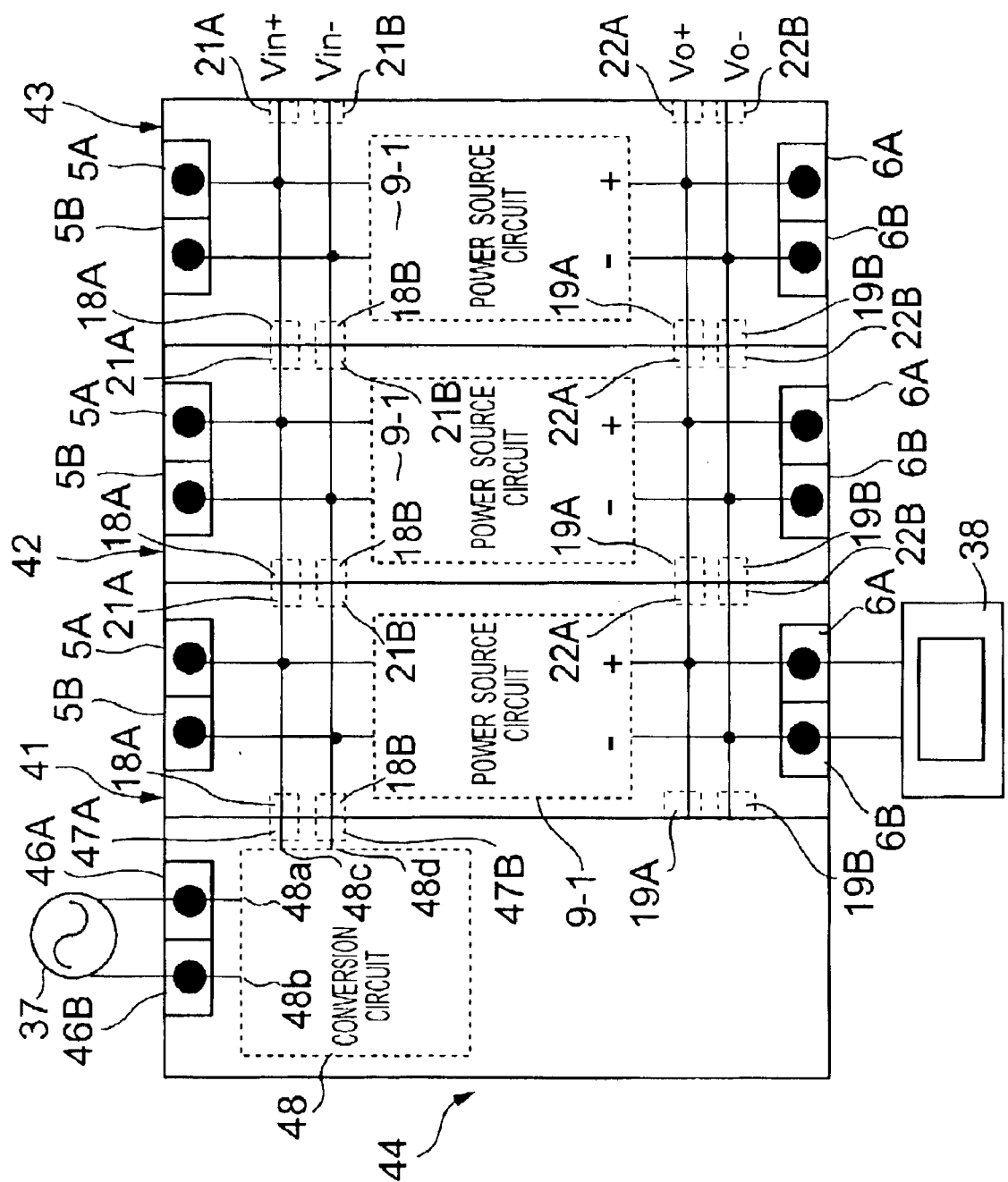
FIG. 3 is a configuration explanatory diagram of a power source apparatus (second embodiment) according to the present invention.

A second embodiment of a power source apparatus according to the present invention is shown in FIG. 3.

In FIG. 3, numeral 41 is a first power source unit, and numeral 42 is a second power source unit, and numeral 43 is a third power source unit, and numeral 44 is an additional function unit. Then, connections between the first power source unit 41 and the second power source unit 42 and between the second power source unit 42 and the third power source unit 43 are respectively made by connector connection means and a module power source is formed of these units.

Then, a power source circuit 9-1, AC input terminals 5A, 5B, DC output terminals 6A, 6B, AC input bus lines (Vin+), (Vin−) and DC output bus lines (Vo+), (Vo−) are placed in the first, second, third power source units 41, 42, 43.

The AC input terminals 5A, 5B are installed in the upper portion of a front panel and guides an external commercial AC of 100 to 240 V AC to the power source circuit 9-1 and are connected to the AC input bus lines (Vin+), (Vin−). Also, the DC output terminals 6A, 6B are installed in the lower portion of the front panel and outputs 24 V DC, and it is formed in a configuration of two pairs of DC output terminals in which there are two plus side + and two minus side − and one plus side pairs up with one minus side. Then, the DC output terminal 6A is connected to the DC output bus line (Vo+) and the DC output terminal 6B is connected to the DC output bus line (Vo−), respectively.

The power source circuit 9-1 is constructed so as to convert an AC inputted from the outside through the AC input terminals 5A, 5B into a stabilized output voltage of 24 V DC and output it to the outside through the DC output terminals 6A, 6B.

This power source circuit 9-1 is a switching power source circuit and is the same configuration as a configuration in which parallel running control means is not disclosed in the power source circuit 9 in the first embodiment of the power source apparatus according to the present invention described above. Then, the input side of the power source circuit 9-1 is connected to the AC input bus lines (Vin+), (Vin−) and also, the output side of the power source circuit 9-1 is connected to the DC output bus lines (Vo+), (Vo−).

AC input side connectors 18A, 18B and DC input side connectors 19A, 19B are respectively placed in one side of a side panel of the first, second, third power source units 41, 42, 43 and also, AC output side connectors 21A, 21B and DC output side connectors 22A, 22B are respectively placed in the other side of the side panel. Then, the AC input side connectors 18A, 18B and the AC output side connectors 21A, 21B are connected to the AC input bus lines (Vin+), (Vin−), and the DC input side connectors 19A, 19B and the DC output side connectors 22A, 22B are connected to the DC output bus lines (Vo+), (Vo−).

The additional function unit 44 has AC input terminals 46A, 46B, a conversion circuit 48 and AC output side connectors 47A, 47B, and this conversion circuit 48 is, for example, a rush prevention circuit. Then, this conversion circuit 48 is provided with AC input terminal portions 48a, 48b and AC output terminal portions 48c, 48d. Then, the AC input terminal portions 48a, 48b are connected to the AC input terminals 46A, 46B, and the AC output terminal portions 48c, 48d are connected to the AC output side connectors 47A, 47B.

The additional function unit 44 and the first, second, third power source units 41, 42, 43 are mounted on a DIN rail (not shown) and are connected in parallel in this order.

That is, in the right neighborhood of the additional function unit 44, the first, second, third power source units 41, 42, 43 are placed in this order, and the AC output side connectors 47A, 47B of the additional function unit 44 are connected to the AC input side connectors 18A, 18B of the first power source unit 41.

Also, the AC output side connectors 21A, 21B and the DC output side connectors 22A, 22B of the first power source unit 41 are respectively connected to the AC input side connectors 18A, 18B and the DC input side connectors 19A, 19B of the second power source unit 42. Also, the AC output side connectors 21A, 21B and the DC output side connectors 22A, 22B of the second power source unit 42 are respectively connected to the AC input side connectors 18A, 18B and the DC input side connectors 19A, 19B of the third power source unit 43.

Therefore, the individual AC input bus lines (Vin+), (Vin−) of the first, second, third power source units 41, 42, 43 are unified with the bus lines range in this order, and also the individual DC output bus lines (Vo+), (Vo−) of the first, second, third power source units 41, 42, 43 are unified with the bus lines range in this order.

Then, an external commercial AC power source 37 is connected to the AC input terminals 46A, 46B of the additional function unit 44, and a load 38 is connected to the DC output terminals 6A, 6B of the first power source unit 41.

Therefore, as a result of converting an AC inputted from the AC input terminals 46A, 46B of the additional function unit 44 by the conversion circuit 48 of the additional function unit 44 (for example, when the conversion circuit 48 is a rush prevention circuit, a rush current is suppressed to a predetermined value) and supplying the AC to each of the first, second, third power source units 41, 42, 43, a DC can be outputted individually from each of the DC output terminals 6A, 6B of the first, second, third power source units 41, 42, 43 and the DC can be supplied to the load 38.

The second embodiment of the power source apparatus according to the present invention described above is constructed so that the additional function unit 44 and the first, second, third power source units 41, 42, 43 are connected in parallel on the DIN rail in this order, but the power source apparatus according to the present invention may be constructed so as to connect the additional function unit 44 to the third power source unit 43 through a connector.

Also, in the second embodiment of the power source apparatus according to the present invention described above, the load 38 is connected to the DC output terminals 6A, 6B of the first power source unit 41, but the load 38 may be connected to any power source unit.

In accordance with the second embodiment of the power source apparatus according to the present invention described above, a power source apparatus with a saving in wiring, large noise immunity and an additional function can be achieved by respectively connecting bus lines for connecting the first, second, third power source units 41, 42, 43, that is, the AC input bus lines (Vin +), (Vin−) and the DC output bus lines (Vo+), (Vo−) through connectors to form a module power source and connecting the additional function unit 44 to this module power source through a connector to add the additional function unit.

Particularly, after inputting an external AC power source and making some conversion, an AC can be supplied to the first, second, third power source units 41, 42, 43 using the AC input bus lines (Vin+), (Vin−).

(Third Embodiment)

Figure 4:
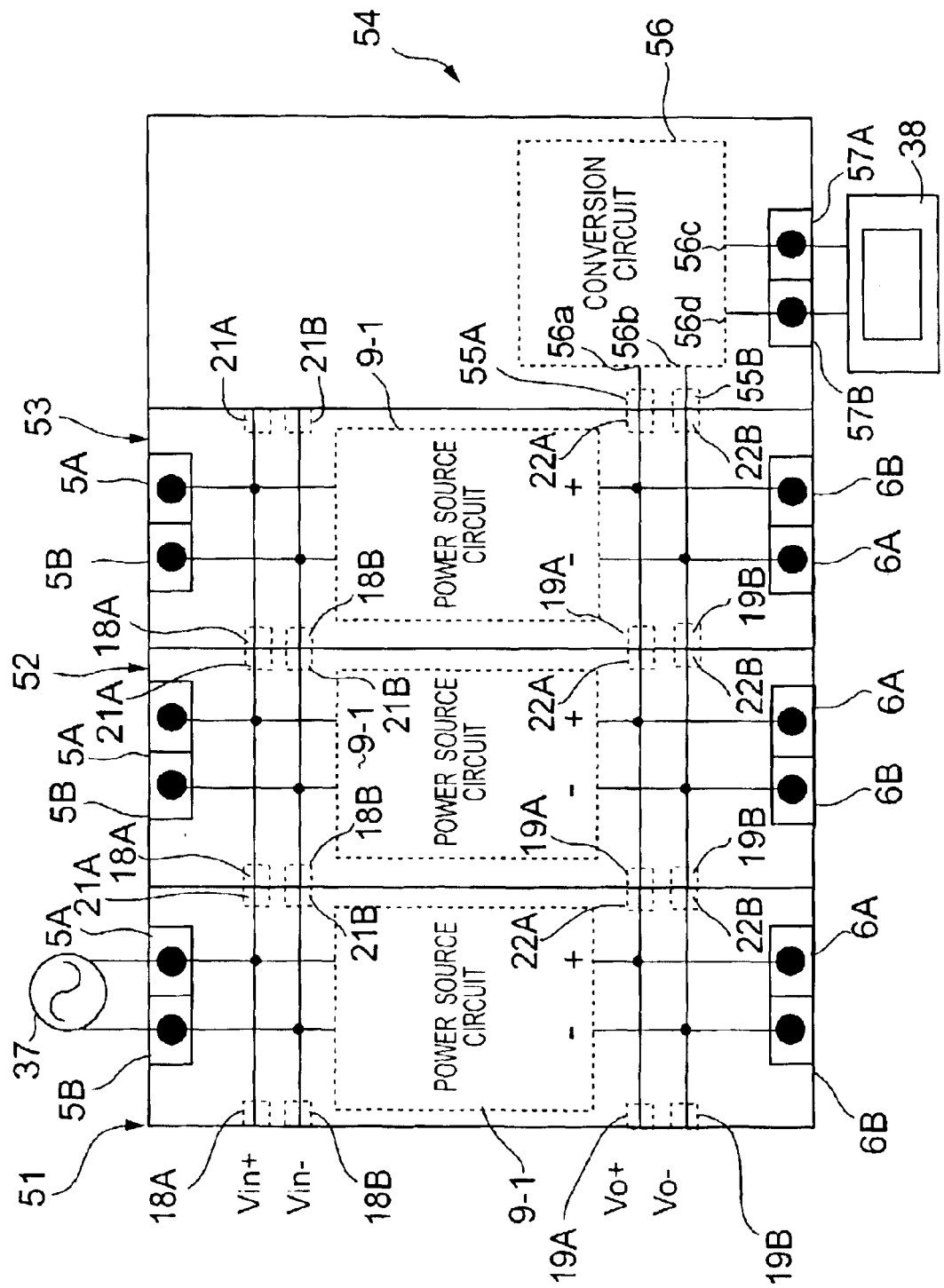
FIG. 4 is a configuration explanatory diagram of a power source apparatus (third embodiment) according to the present invention.

A third embodiment of a power source apparatus according to the present invention is shown in FIG. 4.

In FIG. 4, numeral 51 is a first power source unit, and numeral 52 is a second power source unit, and numeral 53 is a third power source unit, and numeral 54 is an additional function unit. Then, connections between the first power source unit 51 and the second power source unit 52 and between the second power source unit 52 and the third power source unit 53 are respectively made by connector connection means and a module power source is formed of these units.

Then, a power source circuit 9-1, AC input terminals 5A, 5B, DC output terminals 6A, 6B, AC input bus lines (Vin+), (Vin−) and DC output bus lines (Vo+), (Vo−) are placed in the first, second, third power source units 51, 52, 53.

The AC input terminals 5A, 5B are installed in the upper portion of a front panel and guides an external commercial AC of 100 to 240 V AC to the power source circuit 9-1 and are connected to the AC input bus lines (Vin+), (Vin−). Also, the DC output terminals 6A, 6B are installed in the lower portion of the front panel and outputs 24 V DC, and it is formed in a configuration of two pairs of DC output terminals in which there are two plus side + and two minus side − and one plus side pairs up with one minus side. Then, the DC output terminal 6A is connected to the DC output bus line (Vo+) and the DC output terminal 6B is connected to the DC output bus line (Vo−), respectively.

The power source circuit 9-1 is constructed so as to convert an AC inputted from the outside through the AC input terminals 5A, 5B into a stabilized output voltage of 24 V DC and output it to the outside through the DC output terminals 6A, 6B.

AC input side connectors 18A, 18B and DC input side connectors 19A, 19B are respectively placed in one side of a side panel of the first, second, third power source units 51, 52, 53 and also, AC output side connectors 21A, 21B and DC output side connectors 22A, 22B are respectively placed in the other side of the side panel. Then, the AC input side connectors 18A, 18B and the AC output side connectors 21A, 21B are connected to the AC input bus lines (Vin+), (Vin−), and the DC input side connectors 19A, 19B and the DC output side connectors 22A, 22B are connected to the DC output bus lines (Vo+), (Vo−).

The additional function unit 54 has DC input side connectors 55A, 55B, a conversion circuit 56 and DC output terminals 57A, 57B, and this conversion circuit 56 is, for example, a step-down circuit. Then, this conversion circuit 56 is provided with DC input terminal portions 56a, 56b and DC output terminal portions 56c, 56d. Then, the DC input terminal portions 56a, 56b are connected to the DC input side connectors 55A, 55B, and the DC output terminal portions 56c, 56d are connected to the DC output terminals 57A, 57B.

The first, second, third power source units 51, 52, 53 and the additional function unit 54 are mounted on a DIN rail (not shown) and are connected in parallel in this order.

That is, connections between the first power source unit 51 and the second power source unit 52 and between the second power source unit 52 and the third power source unit 53 are made in this order by connecting the AC output side connectors 21A, 21B to the AC input side connectors 18A, 18B and connecting the DC output side connectors 22A, 22B to the DC input side connectors 19A, 19B.

Therefore, the individual AC input bus lines (Vin+), (Vin−) and DC output bus lines (Vo+), (Vo−) of the first, second, third power source units 51, 52, 53 are respectively unified with the bus lines range in this order.

Then, the third power source unit 53 is mutually connected to the additional function unit 54 by connecting the DC output side connectors 22A, 22B to the DC input side connectors 55A, 55B.

Also, an external commercial AC power source 37 is connected to the AC input terminals 5A, 5B of the first power source unit 51, and a load 38 is connected to the DC output terminals 57A, 57B of the additional function unit 54.

Therefore, as a result of supplying an AC power source inputted from the AC input terminals 5A, 5B of the first power source unit 51 to each of the second, third power source units 52, 53, a DC can be outputted individually from each of the DC output terminals 6A, 6B of the second, third power source units 52, 53.

Also, as a result of converting an AC inputted from the AC input terminals 5A, 5B of the first power source unit 51 into a DC through the power source circuits 9-1 of each of the first, second, third power source units 51, 52, 53 and then supplying the AC to the additional function unit 54, for example, the DC can be stepped down and supplied to the load 38 in the conversion circuit 56 of this additional function unit 54.

The third embodiment of the power source apparatus according to the present invention described above is constructed so that the first, second, third power source units 51, 52, 53 and the additional function unit 54 are connected in parallel on the DIN rail in this order, but the power source apparatus according to the present invention may be constructed so as to connect the additional function unit 54 to the first power source unit 51 through a connector.

Also, in the third embodiment of the power source apparatus according to the present invention described above, the external commercial AC power source 37 is connected to the AC input terminals 5A, 5B of the first power source unit 51, but the external commercial AC power source 37 may be connected to any power source unit.

In accordance with the third embodiment of the power source apparatus according to the present invention described above, a power source apparatus with a saving in wiring, large noise immunity and an additional function can be achieved by respectively connecting bus lines for connecting the first, second, third power source units 51, 52, 53, that is, the AC input bus lines (Vin+), (Vin−) and the DC output bus lines (Vo+), (Vo−) through connectors to form a module power source and connecting the additional function unit 54 to this module power source through a connector to add the additional function unit.

Particularly, after inputting a DC of the first, second, third power source units 51, 52, 53 to the additional function unit 54 using the DC output bus lines (Vo+), (Vo−) and making some conversion, the DC can be supplied to the load 38.

(Fourth Embodiment)

Figure 5:
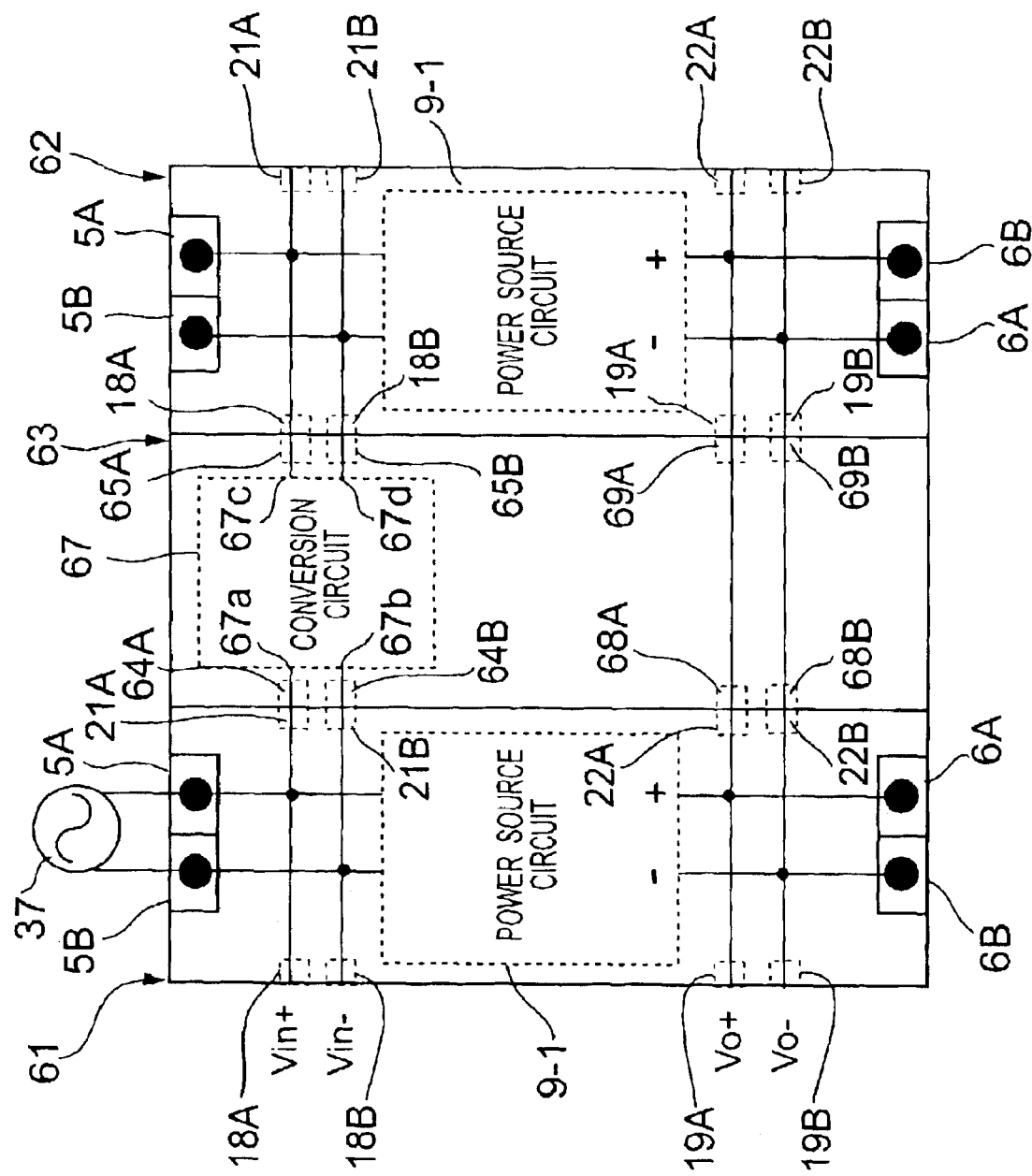
FIG. 5 is a configuration explanatory diagram of a power source apparatus (fourth embodiment) according to the present invention.

A fourth embodiment of a power source apparatus according to the present invention is shown in FIG. 5.

In FIG. 5, numeral 61 is a first power source unit, and numeral 62 is a second power source unit, and numeral 63 is an additional function unit. Then, a power source circuit 9-1, AC input terminals 5A, 5B, DC output terminals 6A, 6B, AC input bus lines (Vin+), (Vin−) and DC output bus lines (Vo+), (Vo−) are placed in the first, second power source units 61, 62.

The AC input terminals 5A, 5B are installed in the upper portion of a front panel and guides an external commercial AC of 100 to 240 V AC to the power source circuit 9-1 and are connected to the AC input bus lines (Vin+), (Vin−). Also, the DC output terminals 6A, 6B are installed in the lower portion of the front panel and outputs 24 V DC, and it is formed in a configuration of two pairs of DC output terminals in which there are two plus side + and two minus side − and one plus side pairs up with one minus side. Then, the DC output terminal 6A is connected to the DC output bus line (Vo+) and the DC output terminal 6B is connected to the DC output bus line (Vo−), respectively.

Since the power source circuit 9-1 has the same configuration as that of the power source circuit in the second embodiment of the power source apparatus according to the present invention described above, the description will be omitted.

Then, the input side of the power source circuit 9-1 is connected to the AC input bus lines (Vin+), (Vin−) and also, the output side of the power source circuit 9-1 is connected to the DC output bus lines (Vo+), (Vo−).

Also, AC input side connectors 18A, 18B and DC input side connectors 19A, 19B are respectively placed in one side of a side panel of the first, second power source units 61, 62 and also, AC output side connectors 21A, 21B and DC output side connectors 22A, 22B are respectively placed in the other side of the side panel. Then, the AC input side connectors 18A, 18B and the AC output side connectors 21A, 21B are connected to the AC input bus lines (Vin+), (Vin−), and the DC input side connectors 19A, 19B and the DC output side connectors 22A, 22B are connected to the DC output bus lines (Vo+), (Vo−).

The additional function unit 63 has AC input side connectors 64A, 64B, AC output side connectors 65A, 65B, a conversion circuit 67, DC input side connectors 68A, 68B and DC output side connectors 69A, 69B, and this conversion circuit 67 is provided with AC input terminal portions 67a, 67b and AC output terminal portions 67c, 67d. Then, the AC input terminal portions 67a, 67b are connected to the AC input side connectors 64A, 64B, and the AC output terminal portions 67c, 67d are connected to the AC output side connectors 65A, 65B. Also, the DC input side connectors 68A, 68B are connected to the DC output side connectors 69A, 69B through the DC output bus lines (Vo+), (Vo−).

The first power source unit 61, the additional function unit 63 and the second power source unit 62 are mounted on a DIN rail (not shown) and are connected in parallel in this order.

That is, a connection between the first power source unit 61 and the additional function unit 63 is mutually made by connecting the AC output side connectors 21A, 21B and the DC output side connectors 22A, 22B of the first power source unit 61 to the AC input side connectors 64A, 64B and the DC input side connectors 68A, 68B of the additional function unit 63, and a connection between the additional function unit 63 and the second power source unit 62 is mutually made by connecting the AC output side connectors 65A, 65B and the DC output side connectors 69A, 69B of the additional function unit 63 to the AC input side connectors 18A, 18B and the DC input side connectors 19A, 19B of the second power source unit 62.

Therefore, the individual DC output bus lines (Vo+), (Vo−) of the first power source unit 61, the additional function unit 63 and the second power source unit 62 are unified with the bus lines range in this order. Also, an external commercial AC power source 37 is connected to the AC input terminals 5A, 5B of the first power source unit 61.

Therefore, after an AC inputted from the AC input terminals 5A, 5B of the first power source unit 61 is supplied to the additional function unit 63 and some conversion (for example, step-down conversion) is made by the conversion circuit 67 of this additional function unit 63, the AC is supplied to the second power source unit 62.

A DC outputted to the DC output bus lines (Vo+), (Vo−) of the first power source unit 61 is supplied to the second power source unit 62 through the additional function unit 63.

In accordance with the fourth embodiment of the power source apparatus according to the present invention described above, after an AC inputted from the AC input terminals 5A, 5B of the first power source unit 61 is supplied to the additional function unit 63 and some conversion is made by the conversion circuit 67 of this additional function unit 63, a power source after the conversion can be supplied to the second power source unit 62.

(Fifth Embodiment)

Figure 6:
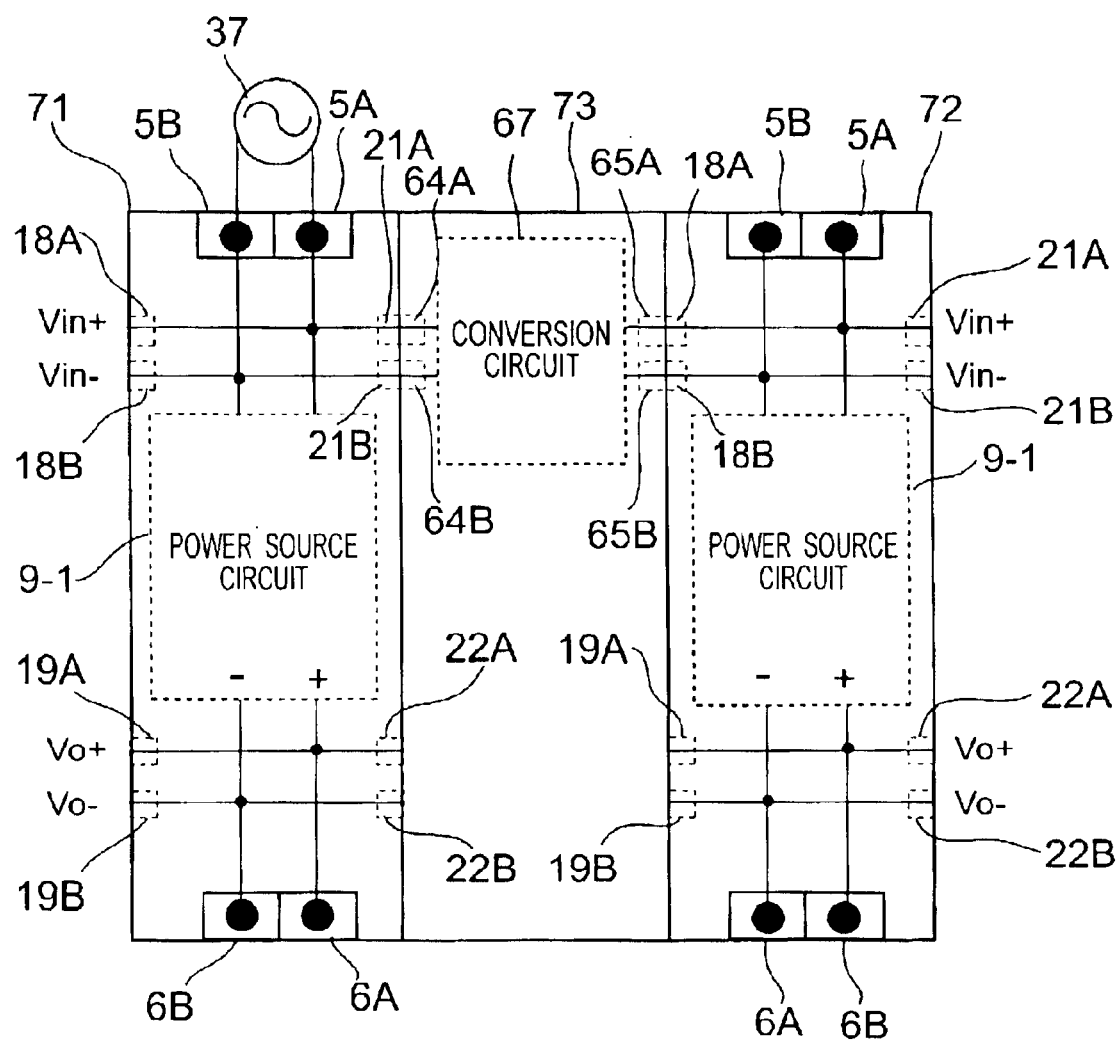
FIG. 6 is a configuration explanatory diagram of a power source apparatus (fifth embodiment) according to the present invention.

A fifth embodiment of a power source apparatus according to the present invention is shown in FIG. 6.

In FIG. 6, numeral 71 is a first power source unit, and numeral 72 is a second power source unit, and numeral 73 is an additional function unit.

Then, the additional function unit 73 in the fifth embodiment of the power source apparatus according to the present invention has a configuration in which the DC input side connectors 68A, 68B, the DC output bus lines (Vo+), (Vo−) and the DC output side connectors 69A, 69B are eliminated in the additional function unit 63 in the fourth embodiment of the power source apparatus according to the present invention described above, and also the first power source unit 71 in the fifth embodiment of the power source apparatus according to the present invention has the same configuration as that of the first power source unit 61 in the fourth embodiment of the power source apparatus according to the present invention described above, and the second power source unit 72 in the fifth embodiment of the power source apparatus according to the present invention has the same configuration as that of the second power source unit 62 in the fourth embodiment of the power source apparatus according to the present invention described above.

Therefore, the other configurations of the fifth embodiment of the power source apparatus according to the present invention are similar to those of the fourth embodiment of the power source apparatus according to the present invention described above, so that the description will be omitted by attaching the same signs.

Then, the first power source unit 71, the additional function unit 73 and the second power source unit 72 are mounted on a DIN rail (not shown) and are connected in parallel in this order.

That is, a connection between the first power source unit 71 and the additional function unit 73 is mutually made by connecting the AC output side connectors 21A, 21B of the first power source unit 71 to the AC input side connectors 64A, 64B of the additional function unit 73, and a connection between the additional function unit 73 and the second power source unit 72 is mutually made by connecting the AC output side connectors 65A, 65B of the additional function unit 73 to the AC input side connectors 18A, 18B of the second power source unit 72. Also, an external commercial AC power source 37 is connected to the AC input terminals 5A, 5B of the first power source unit 71.

Therefore, after an AC inputted from the AC input terminals 5A, 5B of the first power source unit 71 is supplied to the additional function unit 73 and some conversion is made by the conversion circuit 67 of this additional function unit 73, the AC after the conversion is supplied to the second power source unit 72.

In accordance with the fifth embodiment of the power source apparatus according to the present invention described above, after an AC inputted from the AC input terminals 5A, 5B of the first power source unit 71 is supplied to the additional function unit 73 and some conversion is made by the conversion circuit 67 of this additional function unit 73, the AC after the conversion can be supplied to the second power source unit 72.

(Sixth Embodiment)

Figure 7:
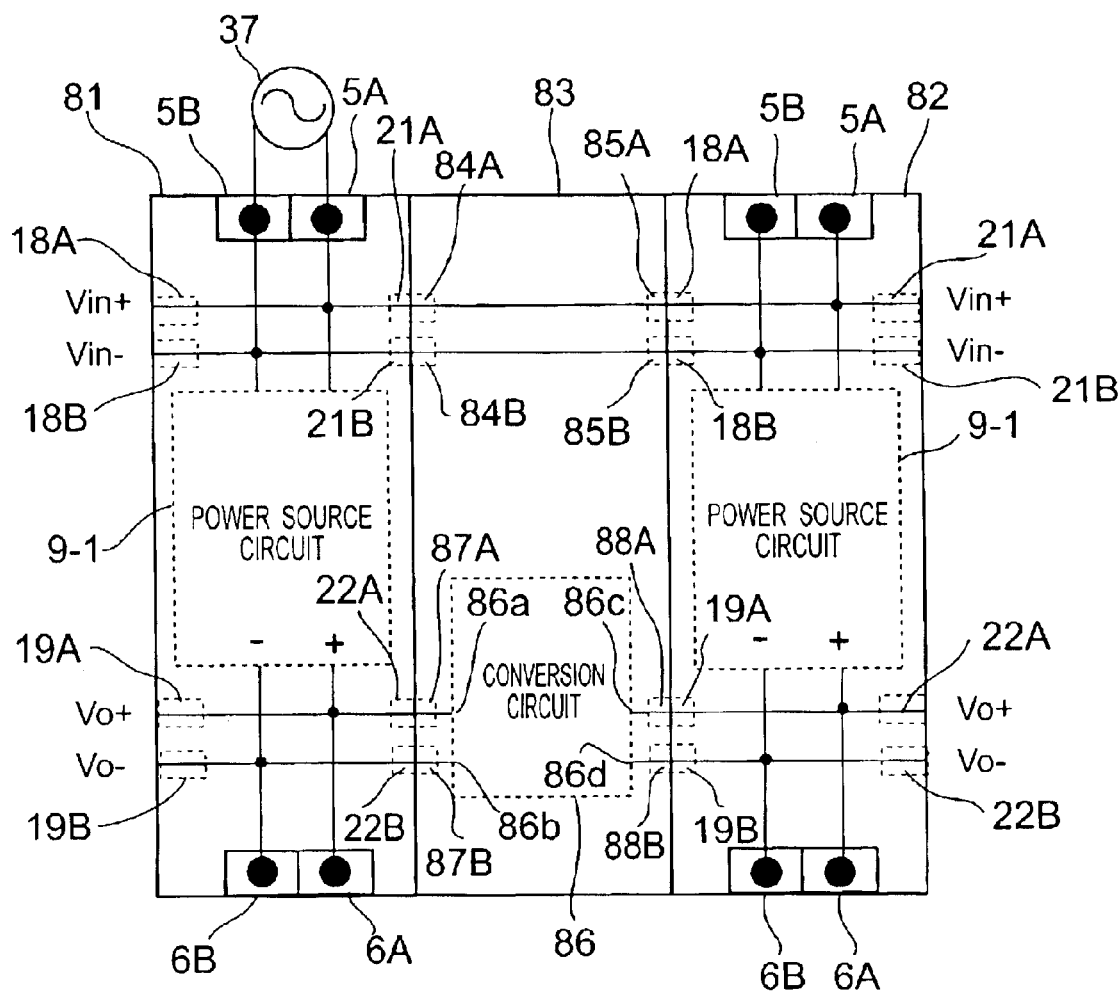
FIG. 7 is a configuration explanatory diagram of a power source apparatus (sixth embodiment) according to the present invention.

A sixth embodiment of a power source apparatus according to the present invention is shown in FIG. 7.

In FIG. 7, numeral 81 is a first power source unit, and numeral 82 is a second power source unit, and numeral 83 is an additional function unit.

Then, the first power source unit 81 and the second power source unit 82 in the sixth embodiment of the power source apparatus according to the present invention have the same configuration as that of the first power source unit 61 and the second power source unit 62 in the fourth embodiment of the power source apparatus according to the present invention described above, so that the description will be omitted by attaching the same signs.

Also, the additional function unit 83 has AC input side connectors 84A, 84B, AC output side connectors 85A, 85B, a conversion circuit 86, DC input side connectors 87A, 87B and DC output side connectors 88A, 88B, and this conversion circuit 86 is provided with DC input terminal portions 86a, 86b and DC output terminal portions 86c, 86d.

Then, the DC input terminal portions 86a, 86b are connected to the DC input side connectors 87A, 87B, and the DC output terminal portions 86c, 86d are connected to the DC output side connectors 88A, 88B. Also, the AC input side connectors 84A, 84B are connected to the AC output side connectors 85A, 85B through the AC input bus lines (Vin+), (Vin−).

The first power source unit 81, the additional function unit 83 and the second power source unit 82 are mounted on a DIN rail (not shown) and are connected in parallel in this order.

That is, a connection between the first power source unit 81 and the additional function unit 83 is mutually made by connecting the AC output side connectors 21A, 21B and the DC output side connectors 22A, 22B of the first power source unit 81 to the AC input side connectors 84A, 84B and the DC input side connectors 87A, 87B of the additional function unit 83, and a connection between the additional function unit 83 and the second power source unit 82 is mutually made by connecting the AC output side connectors 85A, 85B and the DC output side connectors 88A, 88B of the additional function unit 83 to the AC input side connectors 18A, 18B and the DC input side connectors 19A, 19B of the second power source unit 82.

Therefore, the individual AC input bus lines (Vin+), (Vin−) of the first power source unit 81, the additional function unit 83 and the second power source unit 82 are unified with the bus lines range in this order. Also, an external commercial AC power source 37 is connected to the AC input terminals 5A, 5B of the first power source unit 81.

Therefore, an AC power source inputted from the AC input terminals 5A, 5B of the first power source unit 81 is supplied to the second power source unit 82 through the AC input bus lines (Vin+), (Vin−) of the additional function unit 83.

Also, after a DC outputted to the DC output bus lines (Vo+), (Vo−) of the first power source unit 81 is supplied to the additional function unit 83 and some conversion is made by the conversion circuit 86 of this additional function unit 83, the DC after the conversion is supplied to the second power source unit 82.

In accordance with the sixth embodiment of the power source apparatus according to the present invention described above, after a DC outputted to the DC output bus lines (Vo+), (Vo−) of the first power source unit 81 is supplied to the additional function unit 83 and some conversion is made by the conversion circuit 86 of this additional function unit 83, the DC after the conversion can be supplied to the second power source unit 82.

(Seventh Embodiment)

Figure 8:
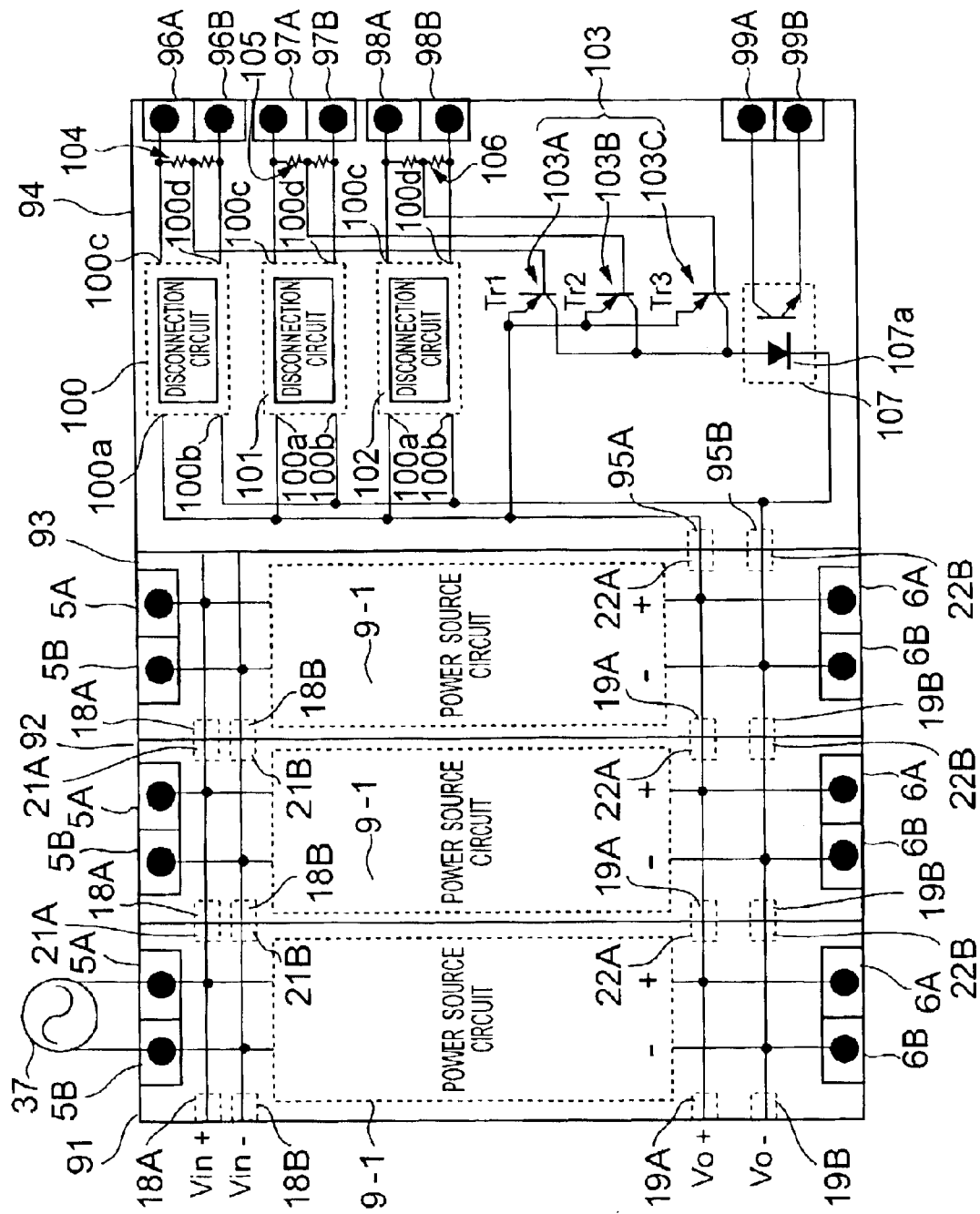
FIG. 8 is a configuration explanatory diagram of a power source apparatus (seventh embodiment) according to the present invention.

A seventh embodiment of a power source apparatus according to the present invention is shown in FIG. 8.

In FIG. 8, numeral 91 is a first power source unit, and numeral 92 is a second power source unit, and numeral 93 is a third power source unit, and numeral 94 is an output abnormal detection unit acting as an additional function unit. Then, connections between the first power source unit 91 and the second power source unit 92 and between the second power source unit 92 and the third power source unit 93 are respectively made by connector connection means to form a module power source.

Then, the first power source unit 91, the second power source unit 92 and the third power source unit 93 in the seventh embodiment of the power source apparatus according to the present invention have the same configurations as those of the first power source unit 51, the second power source unit 52 and the third power source unit 53 in the third embodiment of the power source apparatus according to the present invention described above, and also a connector connection structure between the first power source unit 91 and the second power source unit 92 and a connector connection structure between the second power source unit 92 and the third power source unit 93 have the same configurations as those of a connector connection structure between the first power source unit 51 and the second power source unit 52 and a connector connection structure between the second power source unit 52 and the third power source unit 53 in the third embodiment of the power source apparatus according to the present invention described above, so that the description will be omitted by attaching the same signs.

The output abnormal detection unit 94 has DC input side connectors 95A, 95B, first, second, third DC output terminals 96A, 96B, 97A, 97B, 98A, 98B, alarm output terminals 99A, 99B, first, second, third disconnection circuits 100, 101, 102 and an output abnormal detection circuit 103.

Also, the first, second, third disconnection circuits 100, 101, 102 have input terminal portions 100a, 100b and output terminal portions 100c, 100d.

Also, the output abnormal detection circuit 103 has a first output abnormal detection portion 103A, a second output abnormal detection portion 103B, a third output abnormal detection portion 103C, a first output voltage detection portion 104 for detecting an output voltage between the first DC output terminals 96A, 96B, a second output voltage detection portion 105 for detecting an output voltage between the second DC output terminals 97A, 97B and a third output voltage detection portion 106 for detecting an output voltage between the third DC output terminals 98A, 98B.

Then, the DC input side connector 95A is connected to the respective input terminal portions 100a of the first, second, third disconnection circuits 100, 101, 102, and the DC input side connector 95B is connected to the respective input terminal portions 100b of the first, second, third disconnection circuits 100, 101, 102.

Also, the output terminal portions 100c, 100d of the first disconnection circuit 100 are connected to the first DC output terminals 96A, 96B, and the output terminal portions 100c, 100d of the second disconnection circuit 101 are connected to the second DC output terminals 97A, 97B, and the output terminal portions 100c, 100d of the third disconnection circuit 102 are connected to the third DC output terminals 98A, 98B.

The first, second, third output abnormal detection portions 103A, 103B, 103C of the output abnormal detection circuit 103 are formed of transistors Tr1, Tr2, Tr3, and the emitter sides of these transistors Tr1, Tr2, Tr3 are connected to the DC input side connector 95A, and the base sides of the transistors Tr1, Tr2, Tr3 are connected to the first, second, third output voltage detection portions 104, 105, 106. Also, the collector sides of the transistors Tr1, Tr2, Tr3 are connected to the DC input side connector 95B through a light emitting diode 107a of a photocoupler 107. The output side of the photocoupler 107 is connected to the alarm output terminals 99A, 99B.

Then, the first, second, third power source units 91, 92, 93 and the output abnormal detection unit 94 are mounted on a DIN rail (not shown) and are connected in parallel in this order.

That is, connections between the first power source unit 91 and the second power source unit 92 and between the second power source unit 92 and the third power source unit 93 are made in this order by connecting the AC output side connectors 21A, 21B to the AC input side connectors 18A, 18B and connecting the DC output side connectors 22A, 22B to the DC input side connectors 19A, 19B.

Therefore, the individual AC input bus lines (Vin+), (Vin−) and DC output bus lines (Vo+), (Vo−) of the first, second, third power source units 91, 92, 93 are respectively unified with the bus lines range in this order.

Then, a connection between the third power source unit 93 and the output abnormal detection unit 94 is mutually made by connecting the DC output side connectors 22A, 22B to the DC input side connectors 95A, 95B.

Also, an external commercial AC power source 37 is connected to AC input terminals 5A, 5B of the first power source unit 91, and alarm means such as a buzzer (not shown) is connected to the alarm output terminals 99A, 99B of the output abnormal detection unit 94.

Next, an operation of the power source apparatus formed as mentioned above will be described.

As a result of supplying an AC inputted from the AC input terminals 5A, 5B of the first power source unit 91 to each of the second, third power source units 92, 93, a DC can be outputted individually from each of not only DC output terminals 6A, 6B of the first power source unit 91 but also DC output terminals 6A, 6B of the second, third power source units 92, 93.

Also, the AC inputted from the AC input terminals 5A, 5B of the first power source unit 91 is converted into a DC through a power source circuit 9-1 of each of the power source units 91, 92, 93 and thereafter is supplied to the output abnormal detection unit 94 and the DC is outputted to the first, second, third DC output terminals 96A, 96B, 97A, 97B, 98A, 98B of this output abnormal detection unit 94.

For example, a load (not shown) is connected to the first, second, third DC output terminals 96A, 96B, 97A, 97B, 98A, 98B, respectively and, for example, when output abnormality occurs in loads of the first DC output terminals 96A, 96B, a detection signal (voltage) is generated in the first output voltage detection portion 104 and this detection signal (voltage) is applied to the base side of the transistor Tr1 of the first output abnormal detection portion 103A.

As a result of this, a current is passed through the light emitting diode 107a of the photocoupler 107 and an alarm signal is sent from the output side of the photocoupler 107 to the alarm output terminals 99A, 99B and alarm means issues an alarm. Also, by changing this alarm means to display means, an abnormal state is displayed to ensure a safe state.

In accordance with the seventh embodiment of the power source apparatus according to the present invention described above, a power source apparatus with a saving in wiring, large noise immunity and an output abnormal detection function can be achieved by respectively connecting bus lines for connecting the first, second, third power source units 91, 92, 93, that is, the AC input bus lines (Vin+), (Vin−) and the DC output bus lines (Vo+), (Vo−) through connectors to form a module power source and connecting the output abnormal detection unit 94 to this module power source through a connector to add the output abnormal detection unit 94.

Then, when it is detected that at least one output is abnormal, a signal output or display is performed, so that a safe state can be ensured and also an arbitrary output abnormal value can be set every each output.

The seventh embodiment of the power source apparatus according to the present invention described above is constructed so that the first, second, third power source units 91, 92, 93 and the output abnormal detection unit 94 are connected in parallel on the DIN rail in this order, but the power source apparatus according to the present invention may be constructed so as to connect the output abnormal detection unit 94 to the first power source unit 91 through a connector.

Also, in the seventh embodiment of the power source apparatus according to the present invention described above, the external commercial AC power source 37 is connected to the AC input terminals 5A, 5B of the first power source unit 91, but the external commercial AC power source 37 may be connected to any power source unit.

(Eighth Embodiment)

Figure 9:
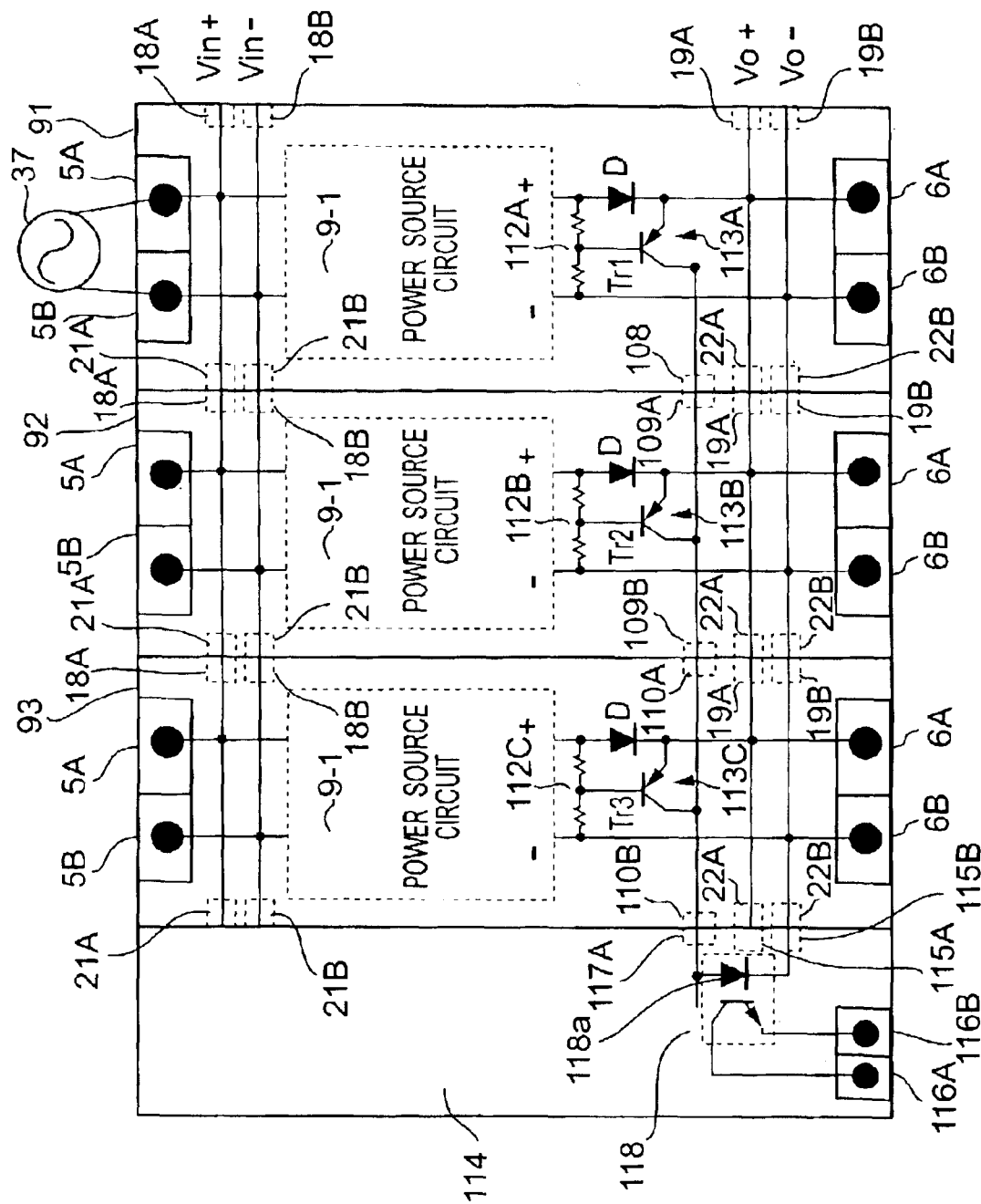
FIG. 9 is a configuration explanatory diagram of a power source apparatus (eighth embodiment) according to the present invention.

An eighth embodiment of a power source apparatus according to the present invention is shown in FIG. 9.

The eighth embodiment of the power source apparatus according to the present invention is constructed so that an output voltage detection portion and an output abnormal detection portion are respectively provided in the first, second, third power source units 91, 92, 93 in the seventh embodiment of the power source apparatus according to the present invention described above and an alarm output unit for outputting an alarm (output abnormality) is added as an additional function unit.

In this case, the first power source unit 91 is provided with a signal output side connector 108, and the second power source unit 92 is provided with a signal input side connector 109A and a signal output side connector 109B, and the third power source unit 93 is provided with a signal input side connector 110A and a signal output side connector 110B.

Then, the output sides (+ side) of power source circuits 9-1 of the first, second, third power source units 91, 92, 93 are connected to a DC output bus line (Vo+) through diodes D. Then, the output sides of the power source circuits 9-1 of the first, second, third power source units 91, 92, 93 are provided with first, second, third output voltage detection portions 112A, 112B, 112C and first, second, third output abnormal detection portions 113A, 113B, 113C. Then, the first, second, third output abnormal detection portions 113A, 113B, 113C are formed of transistors Tr1, Tr2, Tr3.

In the first power source unit 91, the output side of the first output voltage detection portion 112A is connected to the base side of the transistor Tr1 and the emitter side of the transistor Tr1 is connected to the cathode side of the diode D and the collector side of the transistor Tr1 is connected to the signal output side connector 108.

Also, in the second power source unit 92, the output side of the second output voltage detection portion 112B is connected to the base side of the transistor Tr2 and the emitter side of the transistor Tr2 is connected to the cathode side of the diode D and the collector side of the transistor Tr2 is connected to the signal input side connector 109A and the signal output side connector 109B.

Also, in the third power source unit 93, the output side of the third output voltage detection portion 112C is connected to the base side of the transistor Tr3 and the emitter side of the transistor Tr3 is connected to the cathode side of the diode D and the collector side of the transistor Tr3 is connected to the signal input side connector 110A and the signal output side connector 110B.

An alarm output unit 114 has DC input side connectors 115A, 115B, alarm output terminals 116A, 116B, a signal input side connector 117A and a photocoupler 118, and the anode side of a light emitting diode 118a of the photocoupler 118 is connected to the signal input side connector 117A, and the cathode side of the light emitting diode 118a is connected to the DC input side connector 115B. The output side of the photocoupler 118 is connected to the alarm output terminals 116A, 116B.

Then, the first, second, third power source units 91, 92, 93 and the alarm output unit 114 are mounted on a DIN rail (not shown) and are connected in parallel in this order.

That is, connections between the first power source unit 91 and the second power source unit 92 and between the second power source unit 92 and the third power source unit 93 are made in this order by connecting the AC output side connectors 21A, 21B to the AC input side connectors 18A, 18B and connecting the DC output side connectors 22A, 22B to the DC input side connectors 19A, 19B.

Therefore, the individual AC input bus lines (Vin+), (Vin−) and DC output bus lines (Vo+), (Vo−) of the first, second, third power source units 91, 92, 93 are respectively unified with the bus lines range in this order.

Also, the signal input side connector 109A of the second power source unit 92 is connected to the signal output side connector 108 of the first power source unit 91, and the signal input side connector 110A of the third power source unit 93 is connected to the signal output side connector 109B of the second power source unit 92.

Therefore, the individual collector sides of the transistors Tr1, Tr2, Tr3 of the first, second, third power source units 91, 92, 93 are ranged in this order and are unified as a second bus line.

Then, a connection between the third power source unit 93 and the alarm output unit 114 is mutually made by connecting the DC output side connectors 22A, 22B to the DC input side connectors 115A, 115B, and the signal input side connector 117A of the alarm output unit 114 is connected to the signal output side connector 110B of the third power source unit 93.

Also, an external commercial AC power source 37 is connected to AC input terminals 5A, 5B of the first power source unit 91, and alarm means such as a buzzer or display means (both not shown) is connected to the alarm output terminals 116A, 116B of the alarm output unit 114.

Next, an operation of the power source apparatus formed as mentioned above will be described.

As a result of supplying an AC inputted from the AC input terminals 5A, 5B of the first power source unit 91 to each of the second, third power source units 92, 93, a DC can be outputted individually from each of not only DC output terminals 6A, 6B of the first power source unit 91 but also DC output terminals 6A, 6B of the second, third power source units 92, 93.

Then, for example, when output abnormality occurs in the first power source unit 91, a detection signal (voltage) is generated in the first output voltage detection portion 112A and this detection signal (voltage) is applied to the base side of the transistor Tr1 of the first output abnormal detection portion 113A.

As a result of this, a current is passed through the light emitting diode 118a of the photocoupler 118 and an alarm signal is sent from the output side of the photocoupler 118 to the alarm output terminals 116A, 116B and alarm means issues an alarm. Also, by changing this alarm means to display means, an abnormal state is displayed to ensure a safe state.

The eighth embodiment of the power source apparatus according to the present invention described above is constructed so that the alarm output unit 114 and the third, second, first power source units 93, 92, 91 are connected in parallel on the DIN rail in this order, but the power source apparatus according to the present invention may be constructed so as to connect the alarm output unit 114 to the first power source unit 91 through a connector.

Also, in the eighth embodiment of the power source apparatus according to the present invention described above, the external commercial AC power source 37 is connected to the AC input terminals 5A, 5B of the first power source unit 91, but the external commercial AC power source 37 may be connected to any power source unit.

In accordance with the eighth embodiment of the power source apparatus according to the present invention described above, when it is detected that at least one output of the first, second, third power source units 91, 92, 93 is abnormal, a signal output or display is performed, so that a safe state can be ensured and also an arbitrary output abnormal value can be set every each output.

(Ninth Embodiment)

Figure 11:
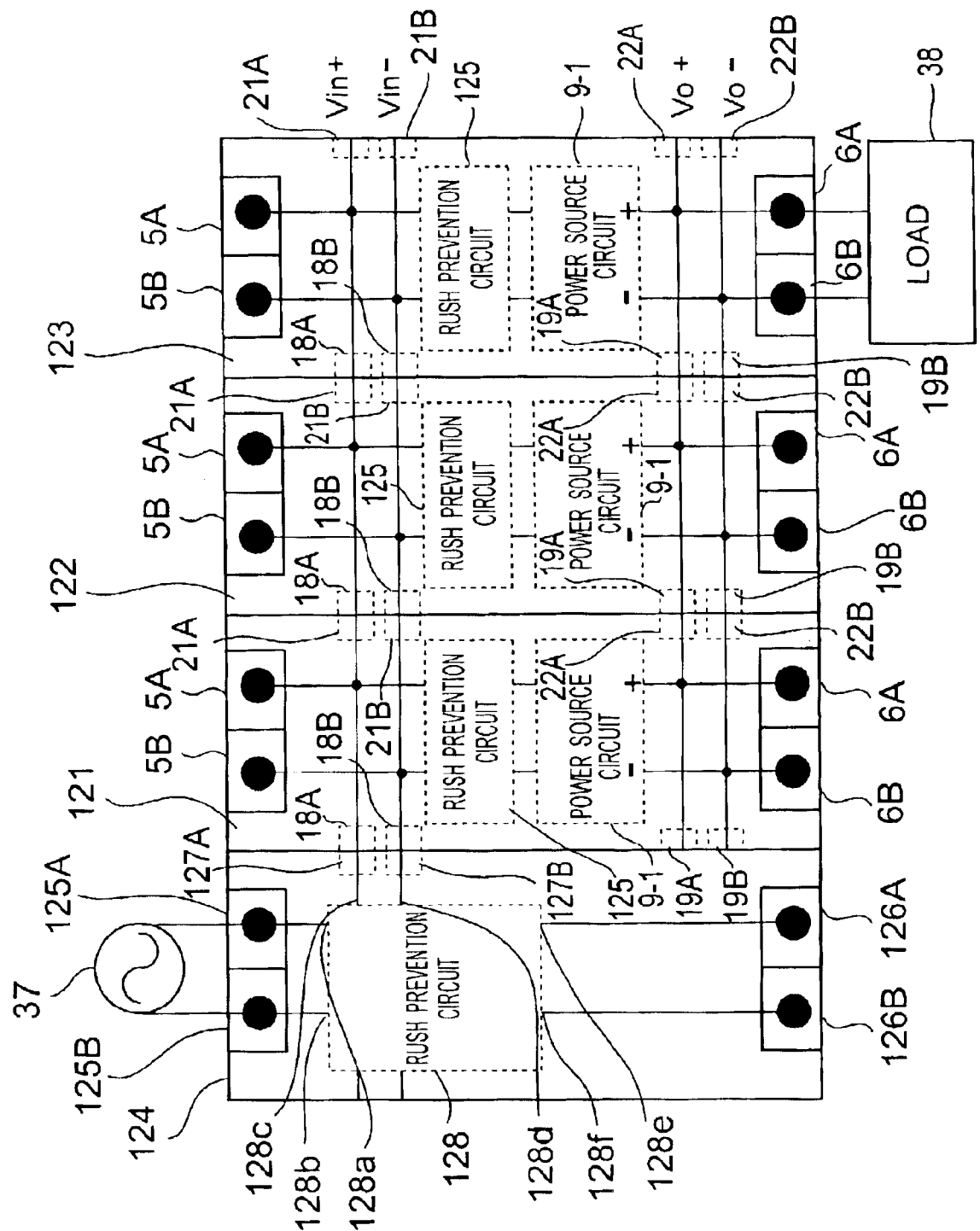
FIG. 11 is a configuration explanatory diagram of a power source apparatus (ninth embodiment) according to the present invention.

A ninth embodiment of a power source apparatus according to the present invention is shown in FIG. 11.

Figure 10:
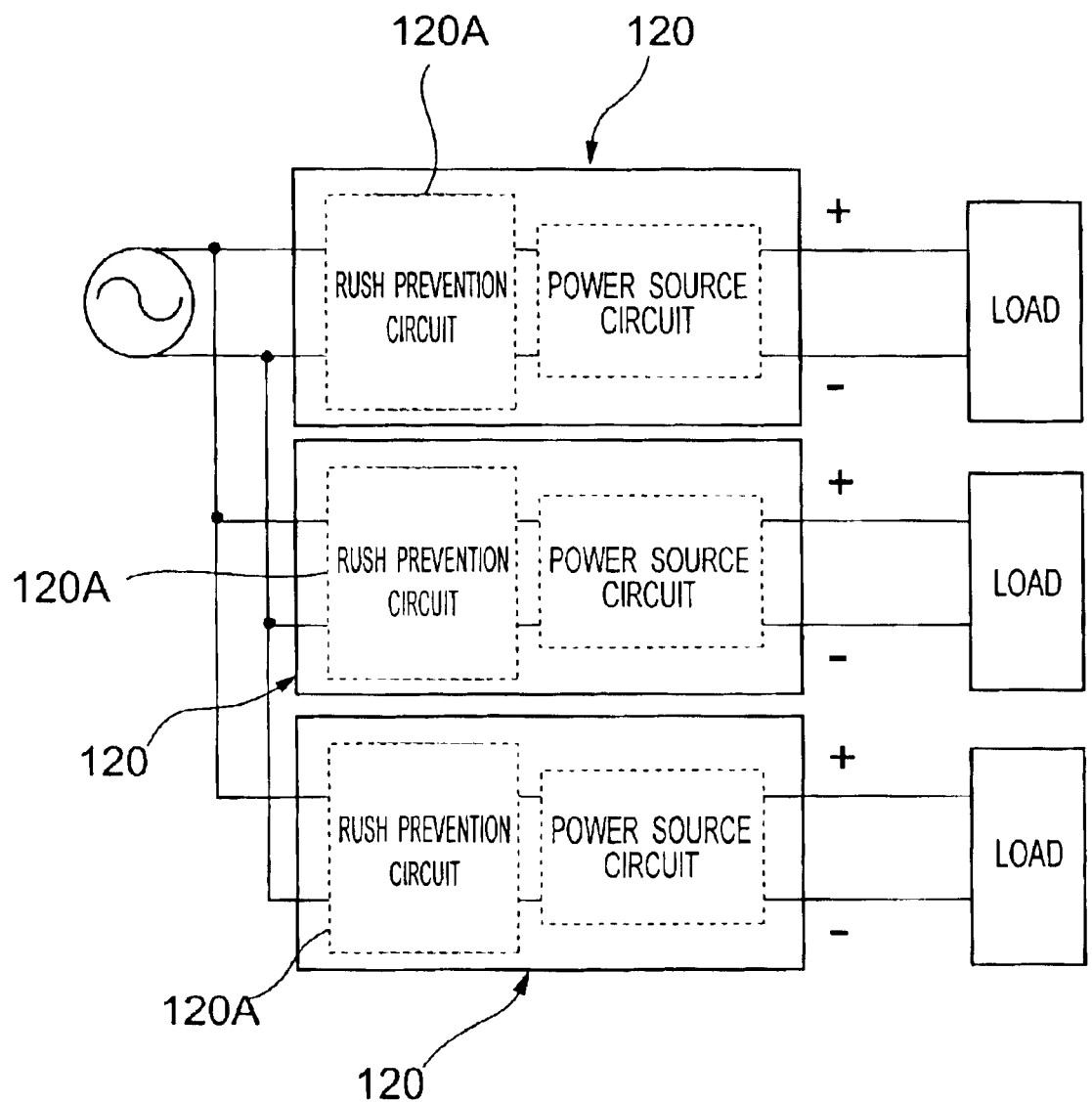
FIG. 10 is an explanatory diagram of a system configuration of plural power source apparatuses having a rush current prevention circuit.

As shown in FIG. 10, a rush current prevention circuit (rush prevention circuit) 120 A for suppressing a rush current per one apparatus to 25A/50A (100V/200V) irrespective of an output capacity is generally built into a power source apparatus 120. As a result of this, in the case of connecting N units of the power source apparatuses 120, a rush current N times flows.

Therefore, in the case of using plural units of the power source apparatuses 120, equipment with large surge current immunity must be used even when a necessary electric power capacity is small. This has a similar problem irrespective of one unit of a power source apparatus viewed from a user even in the case of power source apparatuses for implementing an arbitrary capacity by combining plural units of power source apparatuses with a relatively small capacity.

The ninth embodiment of the power source apparatus according to the present invention is implemented in view of such a conventional problem, and is constructed so as to solve the above problem by adding a circuit for preventing a rush current in the whole system of the power source apparatus aside from a built-in rush prevention circuit of each the power source apparatus (power source unit).

As shown in FIG. 11, the ninth embodiment of the power source apparatus according to the present invention provides a first power source unit 121, a second power source unit 122, a third power source unit 123 and a rush prevention unit 124 acting as an additional function unit. Then, connections between the first power source unit 121 and the second power source unit 122 and between the second power source unit 122 and the third power source unit 123 are respectively made by connector connection means to form a module power source.

Then, the first power source unit 121, the second power source unit 122 and the third power source unit 123 in the ninth embodiment of the power source apparatus according to the present invention has a configuration in which a built-in rush prevention circuit 125 is placed in the input side of a power source circuit 9-1 in the first power source unit 41, the second power source unit 42 and the third power source unit 43 in the second embodiment of the power source apparatus according to the present invention described above, and also a connector connection structure between the first power source unit 121 and the second power source unit 122 and a connector connection structure between the second power source unit 122 and the third power source unit 123 have the same configurations as those of a connector connection structure between the first power source unit 41 and the second power source unit 42 and a connector connection structure between the second power source unit 42 and the third power source unit 43 in the second embodiment of the power source apparatus according to the present invention described above, so that the description will be omitted by attaching the same signs.

The rush prevention unit 124 has AC input terminals 125A, 125B, output side terminals 126A, 126B, AC output side connectors 127A, 127B and a rush prevention circuit 128.

The rush prevention circuit 128 has input terminal portions 128a, 128b and output terminal portions 128c, 128d, 128e, 128f. Then, the input terminal portions 128a, 128b of the rush prevention circuit 128 are connected to the AC input terminals 125A, 125B, and the output terminal portions 128c, 128d are connected to the AC output side connectors 127A, 127B, and the output terminal portions 128e, 128f are connected to the output side terminals 126A, 126B. Then, the rush prevention unit 124 and the first, second, third power source units 121, 122, 123 are mounted on a DIN rail (not shown) and are connected in parallel in this order.

That is, in the right neighborhood of the rush prevention unit 124, the first, second, third power source units 121, 122, 123 are placed in this order, and the AC output side connectors 127A, 127B of the rush prevention unit 124 are connected to the AC input side connectors 21A, 21B of the first power source unit 121.

Therefore, the individual AC input bus lines (Vin+), (Vin−) of the rush prevention unit 124 and the first, second, third power source units 121, 122, 123 are unified with the bus lines range in this order, and the individual DC output bus lines (Vo+), (Vo−) of the first, second, third power source units 121, 122, 123 are respectively unified with the bus lines range in this order.

Then, an external commercial AC power source 37 is connected to the AC input terminals 125A, 125B of the rush prevention unit 124, and a load 38 is connected to the DC output terminals 6A, 6B of the third power source unit 123.

Next, an operation of the power source apparatus formed as mentioned above will be described.

As a result of supplying an AC power source inputted from the AC input terminals 125A, 125B of the rush prevention unit 124 to each of the first, second, third power source units 121, 122, 123 through the rush prevention circuit 128, a DC can be outputted individually from each of the DC output terminals 6A, 6B of the first, second, third power source units 121, 122, 123 and the DC can be supplied to the load 38.

In this case, when using the first, second, third power source units 121, 122, 123 in combination, input is done to the first, second, third power source units 121, 122, 123 via the rush prevention unit 124 added newly from the commercial AC power source 37, so that the same rush current value as that of the case of using one power source unit can be achieved even when using the first, second, third power source units 121, 122, 123. Therefore, equipment with small surge current immunity can be used.

Figure 12:
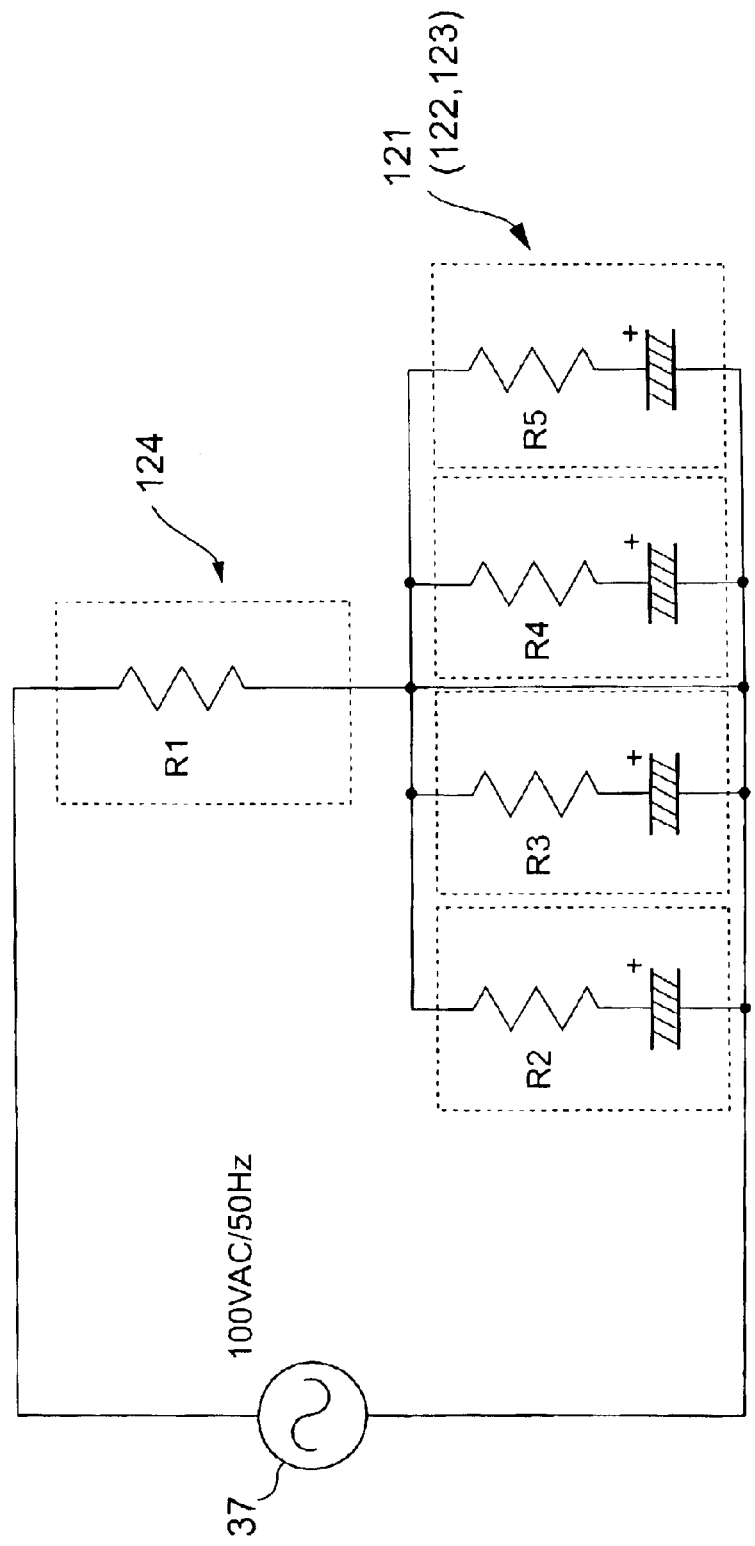
FIG. 12 is an equivalent circuit diagram of the power source apparatus (ninth embodiment)

Incidentally, an impedance necessary for the rush prevention unit 124 will be described using FIG. 12 (connection of four power source units).

In the case of suppressing a rush current to 25 A or less in the whole system of the power source apparatus, the necessary impedance is 5.7Ω or more ($=\sqrt{2} \times 100\text{V}/25$ A), so that it is set to 10Ω. The case that an impedance of a built-in rush prevention circuit of each the power source unit is also 10Ω (=R2=R3=R4=R5) is assumed. In this case, the impedance necessary for the rush prevention unit becomes R1=10Ω−10Ω/4=7.5Ω.

Incidentally, the ninth embodiment of the power source apparatus according to the present invention described above is constructed so that the rush prevention unit 124 and the first, second, third power source units 121, 122, 123 are connected in parallel on the DIN rail in this order, but the power source apparatus according to the present invention may be constructed so as to connect the rush prevention unit 124 to the third power source unit 123.

In accordance with the ninth embodiment of the power source apparatus according to the present invention described above, a power source apparatus with a saving in wiring, large noise immunity and a function of preventing a rush current in the whole system can be achieved by respectively connecting bus lines for connecting the first, second, third power source units 121, 122, 123, that is, the AC input bus lines (Vin+), (Vin−) and the DC output bus lines (Vo+), (Vo−) through connectors to form a module power source and connecting the rush prevention unit 124 to this module through a connector to add the rush prevention unit 124.

Also, by adding a circuit for preventing a rush current in the whole system of the power source apparatus aside from a built-in rush prevention circuit of each the power source unit, even when using the first, second, third power source units 121, 122, 123, the same rush current value as that of the case of using one power source unit can be achieved and equipment with small surge current immunity can be used.

Figure 13:
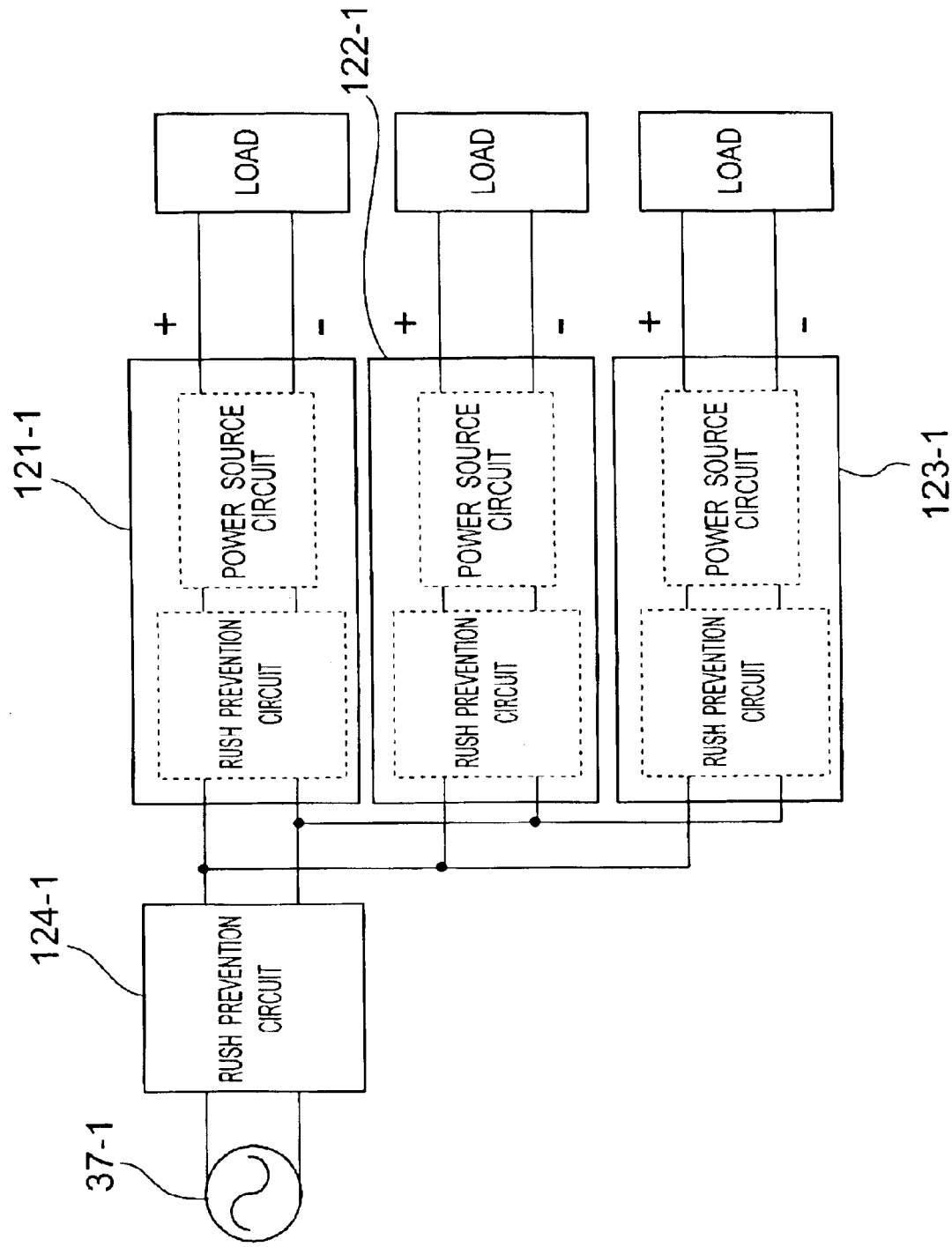
FIG. 13 is an explanatory diagram of the case of adding a rush current prevention apparatus to the system configuration of the plural power source apparatuses having the rush current prevention circuit.

In a power source system shown in FIG. 13, first, second, third power source apparatuses 121-1, 122-1, 123-1 are not connected through connectors and are independent, and in the case of using these first, second, third power source apparatuses 121-1, 122-1, 123-1 in combination, the system is constructed so that input is done to the first, second, third power source apparatuses 121-1, 122-1, 123-1 via a rush prevention apparatus 124-1 added newly from a commercial AC power source 37-1.

In this case, even when using the first, second, third power source apparatuses 121-1, 122-1, 123-1, the same rush current value as that of the case of using one power source apparatus can be achieved and equipment with small surge current immunity can be used.

Figure 14:
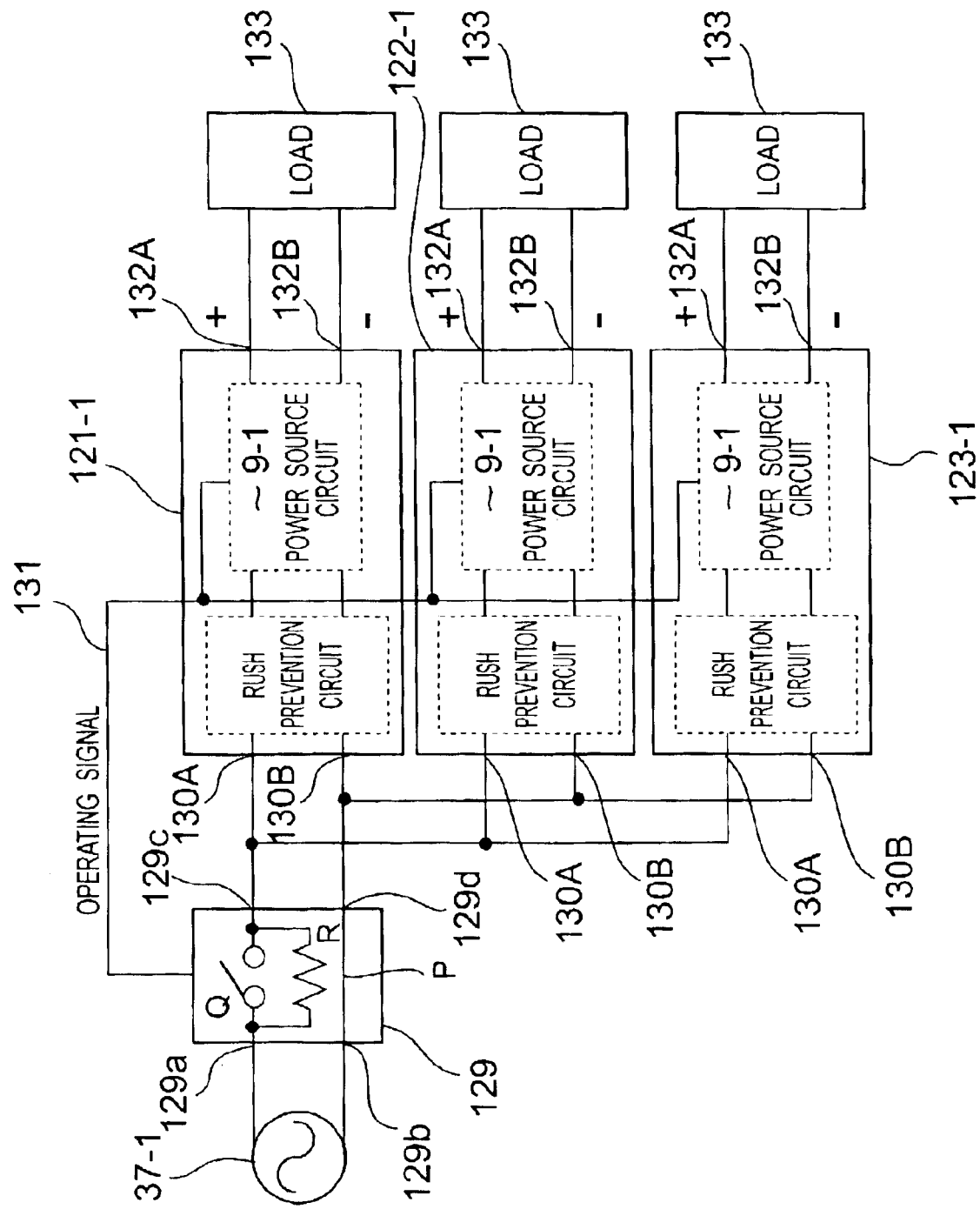
FIG. 14 is an explanatory diagram of the case of adding a rush current prevention apparatus to the system configuration of the plural power source apparatuses having the rush current prevention circuit.

A power source system shown in FIG. 14 provides independent first, second, third power source apparatuses 121-1, 122-1, 123-1 without connector connection and a rush prevention apparatus 129, and this rush prevention apparatus 129 has input terminal portions 129*a*, 129*b* and output terminal portions 129*c*, 129*d*, and the input terminal portion 129*a* is connected to the output terminal portion 129*c* through a resistor R, and a switch element (semiconductor switch) Q is connected in parallel with this resistor R. Also, the input terminal portion 129*b* is connected to the output terminal portion 129*d* through wiring P.

Then, the input terminal portions 129*a*, 129*b* of the rush prevention apparatus 129 are connected to a commercial AC power source 37-1, and the output terminal portions 129*c*, 129*d* of the rush prevention apparatus 129 are respectively connected to AC input terminals 130A, 130B of the first, second, third power source apparatuses 121-1, 122-1, 123-1. Also, it is constructed so that a signal circuit 131 is derived from power source circuits 9-1 of the first, second, third power source apparatuses 121-1, 122-1, 123-1 and the switch element Q of the rush prevention apparatus 129 is turned on by a control signal from this signal circuit 131. Also, loads 133 are connected to DC output terminals 132A, 132B of the first, second, third power source apparatuses 121-1, 122-1, 123-1.

Therefore, a rush current is prevented by being constructed so that input is done to the first, second, third power source apparatuses 121-1, 122-1, 123-1 via the resistor R of the rush prevention apparatus 129 added newly from the commercial AC power source 37-1. Then, when at least one of the first, second, third power source apparatuses 121-1, 122-1, 123-1 operate, the switch element Q of the rush prevention apparatus 129 is turned on by the control signal from the signal circuit 131 and an AC power source from the commercial AC power source 37-1 is inputted to the first, second, third power source apparatuses 121-1, 122-1, 123-1 via the switch element Q.

Figure 15:
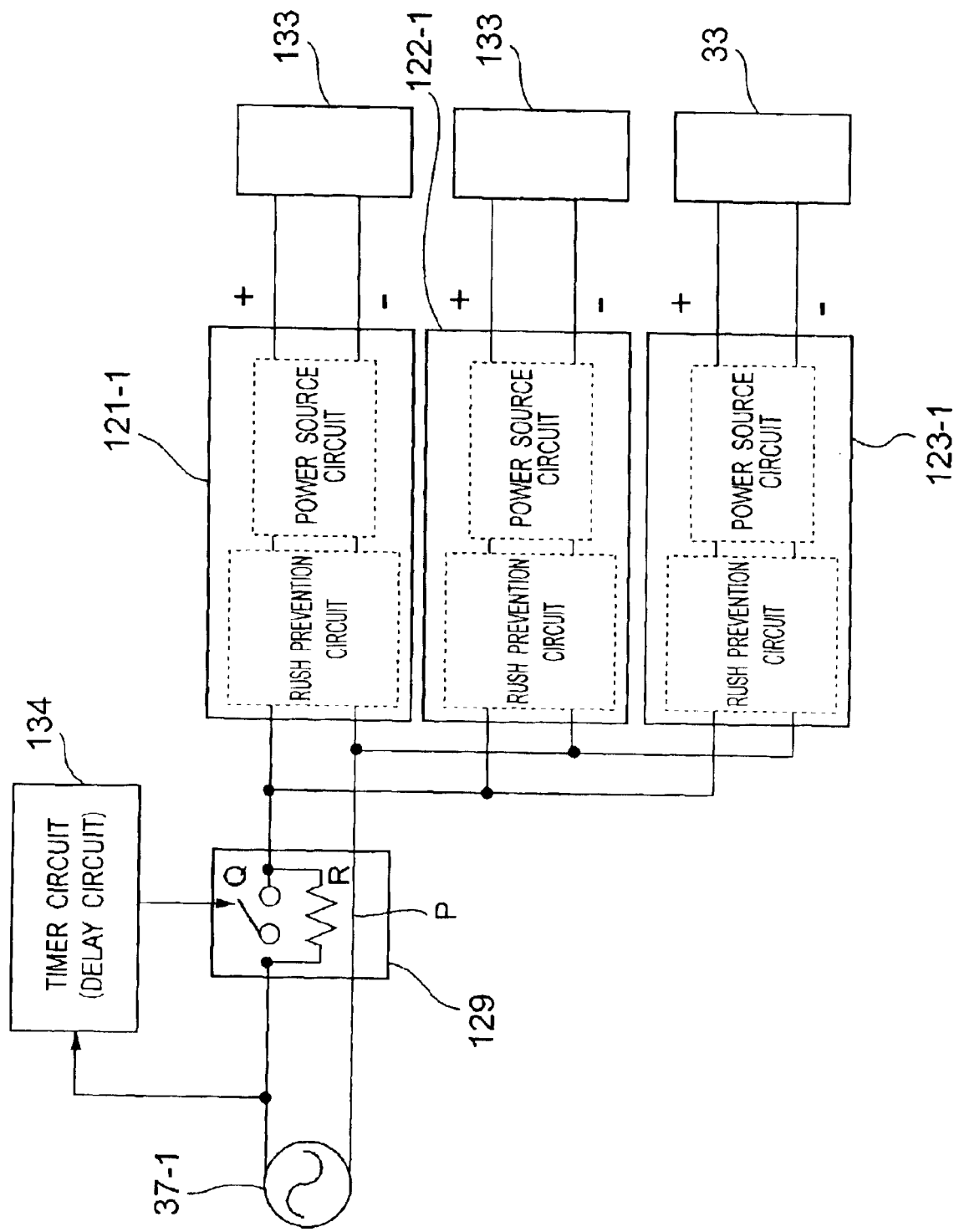
FIG. 15 is an explanatory diagram of the case of adding a rush current prevention apparatus to the system configuration of the plural power source apparatuses having the rush current prevention circuit.

Also, a power source system shown in FIG. 15 is constructed so that the signal circuit 131 is eliminated in the power source system shown in FIG. 14 and instead, after turning on a commercial power source, a switch element Q is turned on after a lapse of the time preset by a timer circuit (delay circuit) 132 and an AC power source from a commercial AC power source 37-1 is inputted to first, second, third power source apparatuses 121-1, 122-1, 123-1 via the switch element Q, and other configurations are equal to those of the power source system shown in FIG. 14, so that the description will be omitted by attaching the same signs.

(Tenth Embodiment)

Figure 16:
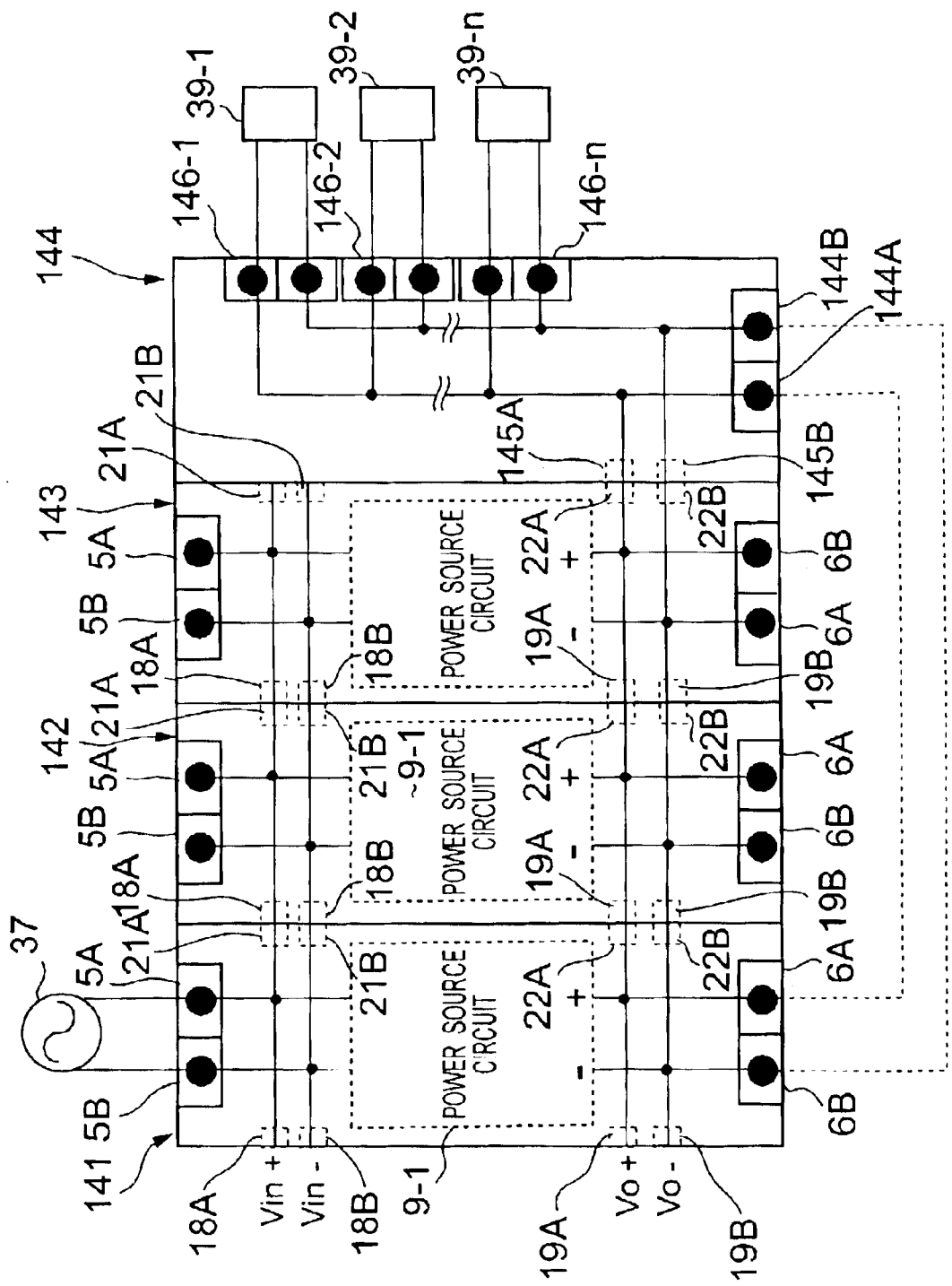
FIG. 16 is a configuration explanatory diagram of a power source apparatus (tenth embodiment) according to the present invention.
Figure 17:
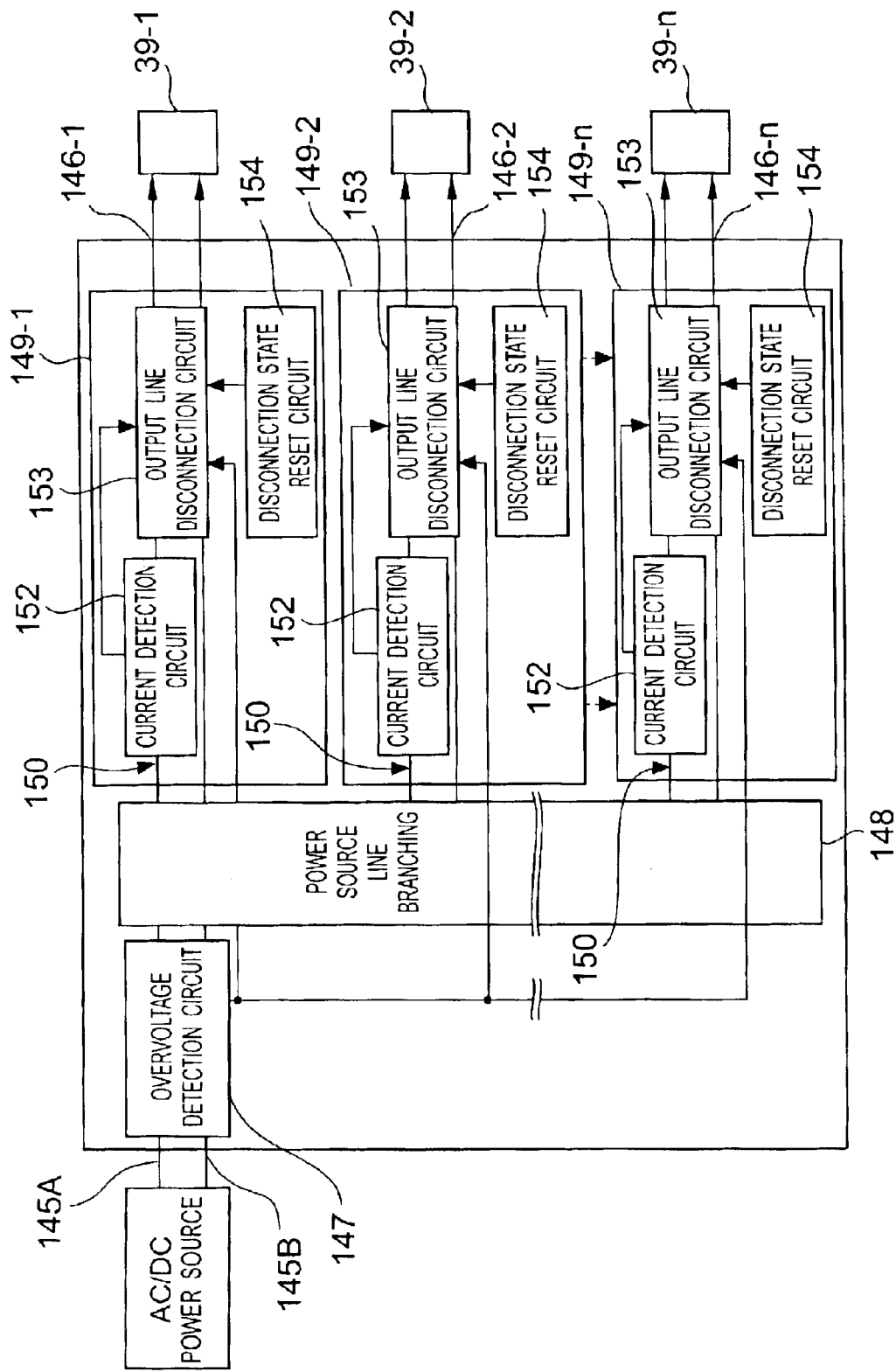
FIG. 17 is a configuration explanatory diagram of a branching unit in the power source apparatus (tenth embodiment)
Figure 18:
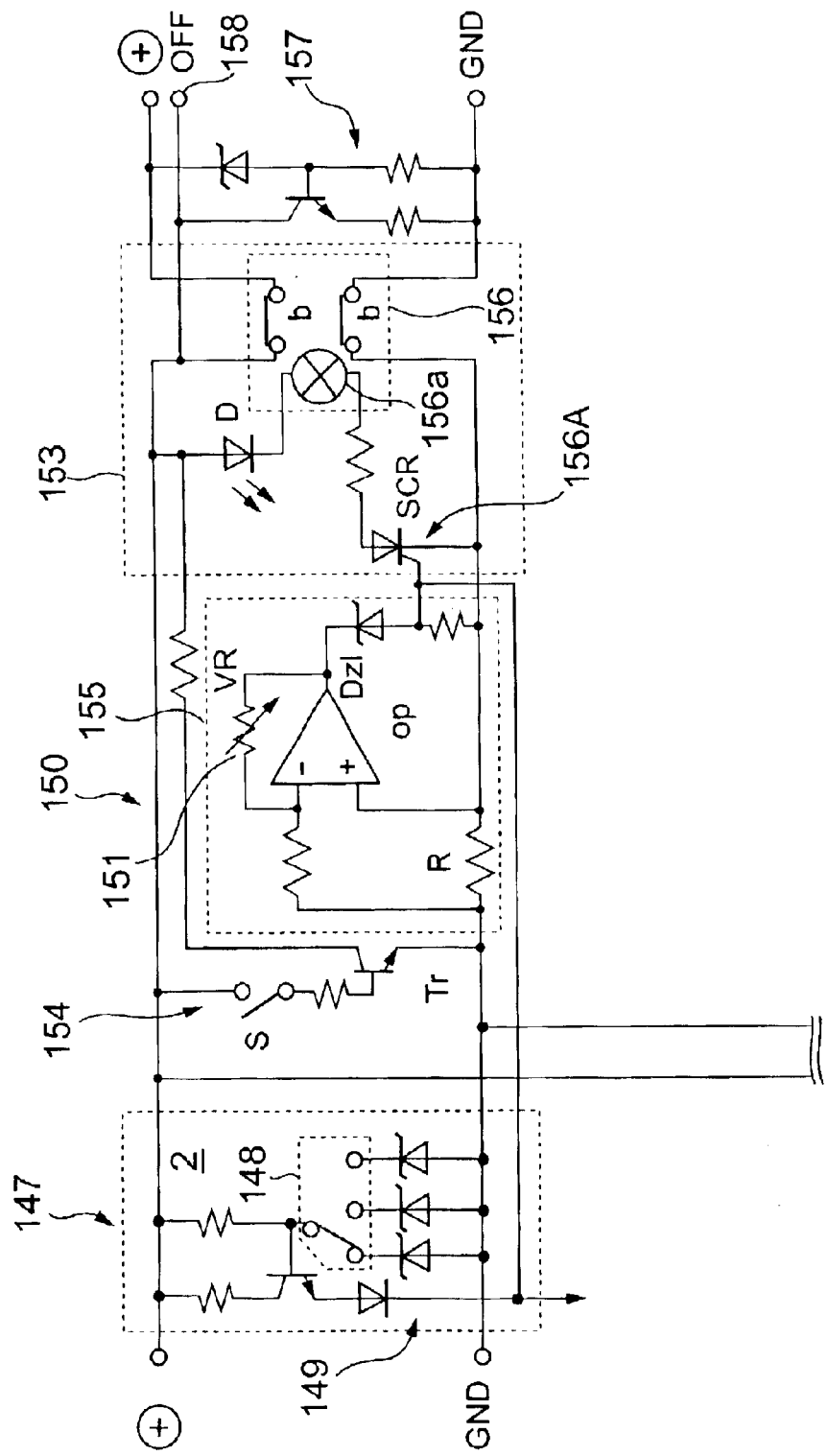
FIG. 18 is a configuration explanatory diagram of a branching circuit of the branching unit.

A tenth embodiment of a power source apparatus according to the present invention is shown in FIGS. 16 to 18.

Electric power in which AC/DC conversion is made by a switching power source etc. is often supplied to plural loads (devices) particularly in the case of a power source apparatus with a high capacity. In this case, when a problem occurs in one load, an influence on all of the loads to which the electric power is supplied from the power source apparatus cannot be avoided.

Thus, it is constructed so that wiring is branched into plural portions from an output terminal of the power source apparatus in order not to exert an influence on all of the plural loads supplied from the power source apparatus and safety devices such as a fuse or a breaker are incorporated into the respective wirings and even when a problem occurs in one load in the case of being supplied from one power source apparatus to plural loads, an influence is suppressed on only the load and the other loads can operate without problems.

However, in this case, an increase in the number of wirings, an installation place of plural safety devices, selection of safety devices and system design are rendered difficult, and become factors in increasing time and cost. Further, when plural protection functions have and a function etc. of outputting an abnormal state are necessary, it is necessary to build a complicated system.

In the tenth embodiment of the power source apparatus according to the present invention, when branching of output is required, wiring can be easily performed and plural protection functions are integrated with a function capable of outputting an abnormal state and more safety and maintainability can be improved and further the whole system can be miniaturized.

That is, in the tenth embodiment of the power source apparatus according to the present invention, a function of making connection to an output of a module power source and having terminals capable of branching its output into plural portions and detecting an output current flowing through the branched terminal and disconnecting a load connected to the terminal and a supply line of the module power source when the output current reaches a certain setting value, a function of detecting an overvoltage from the module power source and disconnecting the supply line of the module power source similarly, a function capable of reporting abnormal states of current or voltage, and a function capable of manually releasing line disconnection in these abnormal states are integrated and become united.

As shown in FIG. 16, the tenth embodiment of the power source apparatus according to the present invention provides a first power source unit 141, a second power source unit 142, a third power source unit 143 and a branching unit 144 acting as an additional function unit. Then, connections between the first power source unit 141 and the second power source unit 142 and between the second power source unit 142 and the third power source unit 143 are respectively made by connector connection means to form a module power source.

Then, the first power source unit 141, the second power source unit 142 and the third power source unit 143 in the tenth embodiment of the power source apparatus according to the present invention have the same configurations as those of the first power source unit 51, the second power source unit 52 and the third power source unit 53 in the third embodiment of the power source apparatus according to the present invention described above, and also a connector connection structure between the first power source unit 141 and the second power source unit 142 and a connector connection structure between the second power source unit 142 and the third power source unit 143 have the same configurations as those of a connector connection structure between the first power source unit 51 and the second power source unit 52 and a connector connection structure between the second power source unit 52 and the third power source unit 53 in the third embodiment of the power source apparatus according to the present invention described above, so that the description will be omitted by attaching the same signs.

The branching unit 144 has DC input side connectors 145A, 145B, first, second, . . . , nth DC output terminals 146-1, 146-2, . . . , 146-n, an overvoltage detection circuit 147, a power source output line branching device 148, first, second, . . . , nth branching circuits 149-1, 149-2, . . . , 149-n and DC input terminals 144A, 144B.

The input side of the overvoltage detection circuit 147 is connected to the DC input side connectors 145A, 145B, and the output side of the overvoltage detection circuit 147 is connected to the input side of the power source output line branching device 148. Then, the input sides of the first, second, . . . , nth branching circuits 149-1, 149-2, . . . , 149-n are connected to each of the output sides of the power source output line branching device 148, and the output sides of the first, second, . . . , nth branching circuits 149-1, 149-2, . . . , 149-n are connected to the corresponding first, second, . . . , nth DC output terminals 146-1, 146-2, . . . , 146-n.

The first, second, . . . , nth branching circuits 149-1, 149-2, . . . , 149-n have a power source output line 150 which is a supply line, respectively, and this power source output line 150 is provided with a current detection circuit 152 having current value setting means 151, an output line disconnection circuit 153 and a disconnection state reset circuit 154.

As shown in FIG. 18, the current detection circuit 152 has a current detection and amplification portion 155 formed by combination of an operational amplifier OP and a current detection resistor R provided in a return circuit of a load current, a Zener diode Dz1 for blocking the passage of current through a gate terminal of a thyristor SCR of a detection current when a voltage exceeds a certain value, and a volume (variable resistor) VR which is the current value setting means 151 provided between an inverse input terminal and an output terminal of the operational amplifier OP.

Also, as shown in FIG. 18, the output line disconnection circuit 153 has a relay 156 with two b-contact structure, a relay driving circuit 156A for exciting a solenoid 156a of the relay 156 by the passage of current through the thyristor SCR to disconnect a relay contact b, and display lamp means formed of a light emitting diode D incorporated into this relay driving circuit 156A.

Also, in the disconnection state reset circuit 154, a manual switch S and a transistor Tr by on operation of this manual switch S are operated and the relay driving circuit 156A is grounded and this relay driving circuit 156A is broken.

Also, the power source output line 150 is provided with an output circuit 157 of an abnormal state. This output circuit 157 outputs an off signal from a detection terminal 158 at the time of disconnection of the power source output line 150 by the relay 156.

Also, the overvoltage detection circuit 147 comprises a changeover switch 148 for setting respectively different three voltage values by a changeover, and a signal output circuit 149 for outputting an overvoltage detection signal to the output line disconnection circuit 153 when an overvoltage exceeding a voltage set by this changeover switch 148 occurs.

Then, the first, second, third power source units 141, 142, 143 and the branching unit 144 are mounted on a DIN rail (not shown) and are connected in parallel in this order.

That is, the branching unit 144 is provided in the right neighborhood of the third power source unit 143, and DC output side connectors 22A, 22B of the third power source unit 143 are connected to the DC input side connectors 145A, 145B of the branching unit 144.

Therefore, the individual DC output bus lines (Vo+), (Vo−) of the first, second, third power source units 141, 142, 143 are unified with the bus lines range in this order, and the DC output bus lines (Vo+), (Vo−) range to the power source output line 150 of the branching unit 144.

Then, an external commercial AC power source 37 is connected to AC input terminals 5A, 5B of the first power source unit 141, and loads 39-1, 39-2, . . . , 39-n are respectively connected to the first, second, . . . , nth DC output terminals 146-1, 146-2, . . . , 146-n of the branching unit 144.

Next, an operation of the power source apparatus formed as mentioned above will be described.

As a result of supplying an AC power source inputted from the AC input terminals 5A, 5B of the first power source unit 141 to each of the second, third power source units 142, 143, a DC can be outputted individually from each of DC output terminals 6A, 6B of the second, third power source units 142, 143.

Also, as a result of converting an AC power source inputted from the AC input terminals 5A, 5B of the first power source unit 141 into a DC through a power source circuit 9-1 of each of the power source units 141, 142, 143 and thereafter supplying the DC to the branching unit 144, the DC is branched by this branching unit 144 and is supplied to the loads 39-1, 39-2, . . . , 39-n connected to the first, second, . . . , nth DC output terminals 146-1, 146-2, . . . , 146-n.

In the branching unit 144, a voltage value is set by a changeover operation of the changeover switch 148 of the overvoltage detection circuit 147 and as a result of this, when an overvoltage exceeding this set voltage occurs, an overvoltage detection signal is outputted from the signal output circuit 149 and this overvoltage detection signal is fed to the gate terminal of the thyristor SCR to operate this thyristor SCR.

By the passage of current through this thyristor SCR, the relay driving circuit 156A operates and the solenoid 156a of the relay 156 is excited and the relay contact b is disconnected and the power source output line 150 is disconnected and supply of a DC to the loads 39-1, 39-2, . . . , 39-n is stopped. At the same time, light of the light emitting diode D incorporated into the relay driving circuit 156A is emitted and the display lamp means illuminates.

Also, when the power source output line 150 is disconnected, the output circuit 157 of an abnormal state operates and an off signal is outputted from the detection terminal 158.

Also, by turning on the manual switch S of the disconnection state reset circuit 154, the transistor Tr is operated and the relay driving circuit 156A is grounded and this relay driving circuit 156A is broken to perform a reset.

In a state in which a voltage set by a changeover in the overvoltage detection circuit 147 is not exceeded, a DC is supplied to the respective power source output lines 150 of the first, second, . . . , nth branching circuits 149-1, 149-2, . . . , 149-n, but when a current flowing through this power source output line 150 exceeds a tolerance value, its current is detected in the current detection circuit 152 and a detection signal (voltage) based on this current is fed to the gate terminal of the thyristor SCR to operate this thyristor SCR.

By the passage of current through this thyristor SCR, the relay driving circuit 156A operates and the solenoid 156a of the relay 156 is excited and the relay contact b is disconnected and the power source output line 150 is disconnected and supply of a DC to the loads 39-1, 39-2, . . . , 39-n is stopped. At the same time, light of the light emitting diode D incorporated into the relay driving circuit 156A is emitted and the display lamp means illuminates.

Also, a tolerance current value can be changed by operating the volume (variable resistor) VR which is the current value setting means 151.

Incidentally, the tenth embodiment of the power source apparatus according to the present invention described above is constructed so that the first, second, third power source units 141, 142, 143 and the branching unit 144 are connected in parallel on the DIN rail in this order, but the power source apparatus according to the present invention may be constructed so as to connect the branching unit 144 to the first power source unit 141 and also connect the external commercial AC power source 37 to any power source unit.

In accordance with the tenth embodiment of the power source apparatus according to the present invention described above, a power source apparatus with a saving in wiring, large noise immunity and a branching function can be achieved by respectively connecting bus lines for connecting the first, second, third power source units 141, 142, 143, that is, the AC input bus lines (Vin+), (Vin−) and the DC output bus lines (Vo+), (Vo−) through connectors to form a module power source and connecting the branching unit 144 to this module power source through a connector to add the branching unit 144.

By unifying the plural protection functions in this manner, troublesome wiring processing is eliminated and a lower-cost and safer branching function can be provided and it can contribute to miniaturization of the whole system.

Incidentally, in the case of connecting the first power source unit 141 to the branching unit 144 without connecting the first, second, third power source units 141, 142, 143 in parallel, the DC output terminals 6A, 6B of the first power source unit 141 are wired to the DC input terminals 144A, 144B of the branching unit 144 as shown by dotted lines of FIG. 16.

(Eleventh Embodiment)

Figure 19:
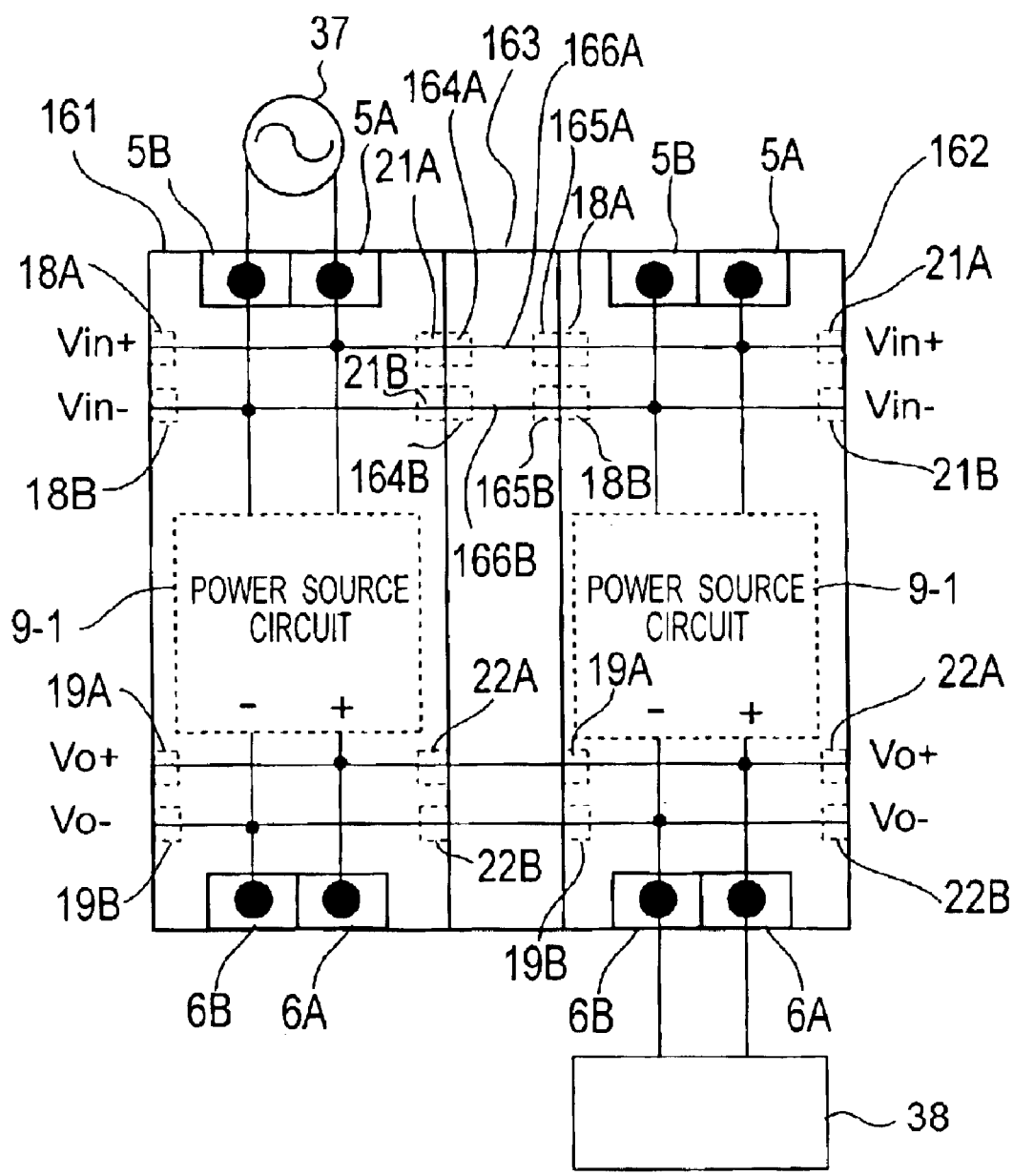
FIG. 19 is a configuration explanatory diagram of a power source apparatus (eleventh embodiment) according to the present invention.
Figure 20:
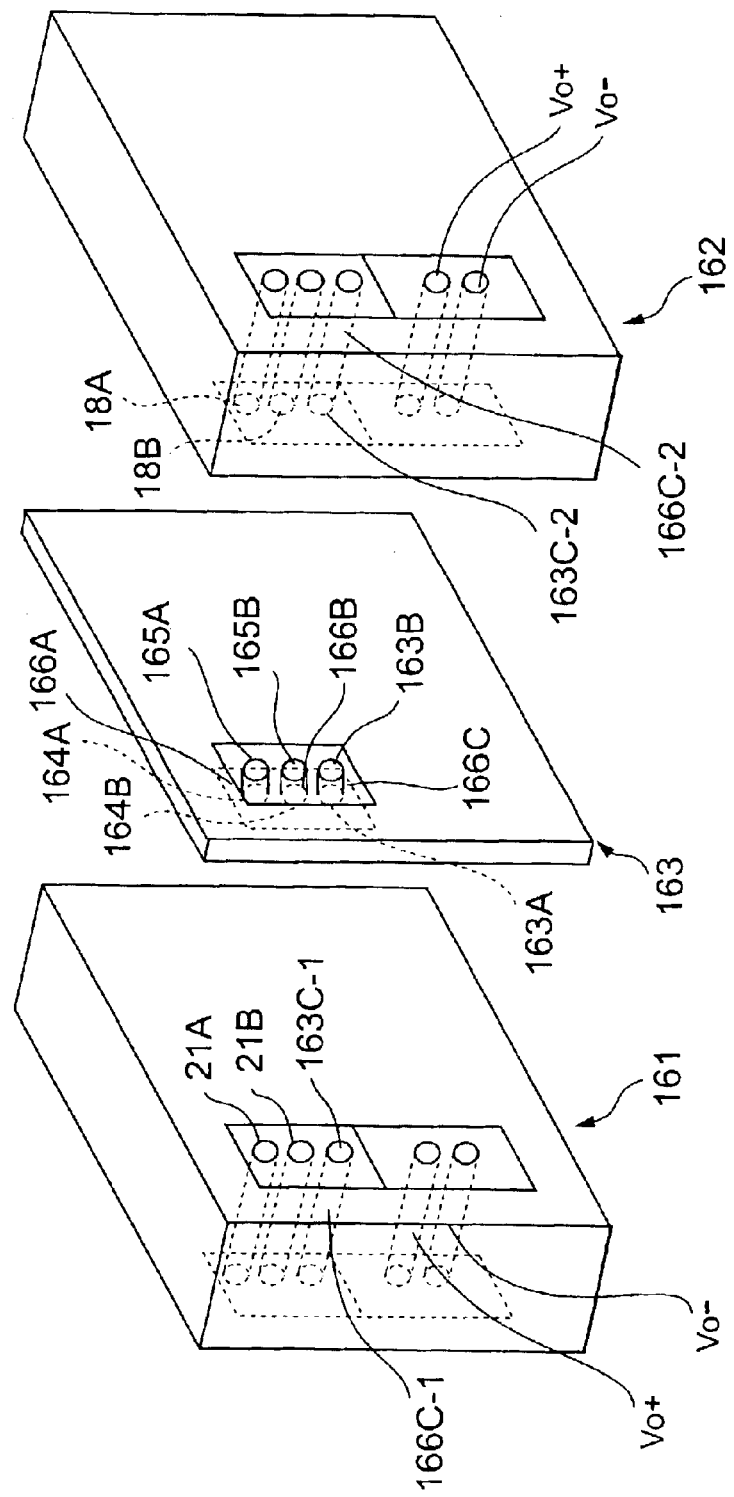
FIG. 20 is an explanatory diagram of an exploded state of the power source apparatus (eleventh embodiment)

An eleventh embodiment of a power source apparatus according to the present invention is shown in FIGS. 19 and 20.

There is a module power source capable of saving wiring between respective power source apparatuses in the case that an input bus line and an output bus line are provided in the respective power source apparatuses and input and output of the respective power source apparatuses can be connected electrically and mechanically through connectors and the respective power source apparatuses are used by parallel running or connecting only an input system, but as a conventional art, three lines of "L", "N" and "FG" were used as an input bus line and two lines of (+) and (−) were used as an output bus line and the bus lines were installed in a common position in any of output systems.

However, in such a conventional structure, when power source apparatuses having different output voltages are connected, there is a possibility that false connection will occur in an output portion since the output bus lines are same.

Thus, a certain kind of processing must be performed in a cabinet so that connection by the output bus lines cannot be made except for a certain one output system. Because of that, there was a problem that there is no need for wiring between the respective power source apparatuses at the time of parallel running in the certain one output system but wiring must be performed between the respective power source apparatuses at the time of parallel running in the other output systems.

The eleventh embodiment of the power source apparatus according to the present invention is implemented in view of such a conventional problem, and the above problem is solved by inserting a separator capable of electrically breaking only output bus lines between power source apparatuses having different output voltages.

As shown in FIG. 19, the eleventh embodiment of the power source apparatus according to the present invention provides a first power source unit 161, a second power source unit 162 and a separator 163 acting as an additional function unit.

Then, the first power source unit 161 and the second power source unit 162 in the eleventh embodiment of the power source apparatus according to the present invention have a configuration in which FG side connectors 163A-1, 163A-2 and bus lines 166C-1, 166C-2 are added to the first power source unit 71 and the second power source unit 72 in the fifth embodiment of the power source apparatus according to the present invention described above and the other configurations are the same, so that the description will be omitted by attaching the same signs.

As shown in FIG. 20, the separator 163 is provided with AC input side connectors 164A, 164B and AC output side connectors 165A, 165B, FG side connectors 163A, 163B, a bus line 166A for making connection between the AC input side connector 164A and the AC output side connector 165A, a bus line 166B for making connection between the AC input side connector 164B and the AC output side connector 165B, and a bus line 166C for making connection between the FG side connectors 163A, 163B. Incidentally, the FG side connectors 163A, 163B and the bus line 166C are not disclosed in FIG. 19.

Then, the first power source unit 161, the separator 163 and the second power source unit 162 are mounted on a DIN rail (not shown) and are connected in parallel in this order.

That is, a connection between the first power source unit 161 and the separator 163 is mutually made by connecting AC output side connectors 21A, 21B of the first power source unit 161 to the AC input side connectors 164A, 164B of the separator 163 and connecting an FG side connector 163C-1 to the FG side connector 163A, and a connection between the separator 163 and the second power source unit 162 is mutually made by connecting the AC output side connectors 165A, 165B of the separator 163 to AC input side connectors 18A, 18B of the second power source unit 162 and connecting the FG side connector 163B to an FG side connector 163C-2.

Then, an external commercial AC power source 37 is connected to AC input terminals 5A, 5B of the first power source unit 161, and a load 38 is connected to DC output terminals 6A, 6B of the second power source unit 162.

Therefore, an AC power source inputted from the AC input terminals 5A, 5B of the first power source unit 161 is supplied to AC input bus lines (Vin+), (Vin−) of the second power source unit 162 through the bus lines 166A, 166B of the separator 163. In this case, DC output bus lines (Vo+), (Vo−) of the first power source unit 161 and DC output bus lines (Vo+), (Vo−) of the second power source unit 162 are electrically broken by the separator 163.

Therefore, in accordance with the eleventh embodiment of the power source apparatus according to the present invention described above, the power source units 161, 162 having different output voltages can be connected mutually without wiring, and also when the power source units 161, 162 having the different output voltages can be connected and parallel running is performed every the power source units 161, 162 having the different output voltages, connection can be made without mutual wiring. Also, plural power source units having input system wiring of only one place and different output voltages can be driven.

(Twelfth Embodiment)

Figure 24:
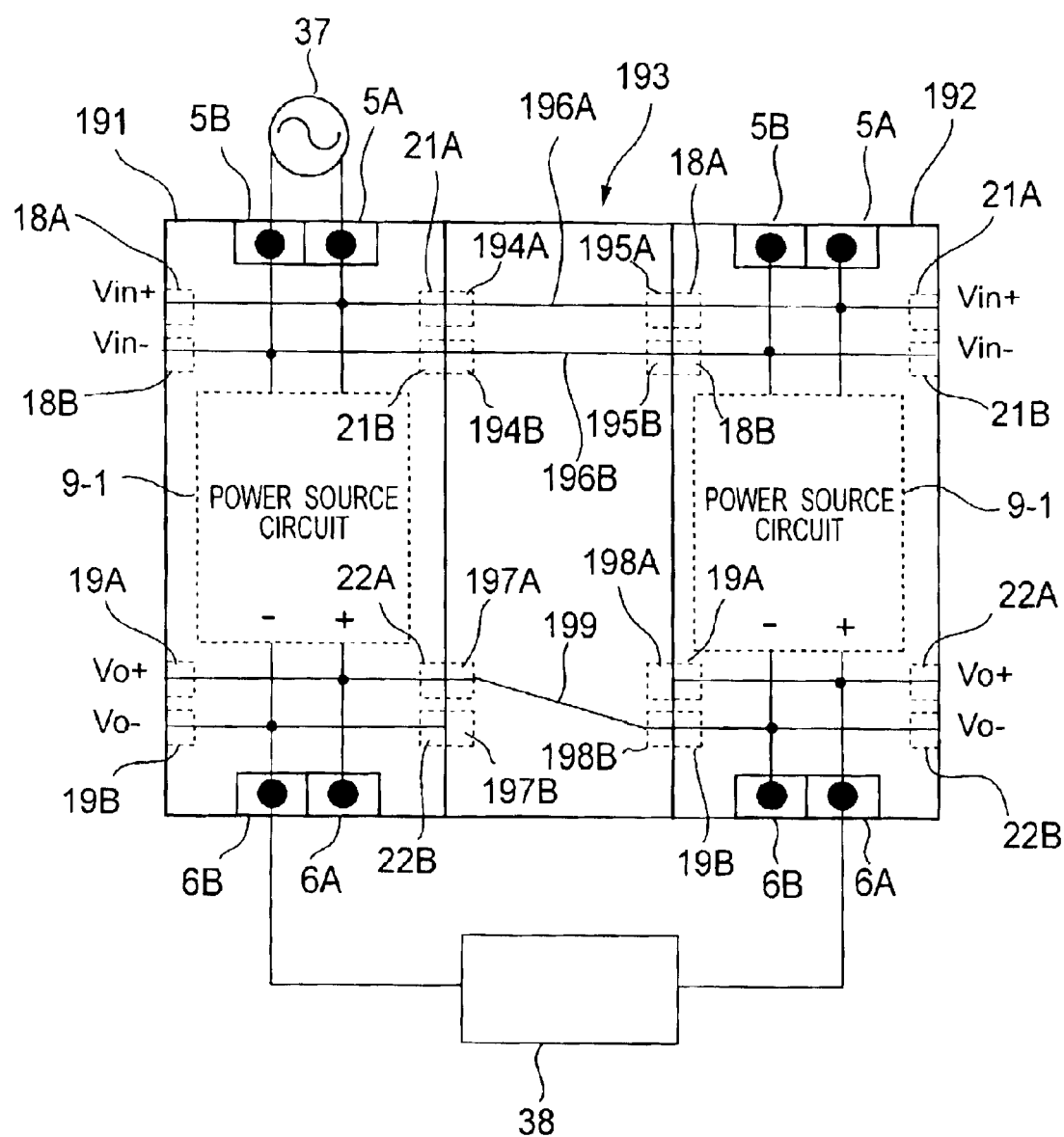
FIG. 24 is a configuration explanatory diagram of the power source apparatus (twelfth embodiment)

A twelfth embodiment of a power source apparatus according to the present invention is shown in FIG. 24.

Figure 21:
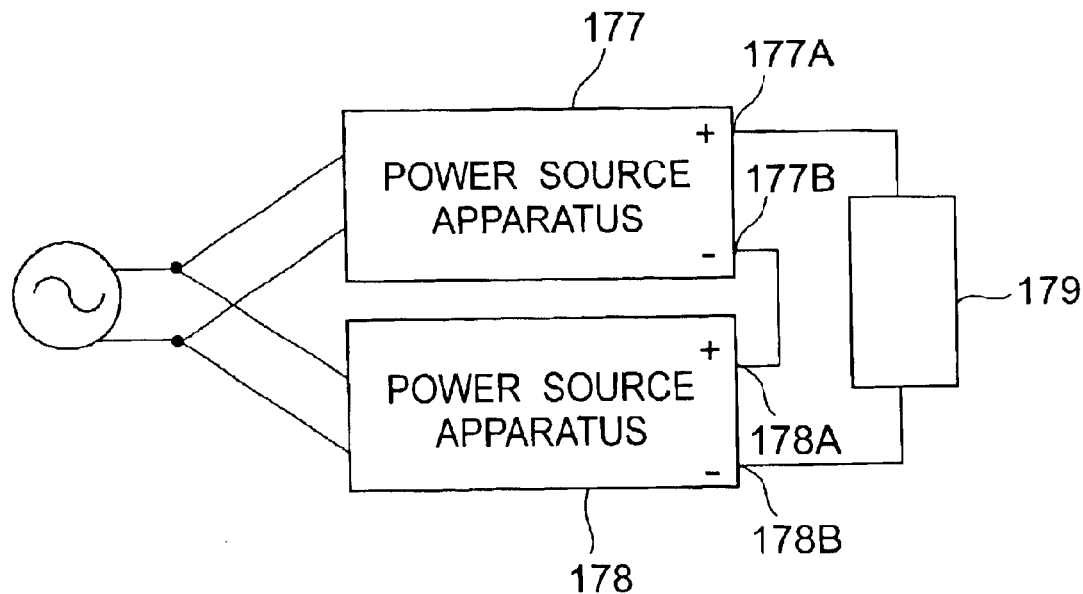
FIG. 21 is an explanatory diagram of series connection between power source apparatuses.

Generally, in the case of connecting power source apparatuses in series, as shown in FIG. 21, a (+) output side terminal 177A of one power source apparatus 177 is connected and wired to a (−) output terminal 178B of the other power source apparatus 178 to connect them to a load 179 and also, a (−) output side terminal 177B of one power source apparatus 177 is connected to a (+) output terminal 178A of the other power source apparatus 178 by wiring.

Figure 22:
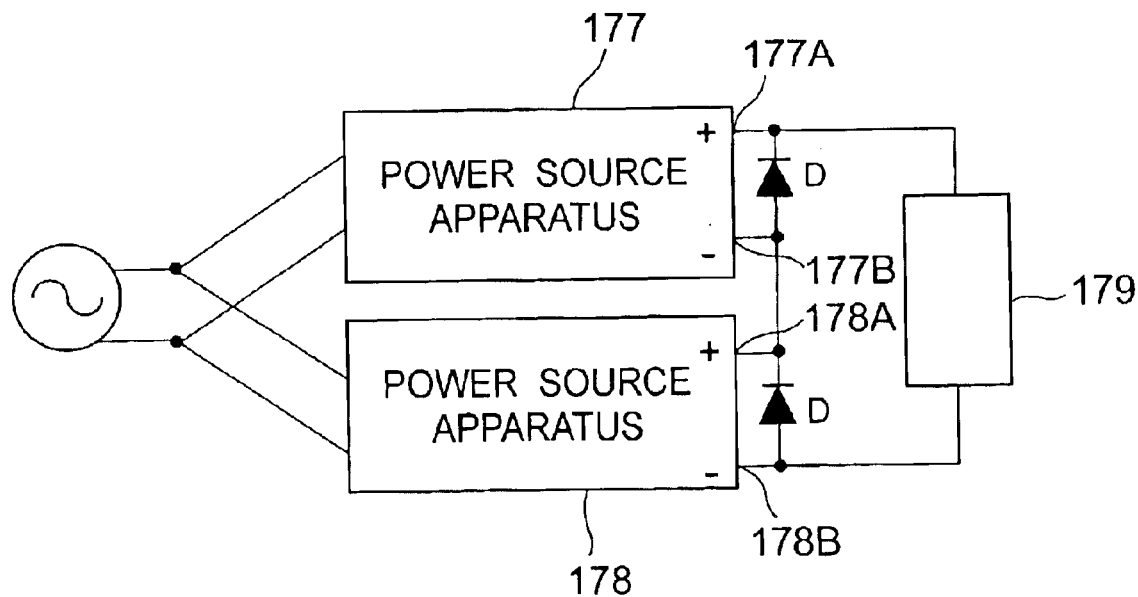
FIG. 22 is an explanatory diagram of series connection between power source apparatuses.

Also, in order to prevent a backward voltage from being applied to a built-in output aluminum electrolytic capacitor depending on a circuit method of a power source apparatus, as shown in FIG. 22, it may require a diode D between (+) (−) output terminals 177A, 177B and between (+) (−) output terminals 178A, 178B of each of one and the other power source apparatuses 177, 178.

Figure 23:
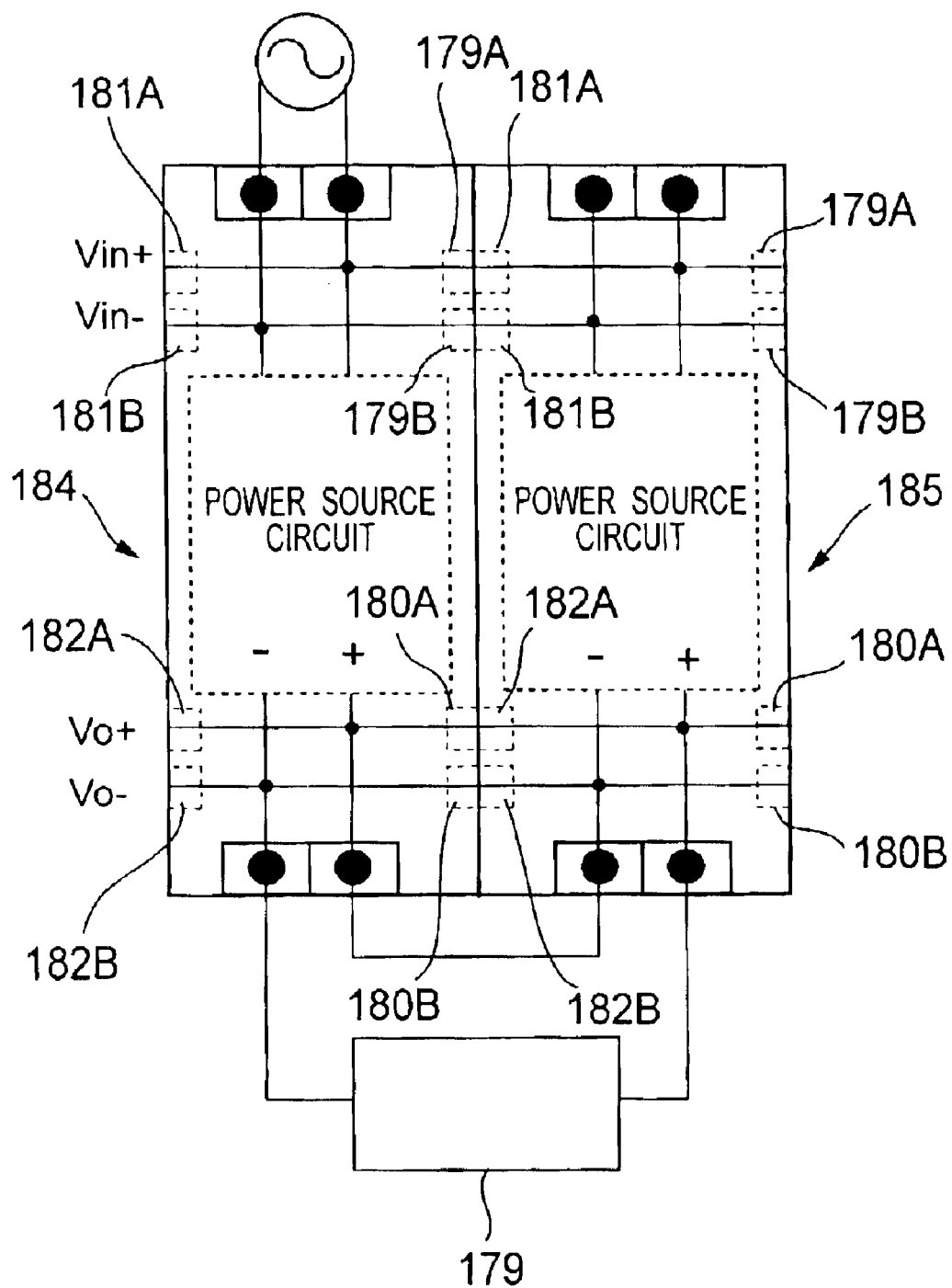
FIG. 23 is an explanatory diagram of series connection between power source apparatuses.

This applies similarly to the case of power source units 184, 185 having connectors 179A, 179B, 180A, 180B, 181A, 181B, 183A, 183B capable of connecting AC input bus lines (Vin+), (Vin−) and DC output bus lines (Vo+), (Vo−) in a one-touch manner within a main body as shown in FIG. 23.

However, in a series connection method of such power source apparatuses, there is a problem that the number of man-hours of wiring increases remarkably as compared with a single power source apparatus.

The twelfth embodiment of a power source apparatus according to the present invention is implemented in view of such a conventional problem, and the number of man-hours of wiring similar to that of a single power source apparatus is achieved by inserting a series connection unit between one and the other power source units even in the case of power source units having connectors capable of connecting AC input bus lines (Vin+), (Vin−) and DC output bus lines (Vo+), (Vo−) in a one-touch manner within a main body.

As shown in FIG. 24, the twelfth embodiment of a power source apparatus according to the present invention provides a first power source unit 191, a second power source unit 192 and a series connection unit 193 acting as an additional function unit.

Then, the first power source unit 191 and the second power source unit 192 in the twelfth embodiment of the power source apparatus according to the present invention have the same configurations as those of the first power source unit 81 and the second power source unit 82 in the sixth embodiment of the power source apparatus according to the present invention described above, so that the description will be omitted by attaching the same signs.

The series connection unit 193 has AC input side connectors 194A, 194B and AC output side connectors 195A, 195B, a bus line 196A for making connection between the AC input side connector (+side connector) 194A and the AC output side connector (+side connector) 195A, a bus line 196B for making connection between the AC input side connector (−side connector) 194B and the AC output side connector (−side connector) 195B, DC input side connectors 197A, 197B and DC output side connectors 198A, 198B, and a bus line 199 for making connection between the DC input side connector (+side connector) 197A and the DC output side connector (−side connector) 198B.

The first power source unit 191, the series connection unit 193 and the second power source unit 192 are mounted on a DIN rail (not shown) and are connected in parallel in this order.

That is, a connection between the first power source unit 191 and the series connection unit 193 is mutually made by connecting AC output side connectors 21A, 21B of the first power source unit 191 to the AC input side connectors 194A, 194B of the series connection unit 193 and also connecting DC output side connectors 22A, 22B to the DC input side connectors 197A, 197B.

Also, a connection between the series connection unit 193 and the second power source unit 192 is mutually made by connecting the AC output side connectors 195A, 195B of the series connection unit 193 to AC input side connectors 18A, 18B of the second power source unit 192 and connecting the DC output side connectors 198A, 198B to DC input side connectors 19A, 19B. Then, an external commercial AC power source 37 is connected to AC input terminals 5A, 5B of the first power source unit 191, and a load 38 is connected between a (−) side DC output terminal 6B of the first power source unit 191 and a (+) side DC output terminal 6A of the second power source unit 192.

Therefore, an AC inputted from the AC input terminals 5A, 5B of the first power source unit 191 is supplied from AC input bus lines (Vin+), (Vin−) of the first power source unit 191 to AC input bus lines (Vin+), (Vin−) of the second power source unit 192 through the bus lines 196A, 196B of the series connection unit 193.

Also, a connection between a DC output bus line (Vo+) of the first power source unit 191 and a DC output bus line (Vo−) of the second power source unit 192 are made by the bus line 199 of the series connection unit 193.

Therefore, connections can be made by the same wiring as the case of using a single power source apparatus, and the number of man-hours of wiring similar to that of the single power source apparatus can be achieved.

(Twelfth Embodiment)

Figure 25:
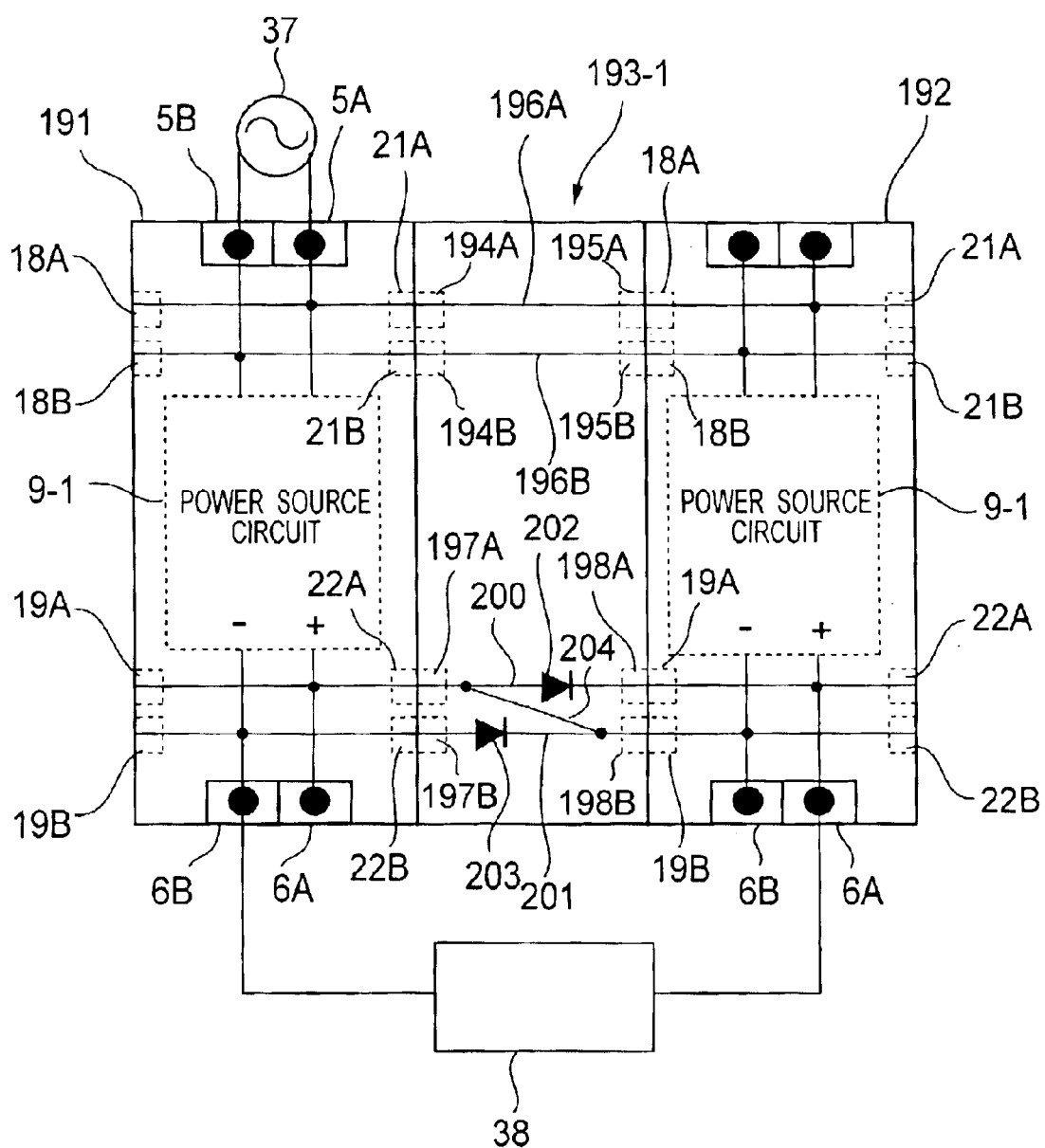
FIG. 25 is another configuration explanatory diagram of the power source apparatus (twelfth embodiment)

A twelfth embodiment of a power source apparatus according to the present invention is shown in FIG. 25.

As shown in FIG. 25, the twelfth embodiment of the power source apparatus according to the present invention provides a first power source unit 191, a second power source unit 192 and a series connection unit 193-1 acting as an additional function unit.

Also, as the series connection unit 193-1, as shown in FIG. 25, it may be constructed so that a bus line 200 for making connection between a DC input side connector (+side connector) 197A and a DC output side connector (+side connector) 198A and a bus line 201 for making connection between a DC input side connector (−side connector) 197B and a DC output side connector (−side connector) 198B are provided in addition to bus lines 196A, 196B, and one diode 202 for protection is provided in the bus line 200 and the other diode 203 for protection is provided in the bus line 201, respectively, and the anode side of one diode 202 for protection and the cathode side of the other diode 203 for protection are short-circuited by a bus line 204.

By using the series connection unit 193-1 having the diodes 202, 203 for protection in a manner similar to the case of the above series connection unit 193, a backward voltage can be prevented from being applied to a built-in output aluminum electrolytic capacitor depending on a circuit method of a power source apparatus, and a saving in wiring of series connection can be achieved in any circuit method of power source units connected in series.

In accordance with the twelfth embodiment of the power source apparatus according to the present invention described above, connections can be made by the same wiring as the case of using a single power source apparatus, and the number of man-hours of wiring similar to that of the single power source apparatus can be achieved.

(Thirteenth Embodiment)

Figure 26:
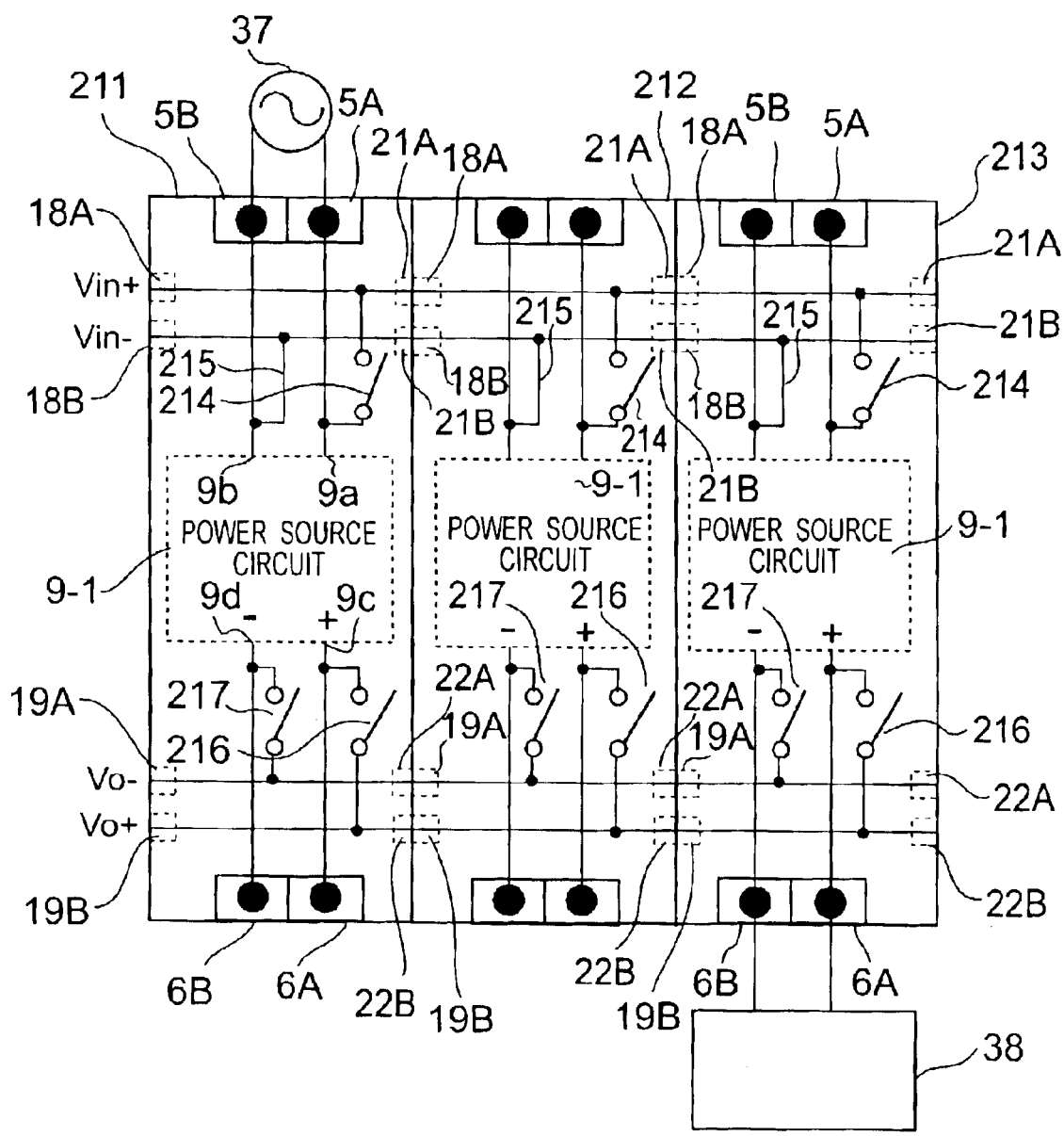
FIG. 26 is a configuration explanatory diagram of the power source apparatus (thirteenth embodiment)

A thirteenth embodiment of a power source apparatus according to the present invention is shown in FIG. 26.

There is the following configuration as a system configuration of plural power source apparatuses using conventional bus lines. That is, when having input bus lines and output bus lines inside a power source apparatus, in the case of connecting plural power source apparatuses by the input bus lines, the plural power source apparatuses can be driven by making connection from an input terminal of one power source apparatus to an input system and capacities of the number of units connected from a terminal of one power source apparatus to the output bus lines can be supplied to a load by the output bus lines.

However, in a system configuration of the power source apparatuses by such conventional bus lines, even when an operation of only one power source apparatus wants to be stopped at the time of maintenance, the plural power source apparatuses connected by the bus lines must be stopped simultaneously.

Also, in the case that necessary electric power of the load side of the power source apparatuses changes in the power source apparatuses run in parallel by the bus lines, there is a problem that efficiency of the power source apparatuses becomes worse when the necessary electric power of the load side is extremely lower than that of the power source apparatuses running in parallel. Also, when electric power is supplied from the plural power source apparatuses connected by the bus lines to plural loads, insulation every output cannot be performed in the case of such a configuration.

The thirteenth embodiment of the power source apparatus according to the present invention solves the above problem by providing a switch in a bus line itself or between a bus line and a power source circuit of a power source unit.

As shown in FIG. 26, the thirteenth embodiment of the power source apparatus according to the present invention provides a first power source unit 211, a second power source unit 212 and a third power source unit 213.

Then, a power source circuit 9-1, AC input terminals 5A, 5B, DC output terminals 6A, 6B, AC input bus lines (Vin+), (Vin−) and DC output bus lines (Vo+), (Vo−) are placed in the first, second, third power source units 211, 212, 213.

It is constructed so that the power source circuit 9-1 has a plus side input terminal portion 9a, a minus side input terminal portion 9b and a plus side output terminal portion 9c, a minus side output terminal portion 9d, and the plus side input terminal portion 9a, the minus side input terminal portion 9b are connected to the AC input terminals 5A, 5B, and the plus side output terminal portion 9c, the minus side output terminal portion 9d are connected to the DC output terminals 6A, 6B, and an AC power source inputted from the outside through the AC input terminals 5A, 5B is converted into a stabilized output voltage of 24 V DC and is outputted to the outside through the DC output terminals 6A, 6B.

Also, AC input side connectors 18A, 18B and DC input side connectors 19A, 19B are respectively placed in one side of a side panel of the first, second, third power source units 211, 212, 213, and also AC output side connectors 21A, 21B and DC output side connectors 22A, 22B are respectively placed in the other side of the side panel.

Then, the AC input side connectors 18A, 18B and the AC output side connectors 21A, 21B are connected to the AC input bus lines (Vin+), (Vin−), and the DC input side connectors 19A, 19B and the DC output side connectors 22A, 22B are connected to the DC output bus lines (Vo+), (Vo−).

Then, the plus side input terminal portion 9a of the power source circuit 9-1 is connected to the AC input bus line (Vin+) through an input system switch 214, and the minus side input terminal portion 9b of the power source circuit 9-1 is connected to the AC input bus line (Vin−) by wiring 215.

Also, the plus side output terminal portion 9c of the power source circuit 9-1 is connected to the DC output bus line (Vo+) through a first output system switch 216, and the minus side output terminal portion 9d of the power source circuit 9-1 is connected to the DC output bus line (Vo−) through a second output system switch 217.

The first, second, third power source units 211, 212, 213 are mounted on a DIN rail (not shown) and are connected in parallel in this order.

That is, connections between the first power source unit 211 and the second power source unit 212 and between the second power source unit 212 and the third power source unit 213 are made in this order by connecting the AC output side connectors 21A, 21B to the AC input side connectors 18A, 18B and connecting the DC output side connectors 22A, 22B to the DC input side connectors 19A, 19B.

Therefore, the individual AC input bus lines (Vin+), (Vin−) and DC output bus lines (Vo+), (Vo−) of the first, second, third power source units 211, 212, 213 are respectively unified with the bus lines range in this order.

Then, an external commercial AC power source 37 is connected to the AC input terminals 5A, 5B of the first power source unit 211, and a load 38 is connected to the DC output terminals 6A, 6B of the third power source unit 213.

Next, an operation of the power source apparatus formed as mentioned above will be described.

When the input system switch 214 and the first, second output system switches 216, 217 are in an on state in the first, second, third power source units 211, 212, 213, the power source circuits 9-1 of the first, second, third power source units 211, 212, 213 are connected to the AC input bus lines (Vin+), (Vin−) and the DC output bus lines (Vo+), (Vo−).

Therefore, as a result of supplying an AC inputted from the AC input terminals 5A, 5B of the first power source unit 211 to each of the second, third power source units 212, 213, a DC can be outputted individually from each of the DC output terminals 6A, 6B of the first, second, third power source units 211, 212, 213, and the DC can be supplied to the load 38.

Then, by turning off the input system switch 214 and the first, second output system switches 216, 217 in the first, second, third power source units 211, 212, 213, the power source circuits 9-1 can be cut off from the AC input bus lines (Vin+), (Vin−) and the DC output bus lines (Vo+), (Vo−).

Therefore, the first, second, third power source units 211, 212, 213 mutually connected by the AC input bus lines (Vin+), (Vin−) and the DC output bus lines (Vo+), (Vo−) can be operated or not operated arbitrarily by the input system switch 214 and also, insulation of the output portions is enabled arbitrarily by the output system switches 216, 217.

However, in the case of the output system switches 216, 217 as shown in FIG. 26, output is insulated every one unit when four power source units are connected and operated, so that the power source units cannot be operated by two units in parallel running.

Figure 27:
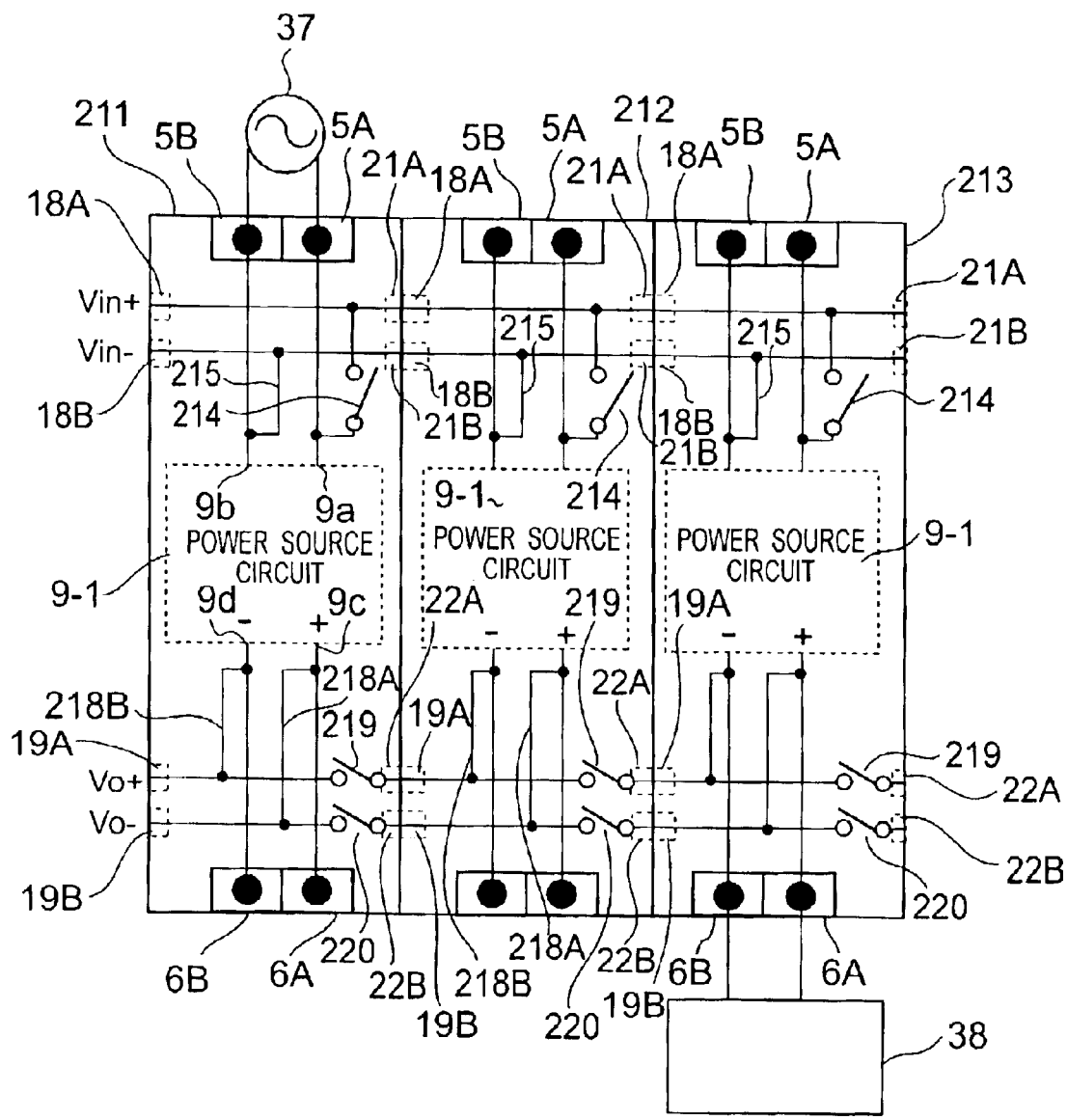
FIG. 27 is another configuration explanatory diagram of the power source apparatus (thirteenth embodiment)

Also, the thirteenth embodiment of the power source apparatus according to the present invention can be applied to a configuration shown in FIG. 27.

A plus side input terminal portion 9a of a power source circuit 9-1 is connected to an AC input bus line (Vin+) through an input system switch 214, and a minus side input terminal portion 9b of the power source circuit 9-1 is connected to an AC input bus line (Vin−) by wiring 215.

Also, a plus side output terminal portion 9c of the power source circuit 9-1 is connected to a DC output bus line (Vo+)

by wiring 218A, and a minus side output terminal portion 9d of the power source circuit 9-1 is connected to a DC output bus line (Vo−) by wiring 218B.

Then, the DC output bus line (Vo+) is connected to a DC output side connector 22A through a DC system switch 219, and the DC output bus line (Vo−) is connected to a DC output side connector 22B through a DC system switch 220.

Also, AC input side connectors 18A, 18B and DC input side connectors 19A, 19B are respectively placed in one side of a side panel of first, second, third power source units 211, 212, 213, and also AC output side connectors 21A, 21B and the DC output side connectors 22A, 22B are respectively placed in the other side of the side panel. Then, the AC input side connectors 18A, 18B and the AC output side connectors 21A, 21B are connected to the AC input bus lines (Vin+), (Vin−), and the DC input side connectors 19A, 19B and the DC output side connectors 22A, 22B are connected to the DC output bus lines (Vo+), (Vo−).

The first, second, third power source units 211, 212, 213 are mounted on a DIN rail (not shown) and are connected in parallel in this order.

That is, connections between the first power source unit 211 and the second power source unit 212 and between the second power source unit 212 and the third power source unit 213 are made in this order by connecting the AC output side connectors 21A, 21B to the AC input side connectors 18A, 18B and connecting the DC output side connectors 22A, 22B to the DC input side connectors 19A, 19B.

Therefore, the individual AC input bus lines (Vin +), (Vin−) and DC output bus lines (Vo+), (Vo−) of the first, second, third power source units 211, 212, 213 are respectively unified with the bus lines range in this order.

Also, an external commercial AC power source 37 is connected to the AC input terminals 5A, 5B of the first power source unit 211, and a load 38 is connected to the DC output terminals 6A, 6B of the third power source unit 213.

Next, an operation of the power source apparatus formed as mentioned above will be described.

When the input system switch 214 and the output system switches 219, 220 are in an on state in the first, second, third power source units 211, 212, 213, the power source circuits 9-1 of the first, second, third power source units 211, 212, 213 are connected to the AC input bus lines (Vin+), (Vin−) and the DC output bus lines (Vo+), (Vo−), and the DC output bus lines (Vo+), (Vo−) of the first, second, third power source units 211, 212, 213 are in a connection state.

Therefore, as a result of supplying an AC inputted from the AC input terminals 5A, 5B of the first power source unit 211 to each of the second, third power source units 212, 213, a DC can be outputted individually from each of the DC output terminals 6A, 6B of the first, second, third power source units 211, 212, 213, and the DC can be supplied to the load 38.

Then, when the input system switch 214 and the output system switches 219, 220 are turned off, the power source units in which these input system switch 214 and output system switches 219, 220 are provided in the inside can be cut off from the AC input bus lines (Vin+), (Vin−). Therefore, the first, second, third power source units 211, 212, 213 mutually connected by the AC input bus lines (Vin+), (Vin−) and the DC output bus lines (Vo+), (Vo−) can be operated or not operated arbitrarily by the input system switch 214 and also can be not insulated or insulated by the output system switches 219, 220.

However, in the case of the output system switches 219, 220 as shown in FIG. 27, there are switches in the DC output bus lines (Vo +), (Vo−) themselves, so that the power source units can be operated by two units in parallel running when four power source units are connected and operated, but output cannot be insulated every one unit when the power source unit located in the center of connections of four units is insulated.

In accordance with the thirteenth embodiment of the power source apparatus according to the present invention described above, in the case of running plural power source units using the AC input bus lines (Vin+), (Vin−) and the DC output bus lines (Vo+), (Vo−), by turning off the output system switches 216, 217 when maintenance of one power source unit wants to be performed, the maintenance can be performed without stopping operations of the other power source units connected to the same AC input bus lines (Vin+), (Vin−) and DC output bus lines (Vo+), (Vo−).

Also, in the case that plural power source units are run in parallel using the AC input bus lines (Vin+), (Vin−) and the DC output bus lines (Vo+), (Vo−) and supply electric power to a load may be smaller than a rating of the power source units run in parallel, only the power source units supplying the necessary electric power turn on the input system switch 214, the output system switches 216, 217 (219, 220) and the other power source units turn off the input system switch 214, the output system switches 216, 217 (219, 220), and thereby the total efficiency is improved.

In the case of running plural power source units using the AC input bus lines (Vin+), (Vin−) and the DC output bus lines (Vo+), (Vo−), by turning off the input system switch 214, outputs to plural loads can be insulated, respectively.

(Fourteenth Embodiment)

A fourteenth embodiment of a power source apparatus according to the present invention is shown in FIGS. 28 to 32.

Figure 28:
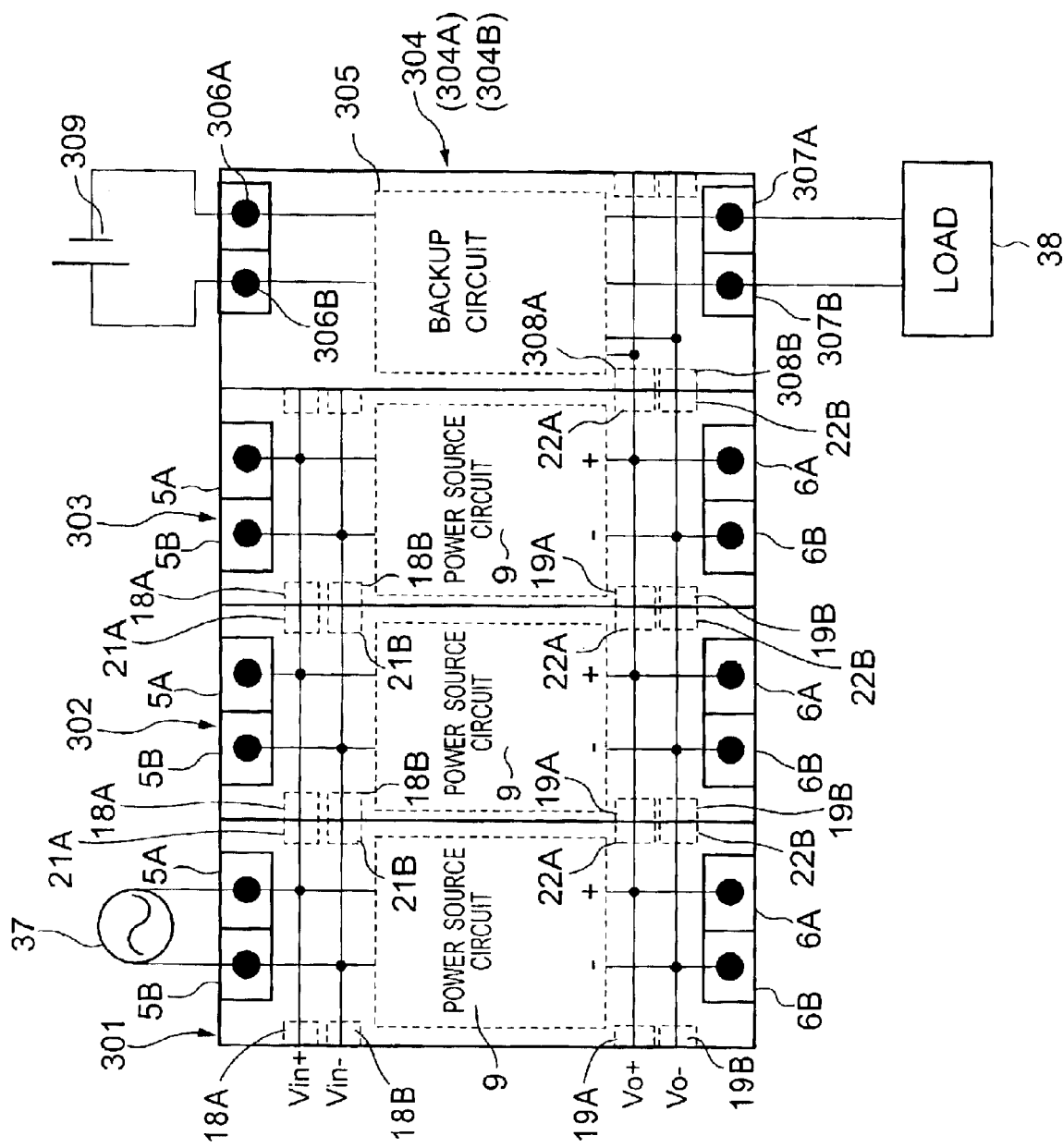
FIG. 28 is a configuration explanatory diagram of a power source apparatus (fourteenth embodiment) according to the present invention.
Figure 29:
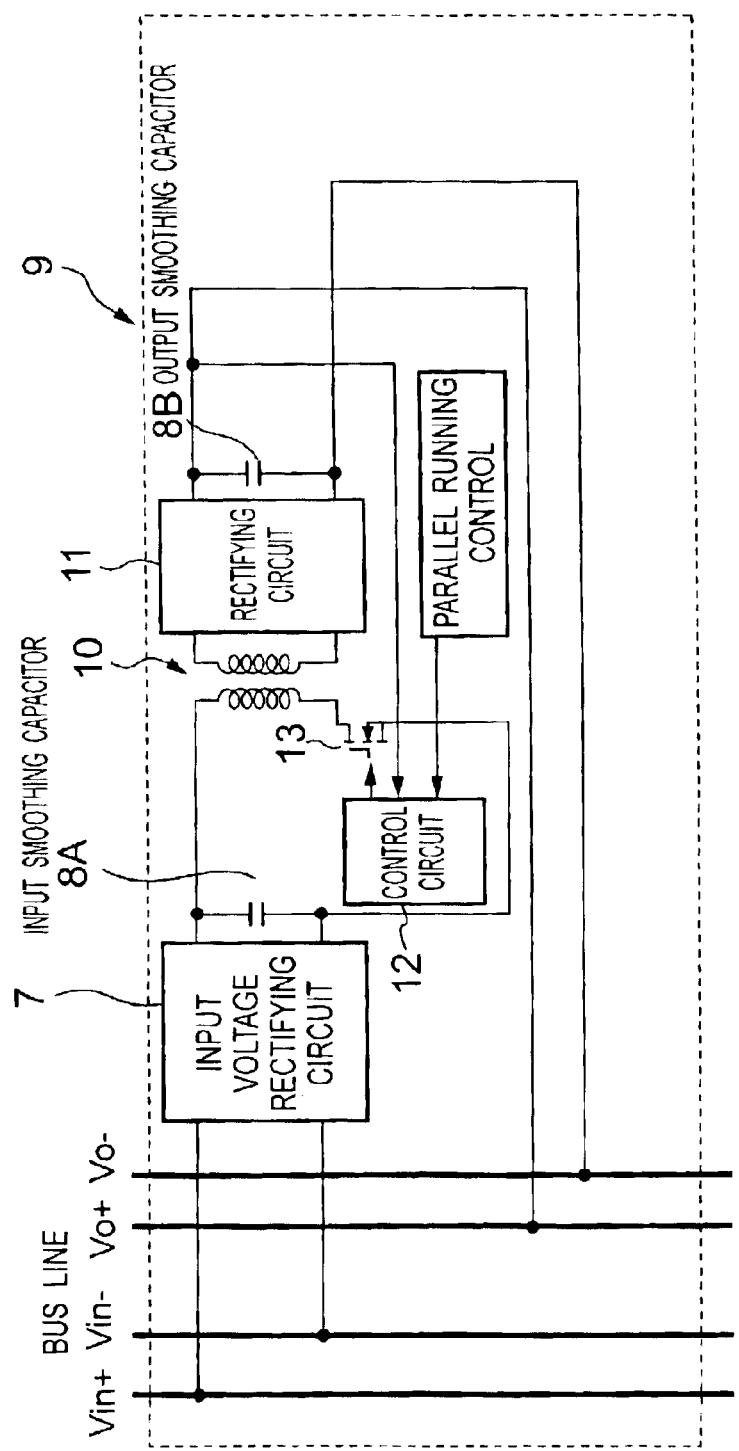
FIG. 29 is a configuration explanatory diagram of a power source circuit of a power source unit in the power source apparatus.
Figure 30:
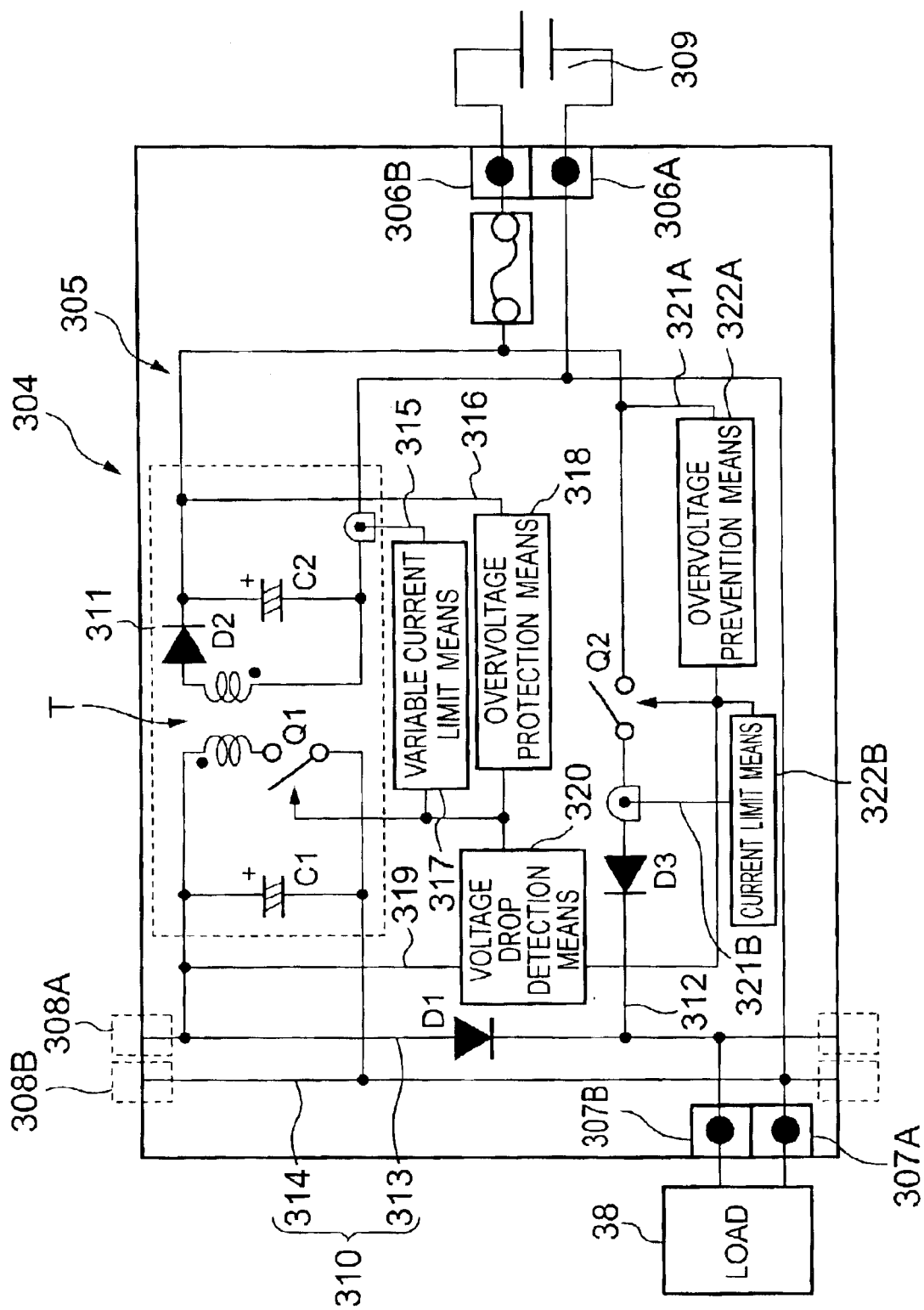
FIG. 30 is a configuration explanatory diagram of an uninterruptible power supply unit in the power source apparatus.
Figure 31:
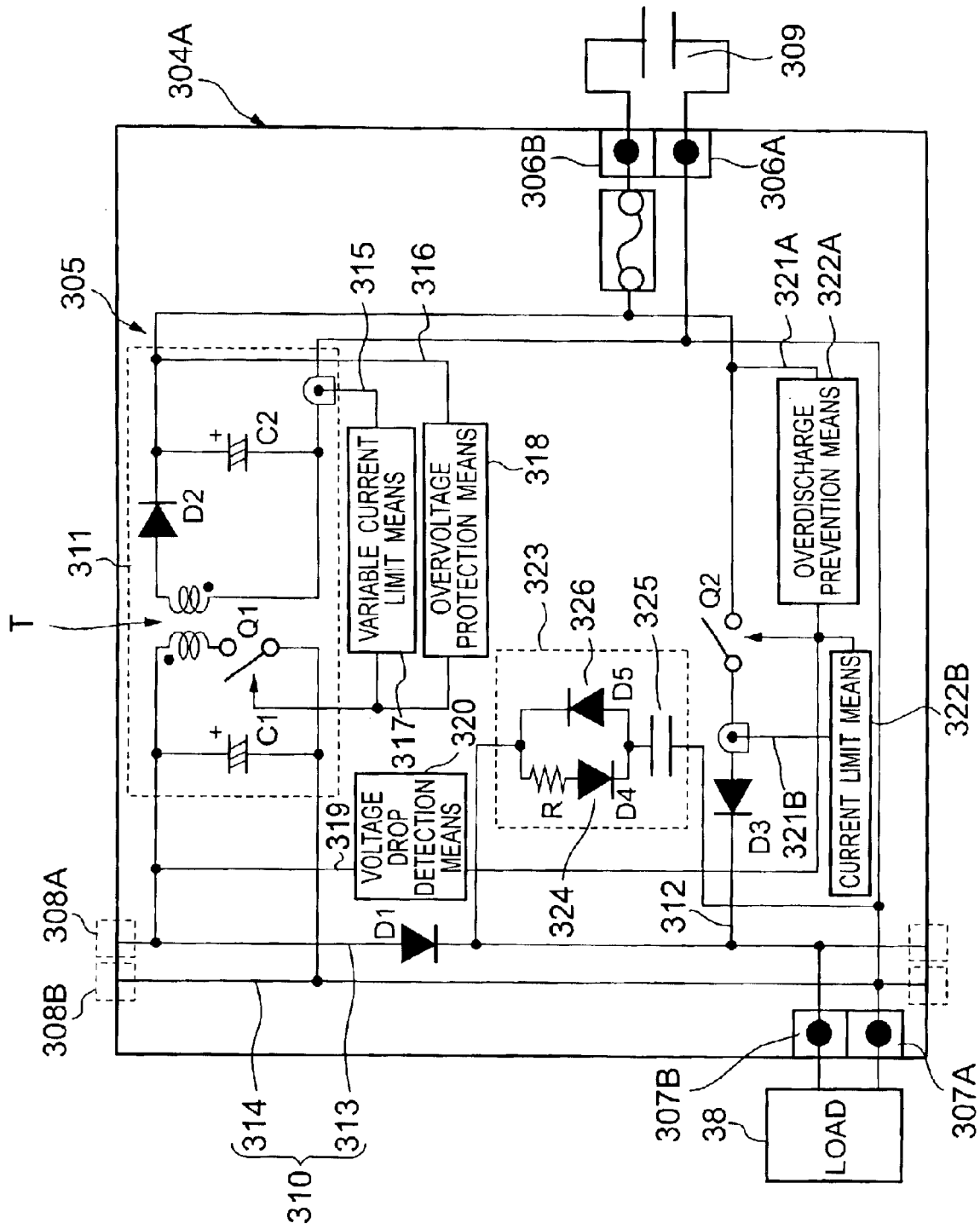
FIG. 31 is a configuration explanatory diagram of another uninterruptible power supply unit in the power source apparatus.
Figure 32:
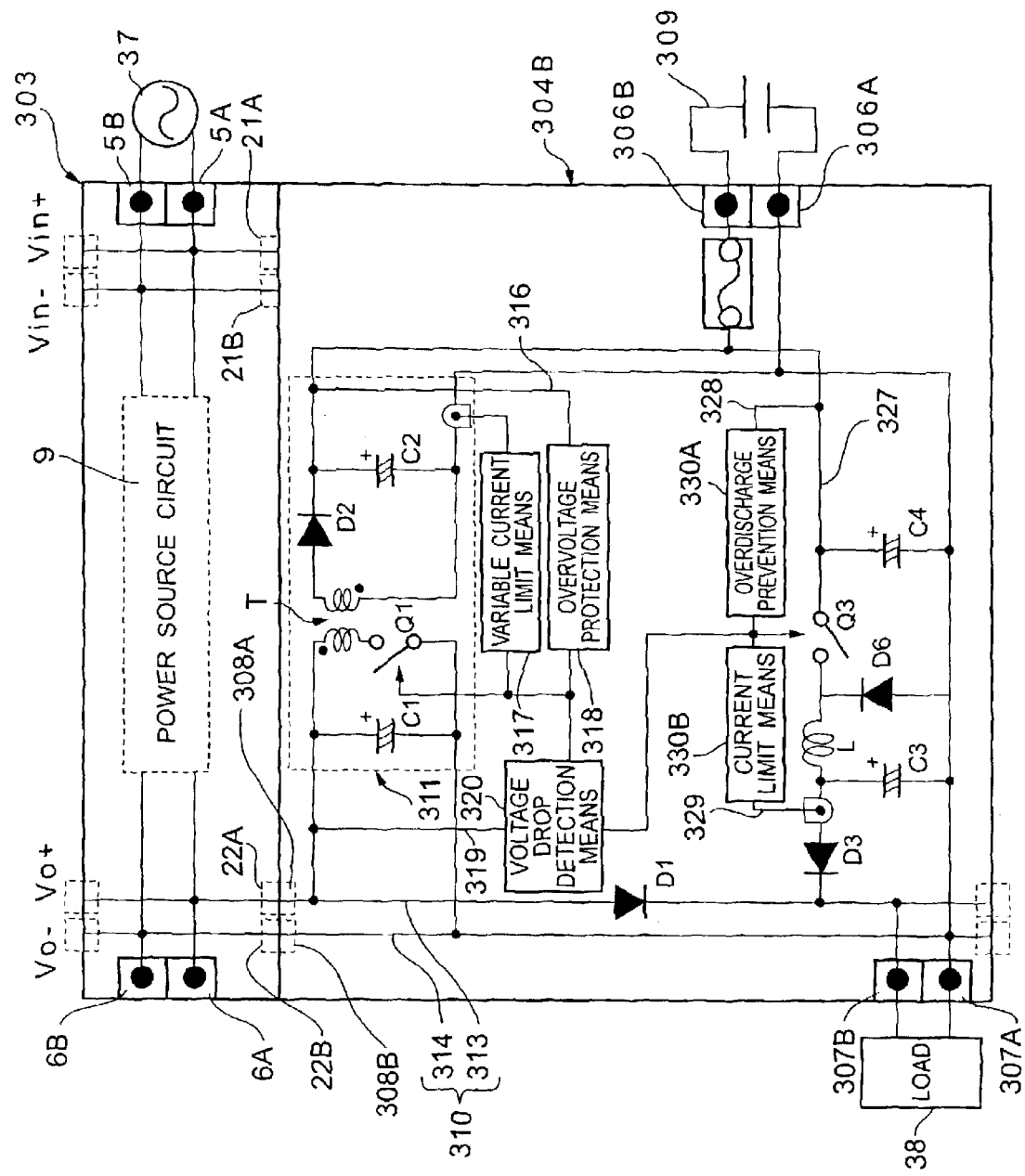
FIG. 32 is a configuration explanatory diagram of a further uninterruptible power supply unit in the power source apparatus.

FIG. 28 is a configuration explanatory diagram of the fourteenth embodiment of the power source apparatus according to the present invention, and FIG. 29 is a configuration explanatory diagram of a power source circuit of a power source unit in the power source apparatus, and FIG. 30 is a configuration explanatory diagram of an uninterruptible power supply unit in the power source apparatus, and FIG. 31 is a configuration explanatory diagram of another uninterruptible power supply unit in the power source apparatus, and FIG. 32 is a configuration explanatory diagram of a further uninterruptible power supply unit in the power source apparatus.

In these drawings, numeral 301 is a first power source unit, and numeral 302 is a second power source unit, and numeral 303 is a third power source unit, and numeral 304 is an uninterruptible power supply unit (UPS) acting as an additional function unit. Then, in connections between the first power source unit 301 and the second power source unit 302 and between the second power source unit 302 and the third power source unit 303, bus lines which the respective power source units have in the inside are connected through connectors to form a module power source.

Incidentally, the module power source is not limited to the above three power source units 301, 302, 303, and is formed by connecting bus lines which respective plural power source units have in the inside through connectors.

The first power source unit 301 is a switching power source, for example, for input of 100 to 240 V AC, output of 24 V DC and output of 2.5 A, 60 W in which a required part for power source circuit is built into a rectangular parallelepiped-shaped casing (not shown) with a front panel shape formed in a longitudinally elongated rectangle.

Then, a power source circuit 9, AC input terminals 5A, 5B, DC output terminals 6A, 6B, AC input bus lines (bus line) (Vin+), (Vin−) and DC output bus lines (bus line) (Vo+), (Vo−) are placed in the first, second, third power source unit 301, 302, 303.

The AC input terminals 5A, 5B are installed in the upper portion of a front panel (not shown) and guides an external commercial AC of 100 to 240 V AC to the power source circuit 9 and are connected to the AC input bus lines (Vin+), (Vin−). Also, the DC output terminals 6A, 6B are installed in the lower portion of the front panel and outputs 24 V DC, and it is formed in a configuration of two pairs of DC output terminals in which there are two plus side + and two minus side − and one plus side pairs up with one minus side.

Then, the DC output terminal 6A (plus side +) is connected to the DC output bus line (Vo+) and the DC output terminal 6B (minus side −) is connected to the DC output bus line (Vo−).

The power source circuit 9 is constructed so as to convert an AC inputted from the outside through the AC input terminals 5A, 5B into a stabilized output voltage of 24 V DC and output it to the outside through the DC output terminals 6A, 6B, and this power source circuit 9 is a switching power source circuit as one example, and it is constructed so that an external commercial AC is rectified by an input voltage rectifying circuit 7 and an input smoothing capacitor 8A to obtain a DC voltage and this DC voltage is switched by a switch element 13 to convert it into a high-frequency pulse and this high-frequency pulse is transformed by a high-frequency transformer 10 and is again returned to a DC by a high-frequency rectifying circuit 11 and an output smoothing capacitor 8B. Also, in the case that variations in output voltage occur, it is constructed so that a pulse width or a switching frequency at the time when the switch element 13 performs switching is changed to perform constant-voltage control by a control circuit 12.

Then, the input side of the power source circuit 9 is connected to the AC input bus lines (Vin+), (Vin−) and also, the output side of the power source circuit 9 is connected to the DC output bus lines (Vo+), (Vo−).

The first, second, third power source units 301, 302, 303 have AC input side connectors 18A, 18B and DC input side connectors 19A, 19B in one side of a side panel of the power source units, and also have AC output side connectors 21A, 21B and DC output side connectors 22A, 22B in the other side of the side panel, and the AC input side connectors 18A, 18B are mutually connected to the AC output side connectors 21A, 21B through the AC input bus lines (Vin+), (Vin−), and the DC input side connectors 19A, 19B are mutually connected to the DC output side connectors 22A, 22B through the DC output bus lines (Vo+), (Vo−).

As shown in FIG. 30, the uninterruptible power supply unit (UPS) 304 provides a backup circuit 305 acting as backup means, battery connection terminals 306A, 306B, DC output terminals 307A, 307B and DC input side connectors 308A, 308B acting as power source unit side connector means. A battery 309 is connected to the battery connection terminals 306A, 306B.

Then, the backup circuit 305 has a DC bus line 310, a charging circuit 311 which is charging means, and a discharging circuit 312 which is discharging means, and the DC bus line 310 comprises a circuit 313 for connecting the DC input side connector 308A to the DC output terminal 22A, and a circuit 314 for connecting a diode D1 provided in this circuit 313 to the DC input side connector 19B and the DC output terminal 307B.

The charging circuit 311 is a step-up and step-down conversion circuit, and comprises a transformer T, a switch element Q1 connected in series with a primary coil of this transformer T, a capacitor C1 connected in parallel with the primary coil of the transformer T, a diode D2 connected in series with a secondary coil of the transformer T, and a capacitor C2 connected in parallel with the secondary coil of the transformer T. This step-up and step-down conversion circuit is a circuit for accumulating electrical energy in the transformer T when the switch element Q1 is in an on state and taking out this electrical energy for output when the switch element Q1 is in an off state, and performs step-up and step-down conversion by control of the switch element Q1.

Then, the input side of the charging circuit 311 is connected to the DC input side connectors 308A, 308B, and the output side of the charging circuit 311 is connected to the battery connection terminals 306A, 306B.

Also, the input side of the discharging circuit 312 is connected to the battery connection terminal 306B and the output side of the discharging circuit 312 is connected to the DC output terminal 307B, respectively, and the discharging circuit 312 has a switch element Q2 and a diode D3.

Then, detection circuits 315, 316 are derived from the output side of the charging circuit 311, and the detection circuit 315 is provided with variable current limit means 317 in which a user sets the upper limit capable of charging the battery 309, and also the detection circuit 316 is provided with overvoltage protection means 318.

Also, a detection circuit 319 is derived from the input side of the charging circuit 311, and this detection circuit 319 is provided with voltage drop detection means 320, and also detection circuits 321A, 321B are respectively derived from the discharging circuit 312, and the detection circuit 321A is provided with overdischarge prevention means 322A and the detection circuit 321B is provided with current limit means 322B, respectively.

Then, the first, second, third power source units 301, 302, 303 and the uninterruptible power supply unit (UPS) 304 are mounted on a DIN rail (not shown) and are connected in parallel in this order.

That is, in the right neighborhood of the first power source unit 301, the second, third power source units 302, 303 and the uninterruptible power supply unit (UPS) 304 are placed in this order, and the AC output side connectors 21A, 21B and the DC output side connectors 22A, 22B of the first power source unit 301 are respectively connected to the AC input side connectors 18A, 18B and the DC input side connectors 19A, 19B of the second power source unit 302.

Also, the AC output side connectors 21A, 21B and the DC output side connectors 22A, 22B of the second power source unit 302 are respectively connected to the AC input side connectors 18A, 18B and the DC input side connectors 19A, 19B of the third power source unit 303.

Then, the DC output side connectors 22A, 22B of the third power source unit 303 are connected to the DC input side connectors 19A, 19B of the uninterruptible power supply unit (UPS) 304.

Therefore, the individual AC input bus lines (Vin+), (Vin−) of the first, second, third power source units 301, 302, 303 are unified with the bus lines range in this order, and also the individual DC output bus lines (Vo+), (Vo−) of the first, second, third power source units 301, 302, 303 and the DC bus line 310 of the uninterruptible power supply unit (UPS) 304 are unified with the bus lines range in this order.

Then, an external commercial AC power source 37 is connected to the AC input terminals 5A, 5B of the first power source unit 301, and a load 38 is connected to the DC output terminals 6A, 6B of the uninterruptible power supply unit (UPS) 304.

Next, an operation of the power source apparatus (fourteenth embodiment) according to the present invention will be described.

As a result of supplying an AC inputted from the AC input terminals 5A, 5B of the first power source unit 301 to each of the second, third power source units 302, 303, a DC can be outputted individually from each of the DC output terminals 6A, 6B of each of the first, second, third power source units 301, 302, 303 and when a load is connected to the DC output terminals 6A, 6B of each of the first, second, third power source units 301, 302, 303, the DC can be outputted to this load.

Also, a DC converted from an AC by the power source circuit 9 is inputted to the DC input side connectors 308A, 308B of the uninterruptible power supply unit (UPS) 304 through the DC output bus lines (Vo+), (Vo−) and is supplied to the backup circuit 305.

Commonly, in the uninterruptible power supply unit (UPS) 304, a DC supplied to the DC input side connectors 308A, 308B is supplied from the DC output terminals 307A, 307B to the load 38 through the DC bus line 310, or the DC supplied to the DC input side connectors 308A, 308B is stepped up or down in the charging circuit 311 and the battery 309 is charged through the battery connection terminals 306A, 306B.

In this case, it is constructed so that the variable current limit means 317 regulates the upper limit capable of charging the battery 309 and when the upper limit is reached, the variable current limit means 317 controls the switch element Q1 and a charging current with a current value of the upper limit or more does not flow. Also, when an output voltage of the charging circuit 311 becomes high, the overvoltage protection means 318 operates and the switch element Q1 is controlled to disable the charge.

Also, in case that power fails or a peak load exceeding a rated load of a power source system occurs, an input voltage of the charging circuit 311 drops. The drop in this voltage is detected by the voltage drop detection means 320 and this voltage drop detection means 320 brings the charging circuit 311 to a stop state and also the voltage drop detection means 320 turns on the switch element Q2 of the discharging circuit 312. As a result of this, the discharging circuit 312 is closed and a DC from the battery 309 is supplied to the load 38 to cope with the case of the power failure or the peak load.

Also, when discharge from the battery 309 becomes an overdischarge state, the overdischarge prevention means 322A operates and this overdischarge prevention means 322A turns off the switch element Q2. As a result of this, the discharging circuit 312 is opened to prevent the overdischarge. Also, the current limit means 322B regulates the upper limit capable of discharging the battery 309.

Also, another example of an uninterruptible power supply unit (UPS) includes an example shown in FIG. 31. This uninterruptible power supply unit (UPS) 304A provides an ICU circuit 323 which is a rush current unit acting as DC power source supplement means in the above uninterruptible power supply unit (UPS) 304, and other configurations are the same configurations as the above uninterruptible power supply unit (UPS) 304, so that the description will be omitted by attaching the same signs to portions of the same configurations.

The ICU circuit 323 comprises a charging circuit 324 connected in series with a resistor R and a diode D4, a mass capacitor 325 connected in series with this charging circuit 324, and a discharging circuit 326 formed of a diode D5 connected in parallel with the charging circuit 324, and this ICU circuit 323 is incorporated in parallel with a DC bus line 310.

In the uninterruptible power supply unit (UPS) 304, a DC supplied to the DC input side connectors 308A, 308B is supplied from the DC output terminals 307A, 307B to the load 38 through the DC bus line 310, or the DC supplied to the DC input side connectors 308A, 308B is stepped up or down in the charging circuit 311 and the battery 309 is charged through the battery connection terminals 306A, 306B, but in this case, in the ICU circuit 323, electrical energy (DC) is accumulated in the mass capacitor 325 through the charging circuit 324.

There is a case that a battery 309 cannot cope due to abrupt variations in a load 38. In this case, the electrical energy accumulated in the mass capacitor 325 is outputted to the DC output terminal 307B through the discharging circuit 326 and electrical energy (DC) supplied from the battery 309 is supplemented to cope with the variations in the load 38.

That is, while the backup circuit 305 in the uninterruptible power supply unit (UPS) 304 supplies a DC inputted to the built-in DC bus line 310 to the load 38, step-up and step-down conversions are made to charge the battery 309 and also electrical energy is accumulated in the mass capacitor 325 and in the case of a power failure or a peak load, the electrical energy is emitted from the mass capacitor 325 and a DC from the battery 309 is supplemented to supply it to the load 38.

Also, a further example of an uninterruptible power supply unit (UPS) includes an example shown in FIG. 32. This uninterruptible power supply unit (UPS) 304B has a configuration in which the discharging circuit is modified in the above uninterruptible power supply unit (UPS) 304 shown in FIG. 30, and other configurations are the same configurations as the above uninterruptible power supply unit (UPS) 304, so that the description will be omitted by attaching the same signs to portions of the same configurations.

A discharging circuit 327 of the uninterruptible power supply unit (UPS) 304B is formed of a step-down conversion circuit having a reactor L, capacitors C3, C4, a switch element Q3 and a diode D6, and this discharging circuit 327 connects a battery connection terminal 306B to a DC output terminal 307B. Then, the step-down conversion circuit forms a smoothing circuit of a choke input type filter by the reactor L, the diode D6 and the capacitor C3, and is a circuit for fetching an output voltage by an average value of an input voltage through this smoothing circuit.

Then, detection circuits 328, 329 are derived from the discharging circuit 327, and the detection circuit 328 is provided with overdischarge prevention means 330A and the detection circuit 329 is provided with current limit means 330B, respectively.

Then, in case that power fails or a peak load exceeding a rated load of a power source system occurs, an input voltage of a charging circuit 311 drops. The drop in this voltage is detected by voltage drop detection means 320 and this voltage drop detection means 320 brings the charging circuit 311 to a stop state and also the voltage drop detection means 320 turns on a switch element Q2 of the discharging circuit 327. As a result of this, the discharging circuit 327 is closed and a DC from a battery 309 is supplied to a load 38 to cope with the case of the power failure or the peak load.

Also, when discharge from the battery 309 becomes an overdischarge state, the overdischarge prevention means 330A operates and this overdischarge prevention means 330A turns off the switch element Q3. As a result of this, the discharging circuit 327 is opened to prevent the overdischarge. Also, the current limit means 330B regulates the upper limit capable of discharging the battery 309.

In accordance with the fourteenth embodiment of the power source apparatus according to the present invention described above, the DC bus line 310 of the uninterruptible power supply unit 304 can be connected to the DC output bus lines (Vo+), (Vo−) of the module power source in a one-touch manner by coupling the module power source formed of the first, second, third power source units 301, 302, 303 connected in parallel to the uninterruptible power supply unit 304 through the DC output side connectors 22A, 22B which are the power source side connector means and the DC input side connectors 308A, 308B which are the uninterruptible power supply unit side connector means, so that the need for wiring between the module power source and the uninterruptible power supply unit 304 is eliminated to result in a saving in man-hours by the amount of the wiring.

Also, a DC can be supplied from the uninterruptible power supply units (UPS) 304, 304A, 304B to the load 38 at the required time (for example, at the time of the power failure) and also, the peak load exceeding the rated load of the power source system can be supplied from the uninterruptible power supply units (UPS) 304, 304A, 304B in a short time.

Figure 33:
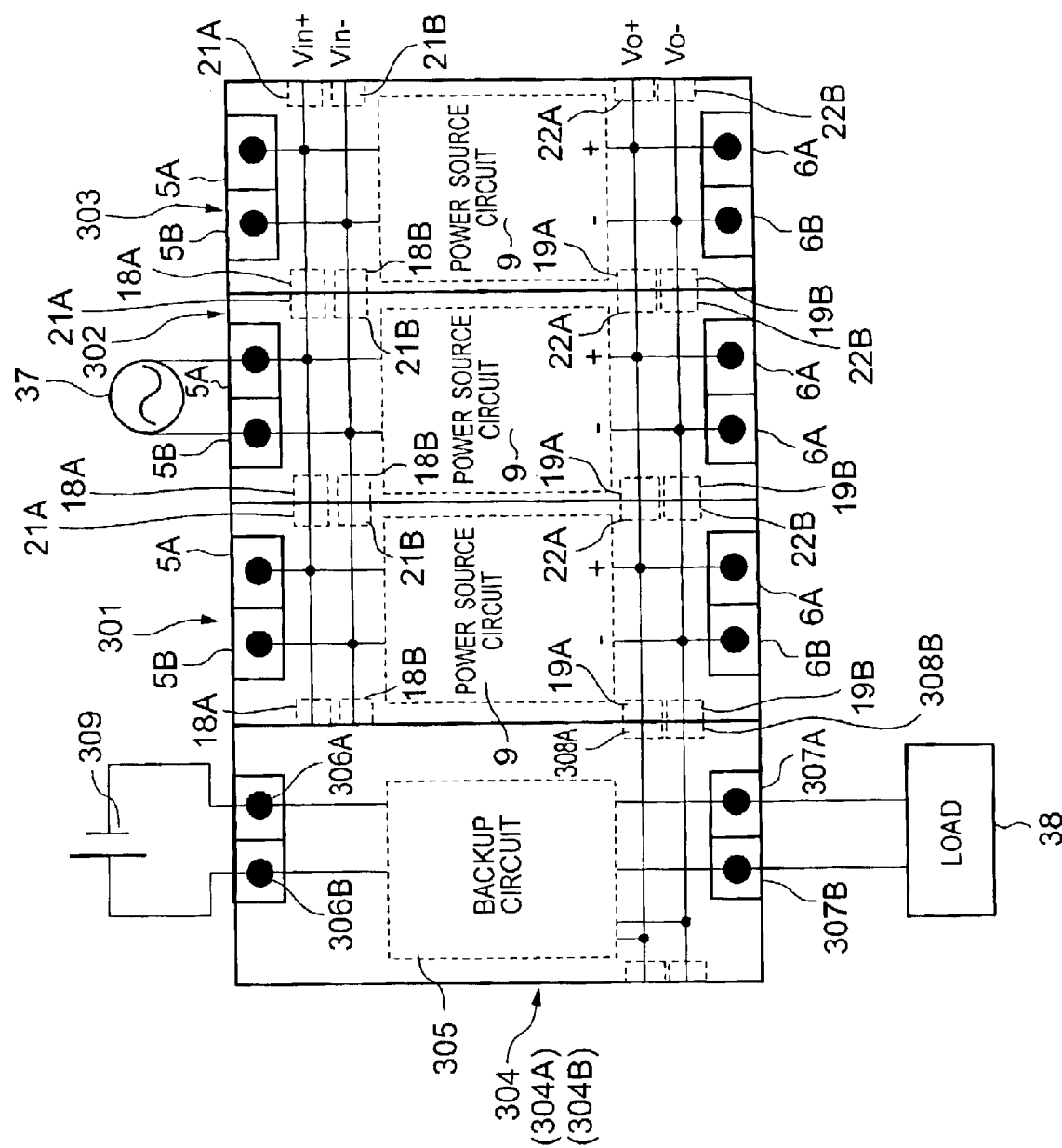
FIG. 33 is an explanatory diagram of another arrangement of connection between a module power sources made of first, second and third power source units and an uninterruptible power supply unit (UPS)

In the fourteenth embodiment of the power source apparatus according to the present invention described above, the first, second, third power source units 301, 302, 303 and the uninterruptible power supply units (UPS) 304 (304A, 304B) are mounted on the DIN rail and are connected in parallel in this order, but as shown in FIG. 33, the uninterruptible power supply units (UPS) 304 (304A, 304B) and the first, second, third power source units 301, 302, 303 may be mounted on the DIN rail and connected in parallel in this order. Also, the external commercial AC power source 37 may be connected to the AC input terminals 5A, 5B of any power source unit.

(Fifteenth Embodiment)

A fifteenth embodiment of a power source apparatus according to the present invention is shown in FIGS. 34 to 37.

Figure 34:
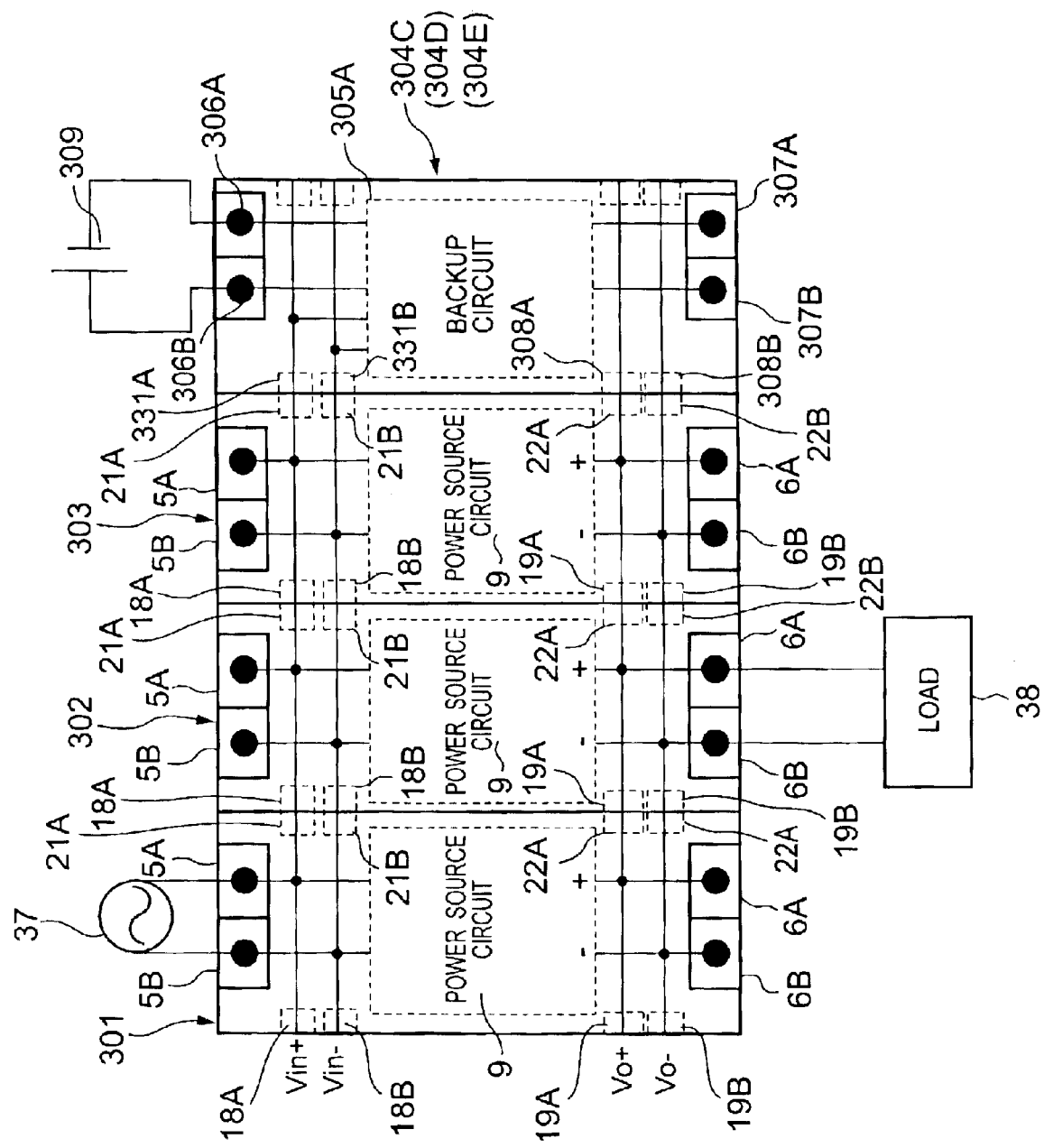
FIG. 34 is a configuration explanatory diagram of a power source apparatus (fifteenth embodiment) according to the present invention.
Figure 35:
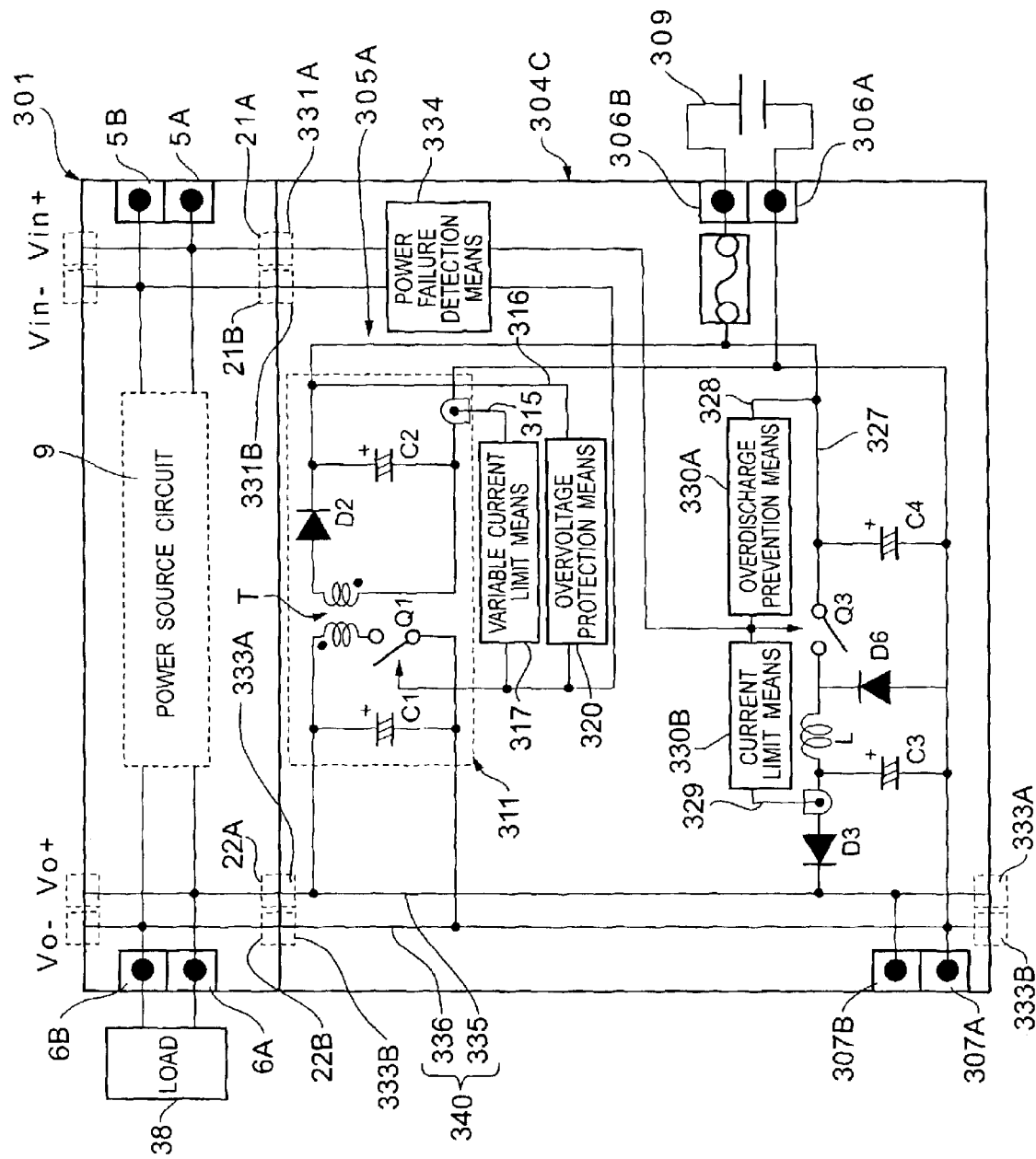
FIG. 35 is a configuration explanatory diagram of an uninterruptible power supply unit in the power source apparatus.
Figure 36:
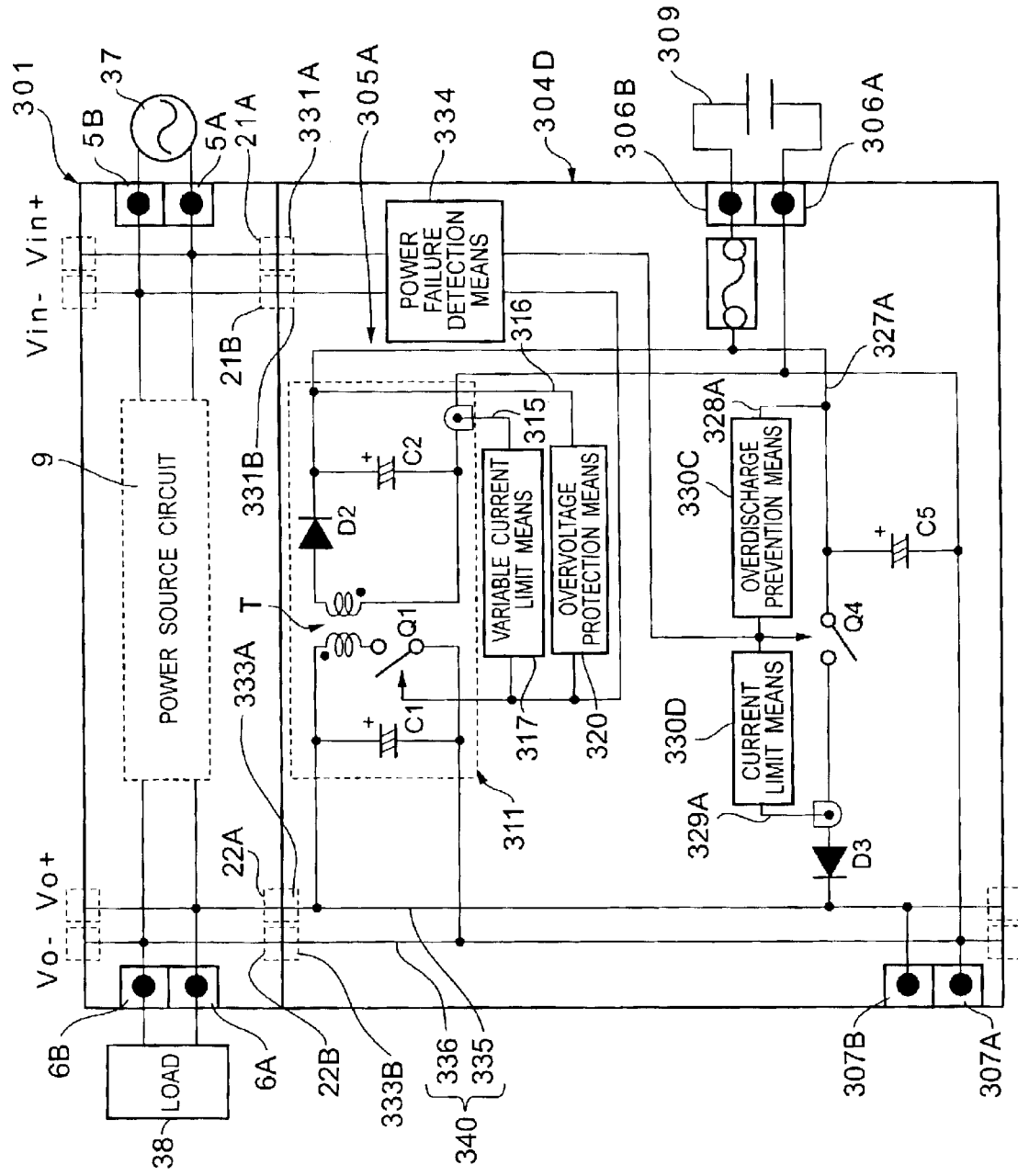
FIG. 36 is a configuration explanatory diagram of another uninterruptible power supply unit in the power source apparatus.
Figure 37:
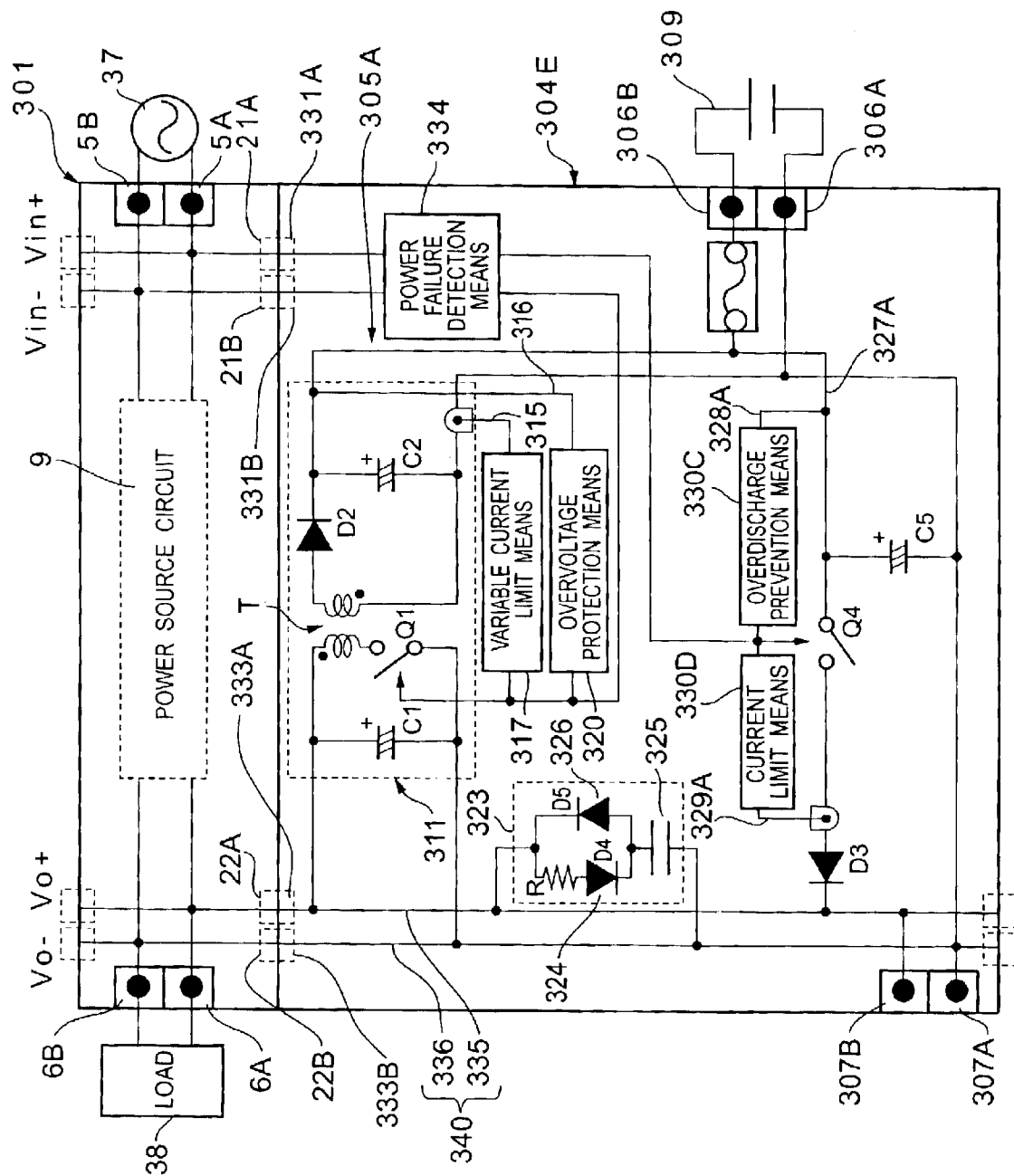
FIG. 37 is a configuration explanatory diagram of a further uninterruptible power supply unit in the power source apparatus.

FIG. 34 is a configuration explanatory diagram of the fifteenth embodiment of the power source apparatus according to the present invention, and FIG. 35 is a configuration explanatory diagram of an uninterruptible power supply unit in the power source apparatus, and FIG. 36 is a configuration explanatory diagram of another uninterruptible power supply unit in the power source apparatus, and FIG. 37 is a configuration explanatory diagram of a further uninterruptible power supply unit in the power source apparatus.

The fifteenth embodiment of the power source apparatus according to the present invention differs from the fourteenth embodiment of the power source apparatus according to the present invention described above in that a load can be driven from any DC terminals, and as a result of this, a configuration of an uninterruptible power supply unit (UPS) differs and the other configurations are similar. Thus, the description will be omitted by attaching the same signs to the same configurations.

An uninterruptible power supply units (UPS) 304C provides a backup circuit 305A which is backup means, battery connection terminals 306A, 306B, DC output terminals 307A, 307B, signal input side connectors 331A, 331B and DC side connectors 333A, 333B which are power source unit side connector means. A battery 309 is connected to the battery connection terminals 306A, 306B.

Then, the backup circuit 305A has a DC bus line 340, a charging circuit 311 which is charging means, a discharging circuit 327 which is discharging means, and power failure detection means 334, and the DC bus line 340 comprises a circuit 335 for connecting the DC side connector 333A to the DC output terminal 307B, and a circuit 336 for connecting the DC side connector 333B to the DC output terminal 307A.

The charging circuit 311 is formed of a step-up and step-down conversion circuit similar to that of the charging circuit 311 of the fourteenth embodiment of the power source apparatus according to the present invention described above. Then, the input side of the charging circuit 311 is connected to the DC side connectors 333A, 333B, and the output side of the charging circuit 311 is connected to the battery connection terminals 306A, 306B.

Then, detection circuits 315, 316 are derived from the output side of the charging circuit 311, and the detection circuit 315 is provided with variable current limit means 317 in which a user sets the upper limit capable of charging the battery 309, and also the detection circuit 316 is provided with overvoltage protection means 320.

Also, the input side of the power failure detection means 334 is connected to signal input side connectors 26-1, 26-2, and the output side of the power failure detection means 334 is connected to control portions (not shown) of each of a switch element Q1 of the charging circuit 311 and a switch element Q3 of the discharging circuit 327.

Also, the discharging circuit 327 is formed of a step-down conversion circuit having a reactor L, capacitors C3, C4, the switch element Q3 and a diode D6, and this discharging circuit 327 connects the battery connection terminal 306B to the DC output terminal 307B. Then, the step-down conversion circuit forms a smoothing circuit of a choke input type filter by the reactor L, the diode D6 and the capacitor C3, and is a circuit for fetching an output voltage by an average value of an input voltage through this smoothing circuit.

Then, detection circuits 328, 329 are derived from the discharging circuit 327, and the detection circuit 328 is provided with over discharge prevention means 330A and the detection circuit 329 is provided with current limit means 330B, respectively.

Then, first, second, third power source units 301, 302, 303 and the uninterruptible power supply unit (UPS) 304C are mounted on a DIN rail (not shown), and the first, second, third power source units 301, 302, 303 and the uninterruptible power supply unit (UPS) 304C are connected in parallel in this order.

That is, in the right neighborhood of the first power source unit 301, the second, third power source units 302, 303 and the uninterruptible power supply unit (UPS) 304C are placed in this order, and AC output side connectors 21A, 21B and DC output side connectors 22A, 22B of the first power source unit 301 are respectively connected to AC input side connectors 18A, 18B and DC input side connectors 19A, 19B of the second power source unit 302.

Also, the AC output side connectors 21A, 21B and the DC output side connectors 22A, 22B of the second power source unit 302 are respectively connected to the AC input side connectors 18A, 18B and the DC input side connectors 19A, 19B of the third power source unit 303.

Then, the AC output side connectors 21A, 21B of the third power source unit 303 are connected to the signal input side connectors 331A, 331B of the uninterruptible power supply unit (UPS) 304C, and the DC output side connectors 22A, 22B of the third power source unit 303 are connected to the DC side connectors 333A, 333B of the uninterruptible power supply unit (UPS) 304C.

Therefore, the individual AC input bus lines (Vin+), (Vin−) of the first, second, third power source units 301, 302, 303 are unified with the bus lines range in this order, and also the individual DC output bus lines (Vo+), (Vo−) of the first, second, third power source units 301, 302, 303 and the DC bus line 340 of the uninterruptible power supply unit (UPS) 304C are unified with the bus lines range in this order.

Then, an external commercial AC power source 37 is connected to the AC input terminals 5A, 5B of the first power source unit 301, and a load 38 is connected to the DC output terminals 6A, 6B of the second power source unit 302.

Next, an operation of the power source apparatus (fifteenth embodiment) according to the present invention formed as mentioned above will be described.

As a result of supplying an AC inputted from the AC input terminals 5A, 5B of the first power source unit 301 to each of the second, third power source units 302, 303, a DC can be outputted individually from each of the DC output terminals 6A, 6B of each of the first, second, third power source units 301, 302, 303, and the DC can be outputted to the load 38 connected to the DC output terminals 6A, 6B of the first power source unit 301.

Also, a DC converted from an AC by a power source circuit 9 is inputted to the DC side connectors 333A, 333B of the uninterruptible power supply unit (UPS) 304C through the DC output bus lines (Vo+), (Vo−) and is supplied to the backup circuit 305A.

Commonly, in the uninterruptible power supply unit (UPS) 304C, a DC supplied to the DC side connectors 333A, 333B is supplied to the DC output terminals 307A, 307B through the DC bus line 340, or the DC supplied to the DC side connectors 333A, 333B is stepped up or down in the charging circuit 311 and the battery 309 is charged through the battery connection terminals 306A, 306B.

In this case, it is constructed so that the variable current limit means 317 regulates the upper limit capable of charging the battery 309 and when the upper limit is reached, the variable current limit means 317 controls the switch element Q1 and a charging current with a current value of the upper limit or more is not passed. Also, when an output voltage of the charging circuit 311 becomes high, the overvoltage protection means 320 operates and the switch element Q1 is turned off to disable the charge.

Also, in case that power fails, the power failure is detected by the power failure detection means 334 and this power failure detection means 334 controls the switch element Q1 to stop a charging operation of the charging circuit 311 and also, the switch element Q3 of the discharging circuit 327 is turned on and this discharging circuit 327 is closed.

Therefore, while a DC outputted from the battery 309 is stepped down in the discharging circuit 327 and is outputted to the DC output terminals 307A, 307B of the uninterruptible power supply unit (UPS) 304C, the DC is outputted to the DC output bus lines (Vo+), (Vo−) of the first power source unit 301 through the DC bus line 340 and the DC similarly flows into the DC output bus lines (Vo+), (Vo−) of the second, third power source units 302, 303. As a result of this, the DC is supplied to the load 38 to cope with the case of the power failure.

Also, the current limit means 330B regulates the upper limit capable of discharging the battery 309 and when the upper limit is reached, the current limit means 330B controls the switch element Q3 to stop the discharge. Also, when the discharge from the battery 309 becomes an over discharge state, the over discharge prevention means 330A operates and this over discharge prevention means 330A controls the switch element Q3. As a result of this, the discharging circuit 327 is opened to prevent the over discharge.

Another example of an uninterruptible power supply unit (UPS) includes an example shown in FIG. 36. This uninterruptible power supply unit (UPS) 304D has a configuration in which the discharging circuit is modified in the above uninterruptible power supply unit (UPS) 304C, and other configurations are the same configurations as the above uninterruptible power supply unit (UPS) 304C, so that the description will be omitted by attaching the same signs to portions of the same configurations.

A discharging circuit 327A of the uninterruptible power supply unit (UPS) 304D is a circuit for connecting a capacitor C5, a switch element Q4 and a diode D3, and detection circuits 328A, 329A are derived from the discharging circuit 327A, and the detection circuit 328A is provided with over discharge prevention means 330C and the detection circuit 329A is provided with current limit means 330D, respectively.

Also, in this uninterruptible power supply unit (UPS) 304D in a manner similar to the above uninterruptible power supply unit (UPS) 304C, a DC supplied to the DC side connectors 333A, 333B is supplied to the DC output terminals 307A, 307B through the DC bus line 340, or the DC supplied to the DC side connectors 333A, 333B is stepped up or down in the charging circuit 311 and the battery 309 is charged through the battery connection terminals 306A, 306B.

In this case, it is constructed so that the variable current limit means 317 regulates the upper limit capable of charging the battery 309 and when the upper limit is reached, the variable current limit means 317 controls the switch element Q1 and a charging current with a current value of the upper limit or more is not passed. Also, when an output voltage of the charging circuit 311 becomes high, the overvoltage protection means 320 operates and the switch element Q1 is turned off to disable the charge.

Also, in case that power fails, the power failure is detected by the power failure detection means 334 and this power failure detection means 334 controls the switch element Q1 to stop a charging operation of the charging circuit 311 and also, the switch element Q4 of the discharging circuit 327A is turned on and this discharging circuit 327 is closed.

Therefore, while a DC outputted from the battery 309 is stepped down in the discharging circuit 327A and is outputted to the DC output terminals 307A, 307B of the uninterruptible power supply unit (UPS) 304D, the DC is outputted to the DC output bus lines (Vo+), (Vo−) of the first power source unit 301 through the DC bus line 340 and the DC similarly flows into the DC output bus lines (Vo+), (Vo−) of the second, third power source units 302, 303. As a result of this, the DC is supplied to the load 38 to cope with the case of the power failure.

Also, the current limit means 330D regulates the upper limit capable of discharging the battery 309 and when the upper limit is reached, the current limit means 330D controls the switch element Q4 to stop the discharge. Also, when the discharge from the battery 309 becomes an over discharge state, the over discharge prevention means 330C operates and this over discharge prevention means 330C controls the switch element Q4. As a result of this, the discharging circuit 327A is opened to prevent the over discharge.

Also, a further example of an uninterruptible power supply unit (UPS) includes an example shown in FIG. 37. This uninterruptible power supply unit (UPS) 304E has a configuration in which the above ICU circuit 323 is connected in parallel with the DC bus line 340 in the above uninterruptible power supply unit (UPS) 304D, and other configurations are the same configurations as the above uninterruptible power supply unit (UPS) 304D, so that the description will be omitted by attaching the same signs to portions of the same configurations.

The ICU circuit 323 comprises a charging circuit 324 connected in series with a resistor R and a diode D4, a mass capacitor 325 connected in series with this charging circuit 324, and a discharging circuit 326 formed of a diode D5 connected in parallel with the charging circuit 324, and this ICU circuit 323 is incorporated in parallel with the DC bus line 340.

In the uninterruptible power supply unit (UPS) 304E, a DC supplied to DC input side connectors 308A, 308B is outputted from DC output terminals 307A, 307B through the DC bus line 340, or the DC supplied to the DC input side connectors 308A, 308B is stepped up or down in a charging circuit 311 and a battery 309 is charged through battery connection terminals 306A, 306B, but in this case, in the ICU circuit 323, electrical energy (DC) is accumulated in the mass capacitor 325 through the charging circuit 324.

Also, in case that power fails, the power failure is detected by power failure detection means 334 and this power failure detection means 334 controls a switch element Q1 to stop a charging operation of the charging circuit 311 and also, a switch element Q4 of a discharging circuit 327A is turned on and this discharging circuit 327 is closed.

Therefore, while a DC outputted from the battery 309 is stepped down in the discharging circuit 327A and is outputted to the DC output terminals 307A, 307B of the uninterruptible power supply unit (UPS) 304E, the DC is outputted to the DC output bus lines (Vo+), (Vo−) of a first power source unit 301 through the DC bus line 340 and the DC similarly flows into the DC output bus lines (Vo+), (Vo−) of second, third power source units 302, 303. As a result of this, the DC is supplied to a load 38 to cope with the case of the power failure.

Then, there is a case that the battery 309 cannot cope due to abrupt variations in the load 38. In this case, the electrical energy accumulated in the mass capacitor 325 is outputted to the DC output terminal 307B through the discharging circuit 326 and electrical energy (DC) supplied from the battery 309 is supplemented to cope with the variations in the load 38.

Incidentally, also in the case of the fifteenth embodiment of the power source apparatus according to the present invention described above, a module power source is formed by connecting plural power source units in parallel through connectors, and is not limited to the first, second, third power source units 301, 302, 303, and also the uninterruptible power supply units (UPS) 304C, 304D, 304E are connected to any of the front and back of the module power source through connectors.

Also, in the case of the fifteenth embodiment of the power source apparatus according to the present invention described above, the external commercial AC power source 37 and the load 38 may be connected to any power source unit.

In accordance with the fifteenth embodiment of the power source apparatus according to the present invention described above, in a manner similar to the case of the fourteenth embodiment of the power source apparatus according to the present invention, the need for wiring between the module power source comprising the first, second, third power source units 301, 302, 303 and the uninterruptible power supply unit (UPS) 304C, 304D, 304E is eliminated to result in a saving in man-hours by the amount of the wiring, and also in the case of the power failure, electric power can be supplied from the uninterruptible power supply unit (UPS) 304C, 304D, 304E to the load 38 via the module power source, and the load 38 can be driven from any of the DC output terminals 6A, 6B.

(Sixteenth Embodiment)

Figure 38:
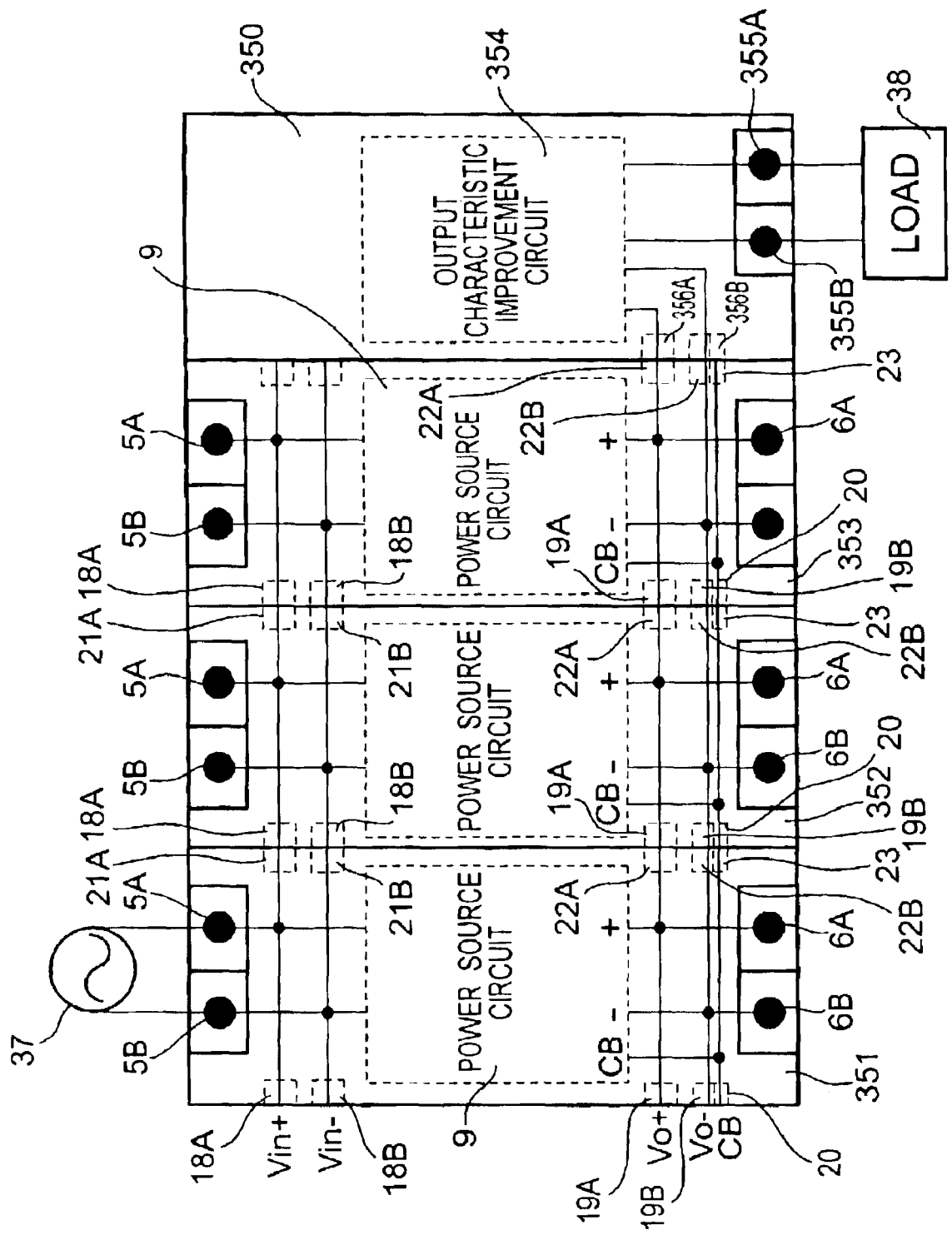
FIG. 38 is a configuration explanatory diagram of a power source apparatus (sixteenth embodiment) according to the present invention.
Figure 39:
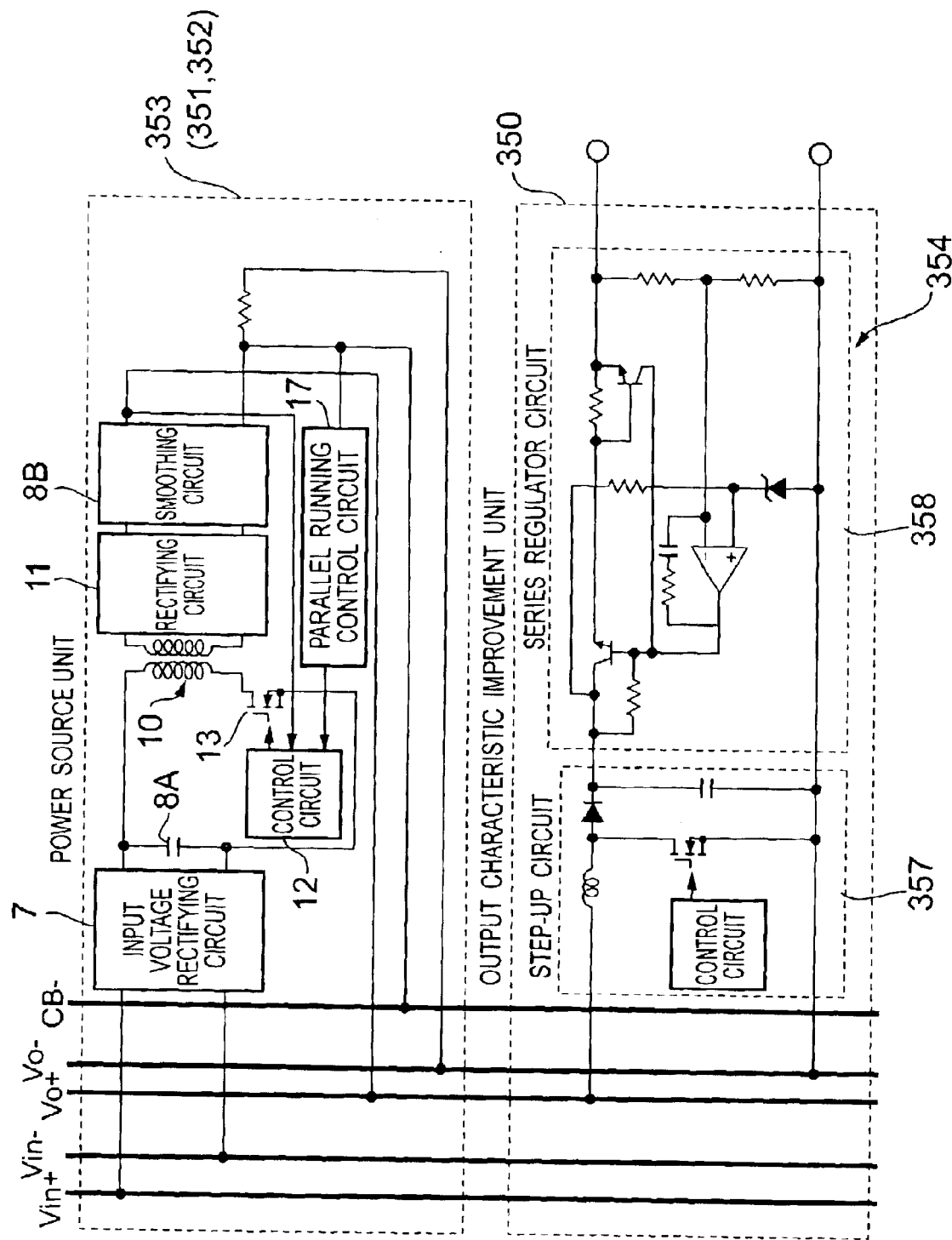
FIG. 39 is a configuration explanatory diagram of the inside of a power source unit and an output characteristic improvement unit within the power source apparatus.

A sixteenth embodiment of a power source apparatus according to the present invention is shown in FIGS. 38 and 39.

Generally, in a power source apparatus, for example, a module power source is formed by connecting plural power source units capable of being mounted to a DIN rail and these plural power source units are run in parallel according to the number of power source units connected to this DIN rail and thereby, an arbitrary power source capacity can be obtained as the power source apparatus.

However, in Device Net standards proposed in Western countries recently, in the power source apparatus, output current accuracy at the time of static load variations, temperature variations and overcurrent protection of the output has been required at a high level.

Thus, it is considered that the output current accuracy at the time of static load variations, temperature variations and overcurrent protection of the output of the power source apparatus can meet the Device Net standards by respectively providing an output characteristic improvement circuit formed of a step-up circuit and a series regulator circuit in each the power source unit.

Figure 40:
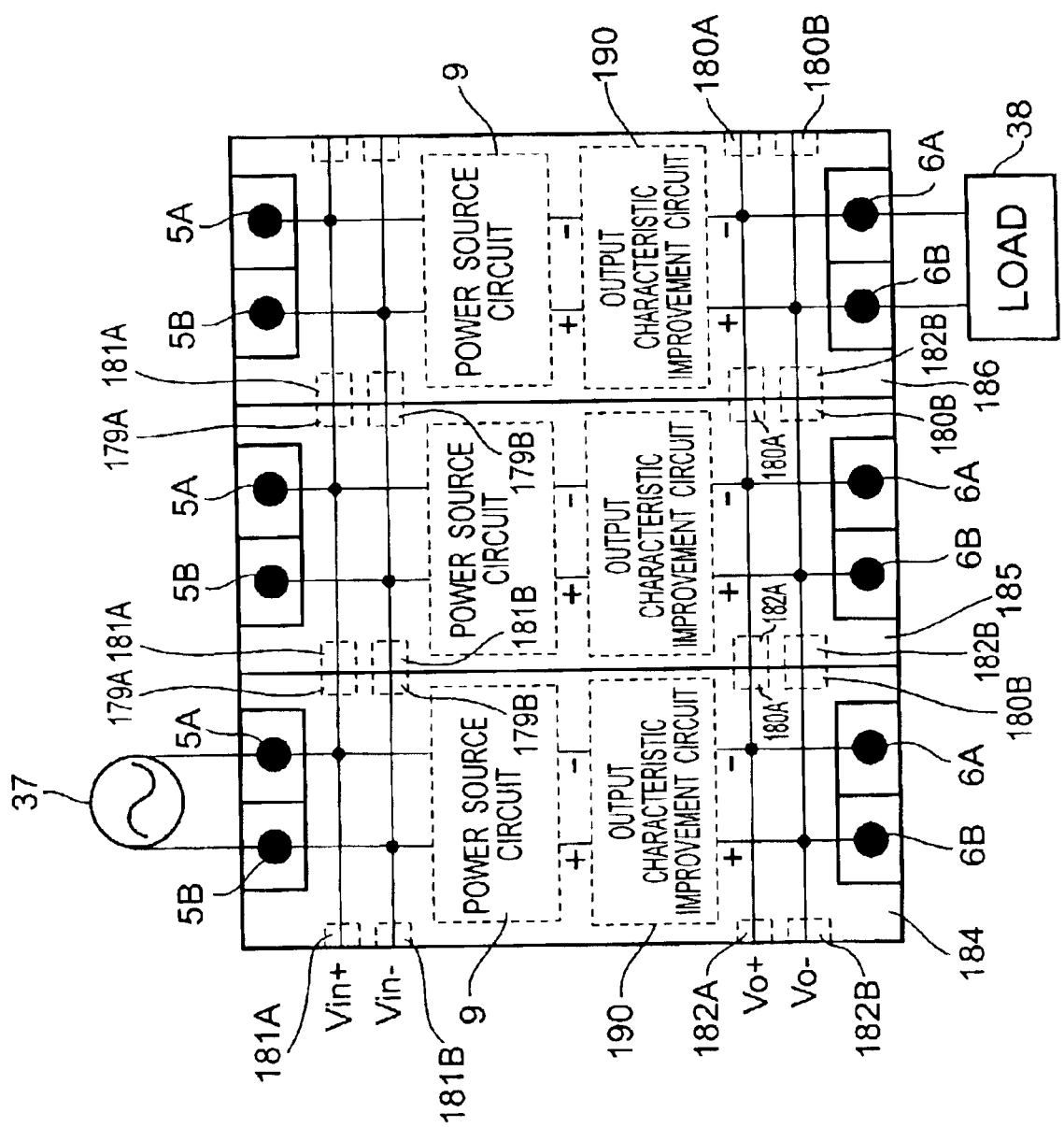
FIG. 40 is a configuration explanatory diagram of a power source apparatus formed by a power source unit into which a general output characteristic improvement circuit is built.

Now, a schematic configuration of the inside of a power source apparatus formed of such power source units will be described. FIG. 40 is an explanatory diagram showing a schematic configuration of the inside of a general power source apparatus.

The power source apparatus shown in FIG. 40 is formed by connecting first, second, third power source units 184, 185, 186 connected to a DIN rail.

The first, second, third power source units 184, 185, 186 have AC input terminals 5A, 5B for making connection to an external commercial AC power source 37 to input an AC, a power source circuit 9 for converting the AC inputted through the AC input terminals 5A, 5B into a stabilized DC voltage, DC output terminals 6A, 6B for outputting the DC voltage (output voltage) converted by this power source circuit 9, AC input bus lines (Vin+), (Vin−) for transmitting the AC inputted through the AC input terminals 5A, 5B to the other power source units 185, 186, and DC output bus lines (Vo+), (Vo−) for transmitting the DC outputted through the power source circuit 9 to the other power source units 185, 186. Incidentally, by connecting the DC output terminals 6A, 6B to a load 38, the output voltage is supplied to this load 38.

Also, the first, second, third power source units 184, 185, 186 have an AC input side connector 181A for inputting an AC through the AC input bus lines, an AC output side connector 179A for outputting the AC through the AC input bus lines, a DC input side connector 182B for inputting a DC through the DC output bus lines, and a DC output side connector 180B for outputting the DC through the DC output bus lines.

The first, second, third power source units 184, 185, 186 connect the AC input bus lines electrically and mechanically through these AC input side connector 181A and AC output side connector 179A and also, connect the DC output bus lines electrically and mechanically through the DC input side connector 182B and the DC output side connector 180B.

Figure 41:
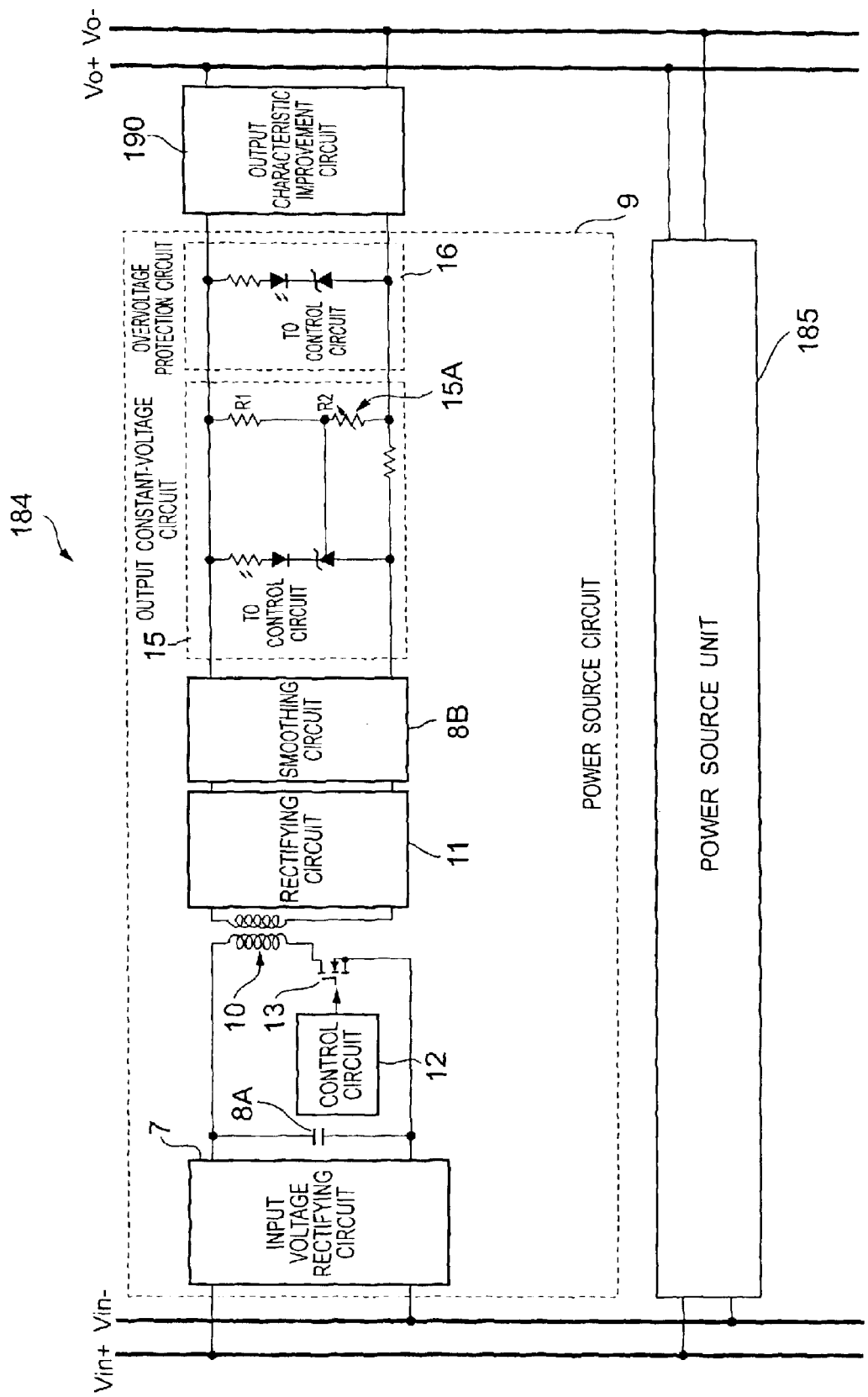
FIG. 41 is a configuration explanatory diagram of the inside of a power source unit within the power source apparatus.

FIG. 41 is a block diagram showing a schematic configuration of the inside of the power source circuit 9.

The power source circuit 9 shown in FIG. 41, which is a separately excited type power source circuit for inputting an AC through the AC input bus lines and converting this AC into a stabilized DC voltage, has an input voltage rectifying circuit 7 and an input smoothing capacitor 8A for obtaining a DC voltage by rectifying and smoothing an AC through the AC input bus lines, a switching element 13 for making conversion into a high-frequency pulse by switching this DC voltage, a control circuit 12 for performing constant-voltage control of an output voltage by controlling the switching of the switching element 13 to change a pulse width of the high-frequency pulse, a high-voltage transformer 10 for transforming the high-frequency pulse converted by the switching element 13, a rectifying circuit 11 and a smoothing circuit 8B for obtaining a DC voltage by rectifying and smoothing the high-frequency pulse transformed by this high-voltage transformer 10, an output constant-voltage circuit 15 for stabilizing the DC voltage obtained by this smoothing circuit 8B, and an overvoltage protection circuit 16 for preventing an overvoltage of the DC voltage stabilized by this output constant-voltage circuit 15.

The output constant-voltage circuit 15 has a voltage adjusting volume 15A for stabilizing the DC voltage obtained by this smoothing circuit 8B and adjusting an output voltage value of this DC voltage.

Also, the first, second, third power source units 184, 185, 186 have an output characteristic improvement circuit 190 for improving output characteristics of an output stage of the power source circuit 9, namely a DC voltage in which the DC conversion is made by the power source circuit 9, for example, output current accuracy at the time of static load variations, temperature variations and overcurrent protection, and are constructed so as to supply the DC voltage to the DC output bus lines through this output characteristic improvement circuit 190.

Further, the first power source unit 184 adjusts the voltage adjusting volume 15A provided in each of the power source units 184, 185, 186 so that an output voltage of the power source units 184, 185, 186 whose output voltage is set to the lowest value among each of the power source units 184, 185, 186 matches in the case of parallel running of the second, third power source units 185, 186, and is constructed so as to match output voltages of the power source units 184, 185, 186 with the output voltage of the power source units 184, 185, 186 whose output voltage is set to the lowest value by adjusting the voltage adjusting volume 15A when an output voltage of a certain power source unit 184, 185, 186 becomes high.

According to such a power source apparatus, since it is constructed so that the output characteristics of the DC voltage are improved by the output characteristic improvement circuit 190 provided inside each of the power source units 184, 185, 186, high stabilization of the output voltage of this power source apparatus can be achieved by improving the output characteristics of the DC voltage outputted as the whole module power source, namely the power source apparatus.

However, according to this general power source apparatus, in order to parallel connect and form plural power source units 184, 185, 186 and achieve high stabilization of the output voltage of the whole power source apparatus, there is a need to provide the output characteristic improvement circuit 190 inside each the power source unit, so that the number of parts every the power source unit increases and further power consumption increases by adding a circuit for reducing noise and upsizing must be performed for radiating the heat and also a factor of high cost occurs.

Thus, in the sixteenth embodiment, it is constructed so as to be able to achieve high stabilization of the output voltage of the whole power source apparatus while achieving cost reduction in the power source units and miniaturization of the size. The sixteenth embodiment of a power source apparatus according to the present invention is shown in FIGS. 38 and 39.

A power source apparatus shown in FIG. 38 comprises three first, second, third power source units 351, 352, 353 mounted to a DIN rail and connected in parallel, and an output characteristic improvement unit 350 comprising an output characteristic improvement circuit 354 which is connected to the power source unit of the output end side of a module power source, namely the third power source unit 353 and stabilizes an output voltage of the whole power source apparatus.

The first, second, third power source units 351, 352, 353 have AC input terminals 5A, 5B for inputting an AC from, for example, an external commercial AC power source 37, a power source circuit 9 for converting the AC inputted through the AC input terminals 5A, 5B into a stabilized DC voltage, DC output terminals 6A, 6B for outputting the DC voltage (output voltage) converted by this power source circuit 9, AC input bus lines (Vin+), (Vin−) for transmitting the AC inputted through the AC input terminals 5A, 5B to other power source units 351, 352, 353, DC output bus lines (Vo+), (Vo−) for transmitting the DC outputted through the power source circuit 9 to other power source units 351, 352, 353, and a current balance signal bus line (current balance bus: CB) for monitoring an output current of the power source circuit 9 of the power source units 351, 352, 353 connected and making this output current uniform.

Also, the first, second, third power source units 351, 352, 353 have AC input side connectors 18A, 18B for inputting an AC through the AC input bus lines, AC output side connectors 21A, 21B for outputting the AC through the AC input bus lines, DC input side connectors 19A, 19B for inputting a DC through the DC output bus lines, a current balance signal input side connector 20 for inputting an output current through the current balance signal bus line, DC output side connectors 22A, 22B for outputting the DC through the DC output bus lines, and a current balance signal output side connector 23 for outputting the output current through the current balance signal bus line.

The first, second, third power source units 351, 352, 353 connect the AC input bus lines electrically and mechanically through these AC input side connectors 18A, 18B and AC output side connectors 21A, 21B and also, connect the DC output bus lines electrically and mechanically through the DC input side connectors 19A, 19B and the DC output side connectors 22A, 22B and also, connect the current balance signal bus line electrically and mechanically through the current balance signal input side connector 20 and the current balance signal output side connector 23.

FIG. 39 is a block diagram showing a schematic configuration of the inside of the first, second, third power source units 351, 352, 353 and the output characteristic improvement unit 350.

The power source circuit 9 of the inside of the first, second, third power source units 351, 352, 353 shown in FIG. 39, which is a separately excited type power source circuit for inputting an AC through the AC input bus lines and converting this AC into a stabilized DC voltage, has an input voltage rectifying circuit 7 and an input smoothing capacitor 8A for obtaining a DC voltage by rectifying and smoothing an AC through the AC input bus lines, a switching element 13 for making conversion into a high-frequency pulse by switching this DC voltage, a control circuit 12 for performing constant-voltage control of an output voltage by controlling the switching of the switching element 13 to change a pulse width of the high-frequency pulse, a high-voltage transformer 10 for transforming the high-frequency pulse converted by the switching element 13, a rectifying circuit 11 and a smoothing circuit 8B for obtaining a DC voltage by rectifying and smoothing the high-frequency pulse transformed by this high-voltage transformer 10, and a parallel running control circuit 17 for controlling parallel running of each the power source unit.

The parallel running control circuit 17 is a circuit for monitoring the parallel running of each of the power source units 351, 352, 353 by monitoring an output current of each the power source unit and an output current of the own power source unit through the current balance signal bus line.

As shown in FIG. 38, the output characteristic improvement unit 350 has the output characteristic improvement circuit 354 for improving output characteristics of a DC voltage of an output stage of the power source apparatus, for example, output current accuracy at the time of static load variations, temperature variations and overcurrent protection, DC output terminals 355A, 355B for outputting a DC improved by this output characteristic improvement circuit 354, and DC input side connectors 356A, 356B for inputting a DC through the DC output bus lines of the third power source unit 353. Incidentally, a connection to a load 38 is made through the DC output terminals 355A, 355B of the output characteristic improvement unit 350.

As shown in FIG. 39, the output characteristic improvement circuit 354 has a step-up circuit 357 for supplying an output voltage of the power source apparatus from the third power source unit 353 of the output end side of the power source apparatus and stepping up this output voltage, and a series regulator circuit 358 for stabilizing the output voltage stepped up by this step-up circuit 357 and outputting this stabilized output voltage as the output voltage of the power source apparatus.

Next, an operation of the power source apparatus shown in the sixteenth embodiment will be described.

When the first power source unit 351 inputs an AC from the external commercial AC power source 37 through the AC input terminals 5A, 5B, the AC is supplied to the power source circuit 9 within each of the power source units 351, 352, 353 through the AC input bus lines.

When the power source circuit 9 inputs the AC through the AC input bus lines, a DC voltage is obtained by rectifying and smoothing the AC through the input voltage rectifying circuit 7 and the input smoothing capacitor 8A. Further, the switching element 13 makes conversion into a high-frequency pulse by switching this DC voltage, and supplies this converted high-frequency pulse to the high-voltage transformer 10. The high-voltage transformer 10 transforms this high-frequency pulse and thereby makes conversion into a DC voltage by rectifying and smoothing this high-frequency pulse through the rectifying circuit 11 and the smoothing circuit 8B of the secondary side and outputs this DC voltage to the DC output bus lines.

Further, the output characteristic improvement circuit 354 of the output characteristic improvement unit 350 supplies the DC voltage from the all the power source units 351, 352, 353 through the DC output bus lines. The step-up circuit 357 of the output characteristic improvement circuit 354 steps up the DC voltage from the all the power source units 351, 352, 353, and supplies this DC voltage stepped up to the series regulator circuit 358.

The series regulator circuit 358 improves an output characteristic of the DC voltage by highly stabilizing this DC voltage stepped up, and supplies the DC voltage in which this output characteristic is improved to the load 38 through the DC output terminals 355A, 355B as an output voltage of the power source apparatus.

According to the power source apparatus shown in the sixteenth embodiment, it is constructed so that the output characteristic improvement unit 350 comprising the output characteristic improvement circuit 354 for stabilizing an output voltage of the whole power source apparatus is connected to the third power source unit 353 of the output end side of the power source apparatus and, that is, the output voltage of the whole power source apparatus can be stabilized by one output characteristic improvement circuit without providing the output characteristic improvement circuits in the individual power source units 351, 352, 353, and also there is no need to provide the output characteristic improvement circuits in the individual power source units 351, 352, 353, so that cost reduction in the power source units 351, 352, 353 and miniaturization of the size can be achieved.

(Seventeenth Embodiment)

A seventeenth embodiment of a power source apparatus according to the present invention is shown in FIGS. 42 to 45.

According to the power source apparatus described in FIGS. 40 and 41, when an output voltage of a certain power source unit 184, 185, 186 becomes high for some cause at the time of parallel running, output voltages of each of the power source units 184, 185, 186 can be made substantially equal by adjusting the voltage adjusting volume 15A so that the output voltage of this power source unit 184, 185, 186 is matched with an output voltage of the power source unit 184, 185, 186 set to the lowest value.

However, according to the power source apparatus, when an output voltage of a certain power source unit 184, 185, 186 becomes high for some cause at the time of parallel running, by adjusting the voltage adjusting volume 15A, it is adjusted so that the output voltage of this power source unit 184, 185, 186 is matched with an output voltage of the power source unit 184, 185, 186 set to the lowest value, but the power source unit 184, 185, 186 of an output voltage value set to the lowest value is not known, so that the voltage adjusting volumes 15A of all the power source units 184, 185, 186 connected must be readjusted and the number of man-hours of the adjustment is taken.

Thus, in the seventeenth embodiment, an output voltage adjusting operation between the power source units at the time of parallel running is improved.

Figure 42:
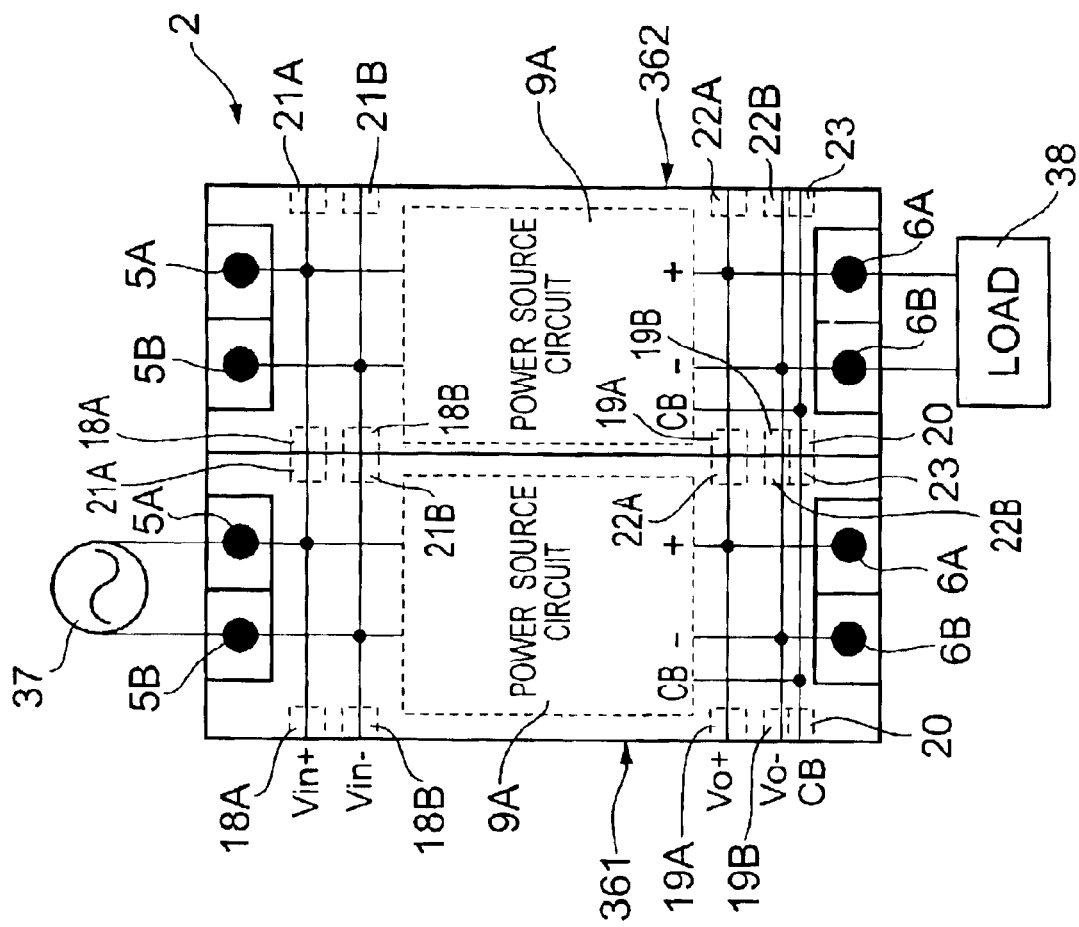
FIG. 42 is a configuration explanatory diagram of a power source apparatus (seventeenth embodiment) according to the present invention.

FIG. 42 is an explanatory diagram showing a schematic configuration of the inside of the power source apparatus shown in the seventeenth embodiment. Incidentally, while the same signs are attached to configurations overlapping with the power source apparatus shown in the sixteenth embodiment, the description of the configurations and operations will be omitted.

The power source apparatus shown in FIG. 42 is formed by parallel connecting two power source units (first, second power source units 361, 362) mounted on, for example, a DIN rail. Incidentally, an output voltage of the power source apparatus is supplied to a load 38 by connecting the load 38 to DC output terminals 6A, 6B.

Figure 43:
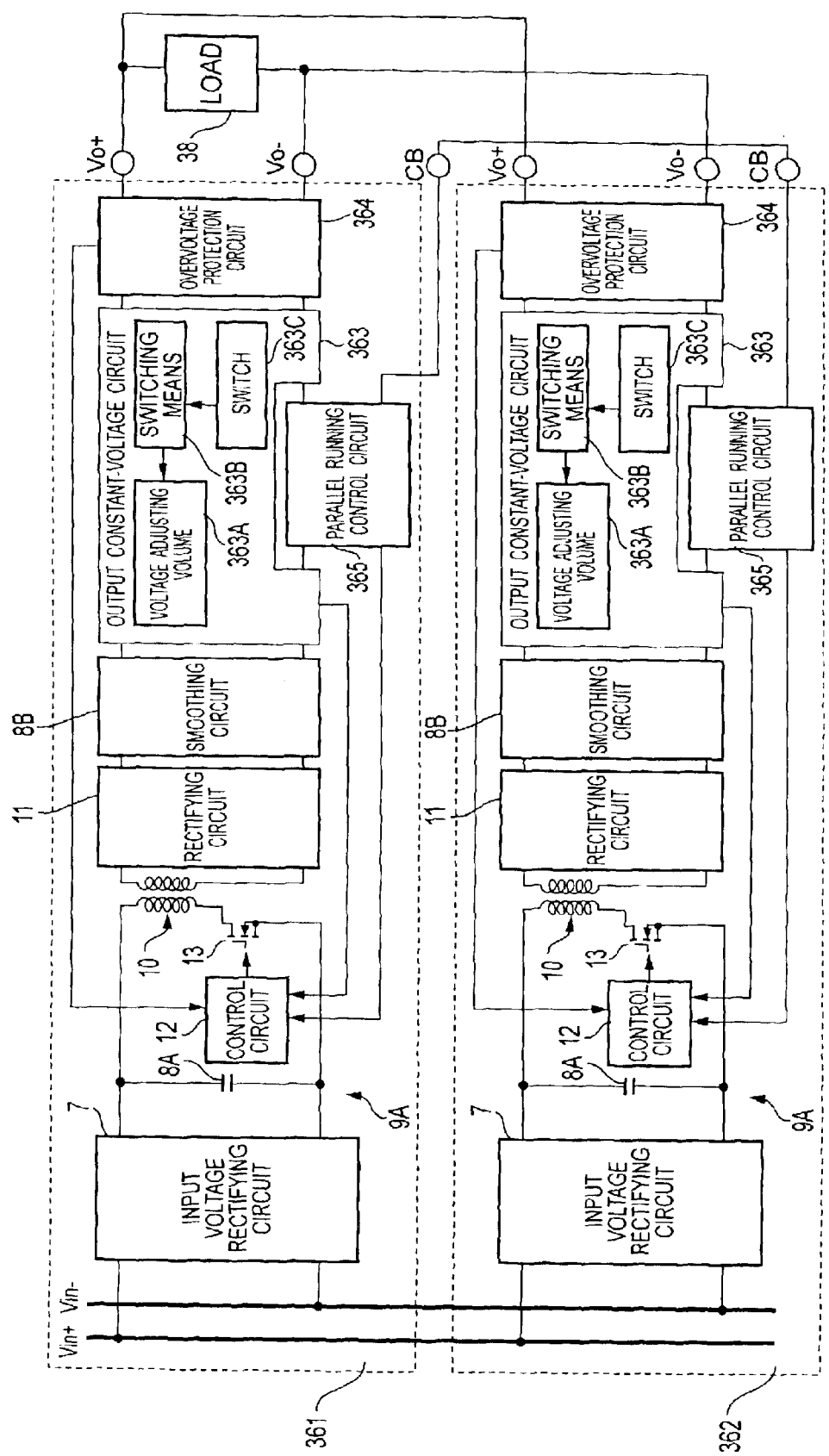
FIG. 43 is a configuration explanatory diagram of the inside of a power source unit within the power source apparatus.

FIG. 43 is a block diagram showing a schematic configuration of the inside of power source circuits 9A of the first and second power source units 361, 362.

In addition to an input voltage rectifying circuit 7, an input smoothing capacitor 8A, a switching element 13, a control circuit 12, a high-voltage transformer 10, and a rectifying circuit 11 and a smoothing circuit 8B of the secondary side, the power source circuit 9A shown in FIG. 43 has an output constant-voltage circuit 363 for stabilizing a DC voltage obtained by these rectifying circuit 11 and a smoothing circuit 8B of the secondary side, an overvoltage protection circuit 364 for preventing an overvoltage of the DC voltage stabilized by this output constant-voltage circuit 363, and a parallel running control circuit 365 for controlling parallel running of each of the power source units 361, 362.

The parallel running control circuit 365 is a circuit for monitoring and controlling the parallel running of each of the power source units 361, 362 by monitoring an output current of each of the power source units 361, 362 and an output current of the own power source units 361, 362 through a current balance signal bus line.

The output constant-voltage circuit 363 has a voltage adjusting volume (adjusting means) 363A for stabilizing the DC voltage obtained by the smoothing circuit 8B and adjusting an output voltage value of this DC voltage, switching means 363B for performing on-off control of an adjusting operation of this voltage adjusting volume 363A, and a switch 363C, and is a circuit for making an output current of each of the power source units 361, 362 uniform based on a monitor result of the parallel running control circuit 365.

The switching means 363B corresponds to a switch etc. for performing on-off control of an adjusting operation of the voltage adjusting volume 363A in response to a switching manipulation and, for example, when off control of the adjusting operation of the voltage adjusting volume 363A is performed in response to the switching manipulation of the switching means 363B, the adjusting operation of the voltage adjusting volume 363A becomes fixed and when on control of the adjusting operation of the voltage adjusting volume 363A is performed, the adjusting operation of the voltage adjusting volume 363A can be performed.

Figure 45:
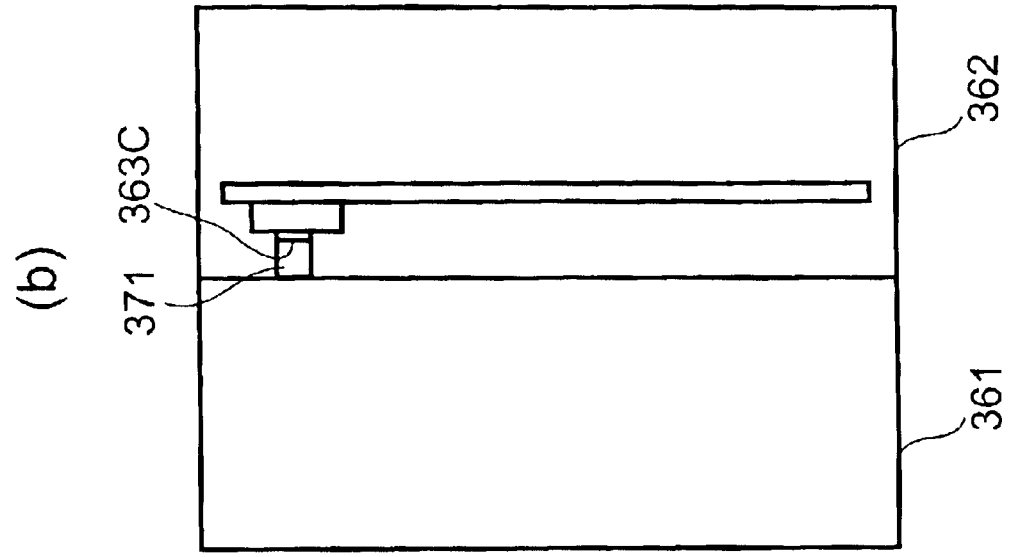
FIG. 45 is an explanatory diagram frankly showing a state of connection between the mutual power source units.
Figure 45:
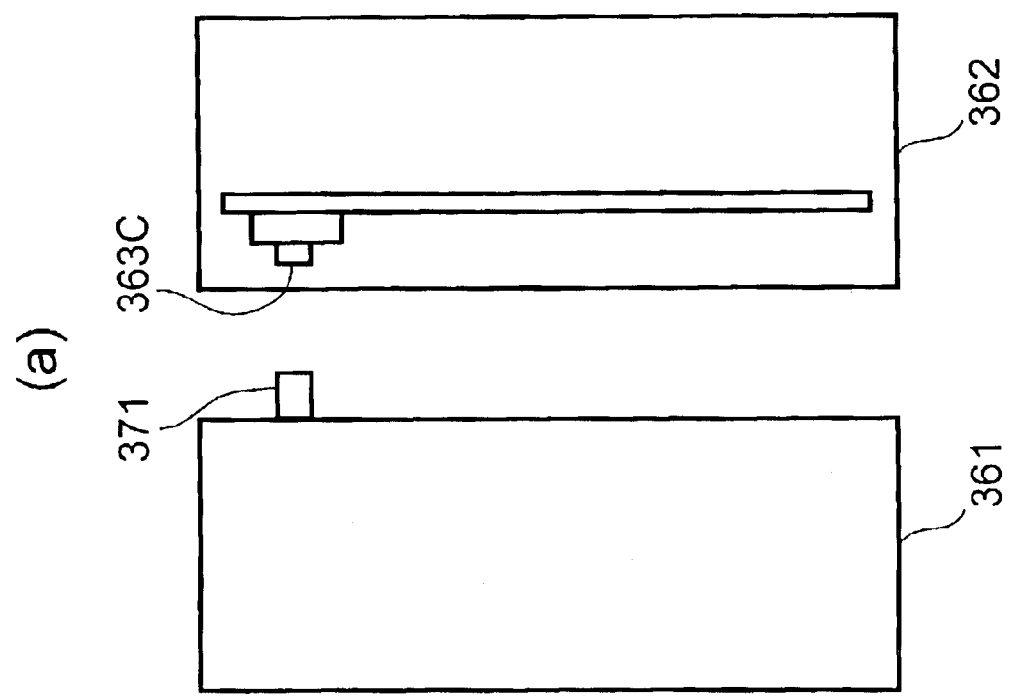
Figure 46:
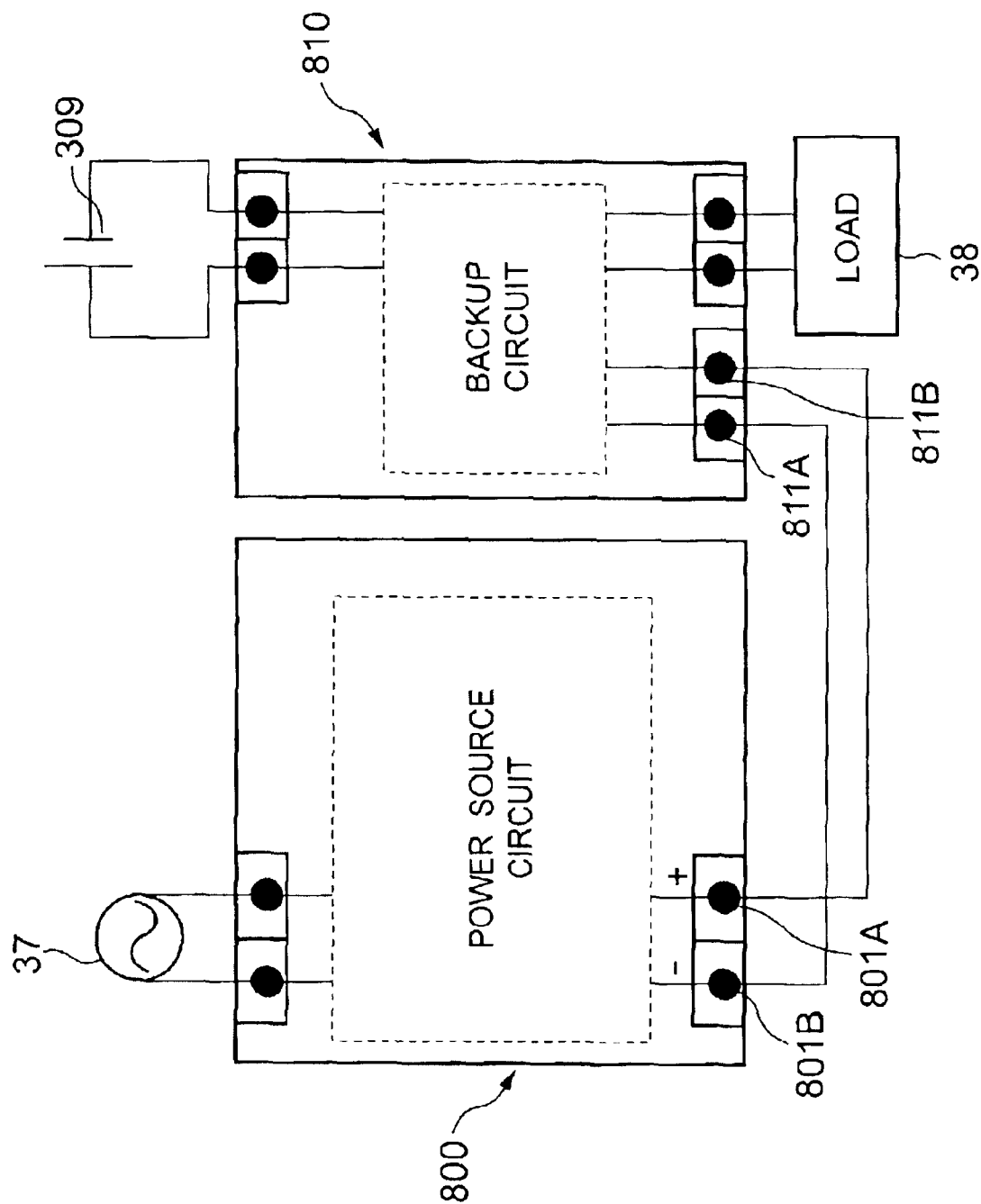
FIG. 46 is a configuration explanatory diagram of a conventional power source apparatus.

As shown in FIG. 45, this switch 363C has a configuration in which the switch 363C performs a switching operation by a protrusion 371 placed on a connection surface of one power source unit 361 when the power source units 361, 362 connect mutually, and when this switch 363C performs the switching operation, the switching means 363B is switched so that the adjusting operation of the voltage adjusting volume 363A becomes the off control.

The overvoltage protection circuit 364 is a circuit constructed so that an overvoltage value associated with an output voltage from the output constant-voltage circuit 363 is set and when the present output voltage value exceeds the overvoltage value, the present output voltage is stopped and controlled.

The control circuit 12 sets a reference adjustment value with reference to an output voltage value associated with the power source units 361, 362 in which an adjusting operation of the voltage adjusting volume 363A is in an on control state by the switching means 363B out of the power source units 361, 362 inside the power source apparatus while the adjusting operation of the voltage adjusting volume 363A is in an off control state by the switching means 363B, and adjusts an output voltage from the power source circuit 9A based on this reference adjustment value.

Figure 44:
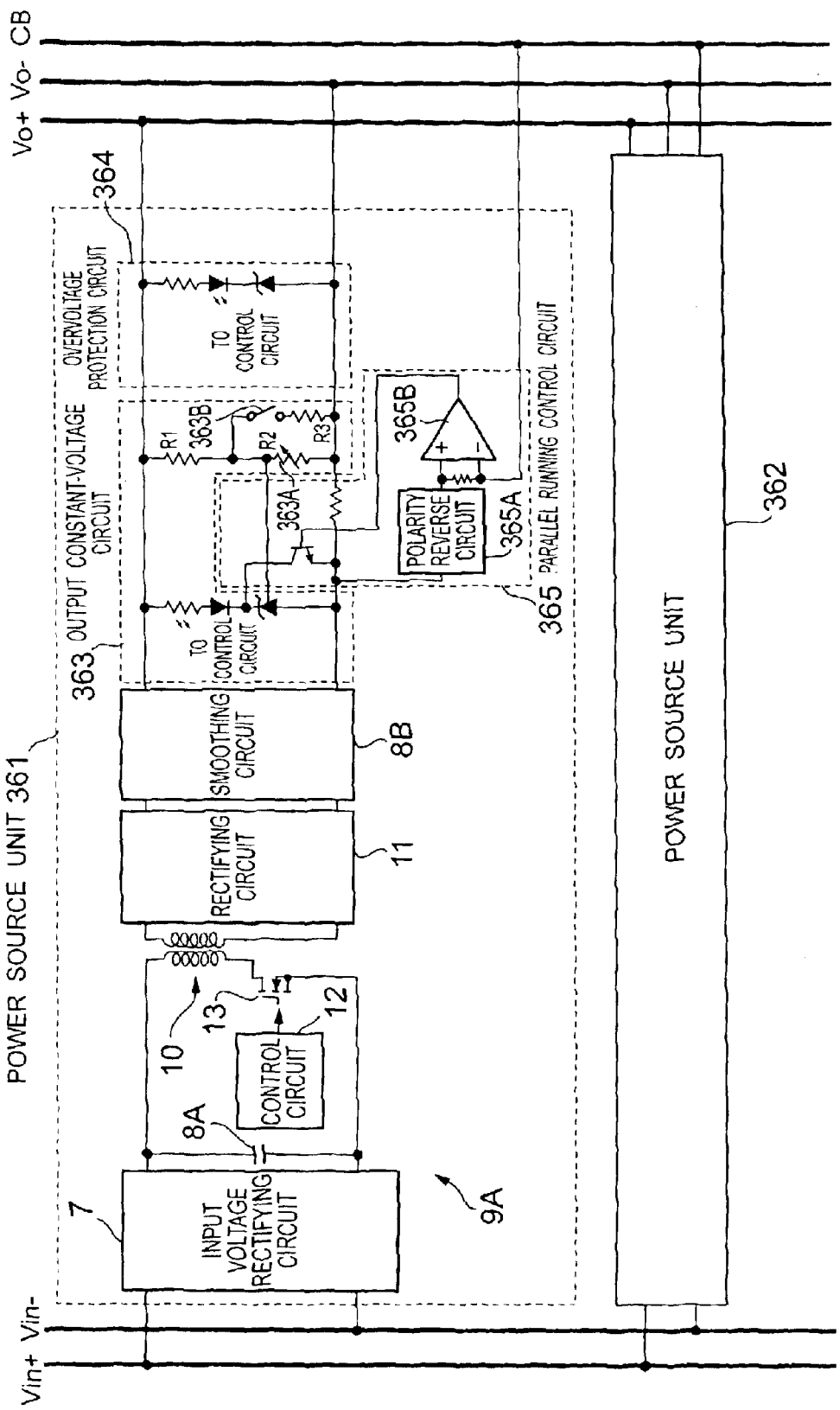
FIG. 44 is a configuration explanatory diagram of the inside of an output constant-voltage circuit, an overvoltage protection circuit and a parallel running control circuit which are main parts of the power source unit.

FIG. 44 is an explanatory diagram showing a circuit configuration of the inside of the power source circuit 9A.

The voltage adjusting volume 363A and the switching means 363B which are a main portion of the output constant-voltage circuit 363 shown in FIG. 44 are formed by connecting a series circuit of a resistor R3 and a switch SW1 which is the switching means 363B in parallel with a resistor R2 which is the voltage adjusting volume 363A. When the switch SW1 (switching means 363B) is turned on, a combined resistance value reduces by the resistor R2 and the resistor R3, so that the output voltage increases.

The parallel running control circuit 365 shown in FIG. 44 is constructed so as to compare an output current detected through a current balance signal bus line and an output current of a power source circuit 50 in which the polarity is reversed by a polarity reverse circuit 365A and perform the monitoring and control based on this comparison result so that the output currents of each of the power source units 361, 362 become uniform.

Next, an operation of the power source apparatus shown in the seventeenth embodiment will be described.

For example, in the case that the first power source unit 361 is main and the second power source unit 362 is slave, the switching means 363B of the first power source unit 361 sets the adjusting operation of the voltage adjusting volume 363A to on control, and the switching means 363B of the power source unit 362 sets the adjusting operation of the voltage adjusting volume 363A to off control. That is, only the voltage adjusting volume 363A of the first power source unit 361 becomes a state capable of adjustment.

When the switching means 363B of the first power source unit 361 sets the adjusting operation of the voltage adjusting volume 363A to on control, the switch SW1 which is this switching means 363B is turned on and thereby a combined resistance value of the resistor R2 and the resistor R3 reduces, so that the output voltage increases.

When the switching means 363B of the second power source unit 362 sets the adjusting operation of the voltage adjusting volume 363A to off control, the switch SW1 which is this switching means 363B is turned off and thereby parallel running control is performed so as to match with an output voltage of the main first power source unit 361 in which an output voltage setting value is lowest.

That is, the output voltage of the whole power source apparatus can be adjusted by merely adjusting the voltage adjusting volume 363A of the first power source unit 361.

Further, when it is assumed that an output voltage in the case that the switching means 363B (switch SW1) of the first power source unit 361 is in an off state is Vo1 and an output voltage in the case that the switching means 363B (switch SW2) of the power source unit 362 is in an on state is Vo2 and an overvoltage value of the overvoltage protection circuit 364 is Vo3 as shown in FIG. 44, it is set to Vo1<Vo3<Vo2. By being set in this manner, in case that the main first power source unit 361 fails for some cause, the power source itself is stopped safely by an overvoltage protection operation through the second power source unit 362 even when the other second power source unit 362 attempts to return to a relatively high voltage set originally.

According to the seventeenth embodiment, it is constructed so that a reference adjustment value is set with reference to an output voltage value associated with the power source unit 361 in which an adjusting operation of the voltage adjusting volume 363A is in an on control state by the switching means 363B out of the power source units inside the power source apparatus while off control of the adjusting operation of the voltage adjusting volume 363A is performed and an output voltage from the power source circuit 9A is adjusted based on this reference adjustment value, that is, it is constructed so that the output voltage from the power source circuit 9A is adjusted in the side of the individual power source units 361, 362 based on the reference adjustment value, so that, for example, an output voltage adjusting operation between the power source units 361, 362 at the time of parallel running suffices by merely performing an adjusting operation of the voltage adjusting volume 363A of the first power source unit 361 in the on control state, and the output voltage adjusting operation of the plural power source units 361, 362 can be performed by a single output voltage adjusting operation.

Also, according to the seventeenth embodiment, it is constructed so that a reference adjustment value is set to the lowest output voltage value of output voltage values set to the power source units and an output voltage from the power source circuit 9A is adjusted based on this lowest output voltage value, that is, it is constructed so that the output voltage from the power source circuit 9A is adjusted in the side of the individual power source units 361, 362 based on the lowest output voltage value of the output voltage values of all the power source units 361, 362, so that, for example, an output voltage adjusting operation between the power source units at the time of parallel running is improved.

According to the seventeenth embodiment, it is constructed so that a reference adjustment value is detected based on the monitor result of the parallel running control circuit 365 of each of the power source units 361, 362, so that the output voltage value can be adjusted by the power source units 361, 362 themselves in which off control of an adjusting operation of the voltage adjusting volume 363A is performed based on this reference adjustment value.

According to the seventeenth embodiment, it is constructed so that an output voltage of the power source unit 361 is stopped and controlled when an output voltage value of the power source unit 361 exceeds an overvoltage value, so that a device acting as a load of the power source apparatus can be protected by an operation of overvoltage protection when an overvoltage is applied to the power source unit 361.

Also, according to the seventeenth embodiment, since the switch 363C performs a switching operation when the power source units 361, 362 connect mutually, it is constructed so that an adjusting operation of the voltage adjusting volume 363A inside the individual power source units 361, 362 becomes the off control automatically and further on control of the adjusting operation of the voltage adjusting volume 363A is performed in response to a switching manipulation of the switching means 363B, so that the switching operation of the switching means 363B associated with the individual power source units 361, 362 is improved.

Incidentally, in the above seventeenth embodiment, it is constructed so that a reference adjustment value is set with reference to an output voltage value associated with the power source unit 361 inside the power source apparatus while off control of the adjusting operation of the voltage adjusting volume 363A is performed by the switching means 363B out of the power source units 361, 362 inside the power source apparatus and an output voltage from the power source circuit 9A is adjusted based on this reference adjustment value, but it may be constructed so that the reference adjustment value is set to an average value of output voltage values of the power source units 361, 362 of the whole power source apparatus and the output voltage from the power source circuit 9A is adjusted based on this average value.

That is, it is constructed so that the output voltage from the power source circuit 9A is adjusted in the side of the individual power source units based on the average value of the output voltage values of all the power source units 361, 362, so that, for example, an output voltage adjusting operation between the power source units at the time of parallel running is improved.

Also, it may be constructed so that a reference adjustment value is set to the highest output voltage value of output voltage values set to each of the power source units 361, 362 and the output voltage value from the power source circuit is adjusted based on this highest output voltage value. That is, it is constructed so that the output voltage value from the power source circuit 9A is adjusted in the side of the individual power source units 361, 362 based on the highest output voltage value of the output voltage values of all the power source units 361, 362, so that, for example, an output voltage adjusting operation between the power source units 361, 362 at the time of parallel running is improved.

Also, in the above seventeenth embodiment, the power source apparatus formed by connecting two power source units 361, 362 has been described, but it goes without saying that the output voltage adjusting operation can be improved more in the case of connecting three or more power source units 361, 362.

Industrial Applicability

As described above, a power source apparatus of the present invention is useful as a switching power source apparatus in which there is provided a module power source formed by connecting at least one or more power source units and a desired power source capacity can be obtained by changing the number of connections of the power source units and an additional function unit having a predetermined function can be added to this module power source in order to add the predetermined function.

What is claimed is:

1. A power source apparatus comprising:
   a module power source formed by connecting one or more power source units having bus lines, wherein the module power source is constructed so that a connector connection means is provided in the power source units and in an additional function unit for adding a predetermined additional function to the module power source for connecting the units, and so that the additional function unit is electrically connected to the module power source by the connector connection means.

2. A power source apparatus as defined in claim 1, wherein the bus lines are at least one of an AC input bus line for supplying an AC inputted from the outside to a power source circuit of the power source unit, a DC output bus line for outputting a DC converted by the power source circuit, a first signal bus line used in a control means for making output currents of plural power source units uniform, and a second signal bus line used for detecting a state of each the power source unit.

3. A power source apparatus as defined in claim 1, wherein the additional function unit has an interface with the outside.

4. A power source apparatus as defined in claim 2, wherein the additional function unit has a function of inputting an external AC to make a predetermined conversion, and is constructed so as to supply the AC in which the predetermined conversion is made to the power source units using the AC input bus line.

5. A power source apparatus as defined in claim 4, wherein the additional function unit is a rush current prevention unit having a rush current prevention function of preventing a rush current of an external commercial AC power source.

6. A power source apparatus as defined in claim 2, wherein the additional function unit has a function of making a predetermined conversion to a DC inputted, and is constructed so as to input the DC using the DC output bus line of the power source units and supply the DC in which the predetermined conversion is made to a load.

7. A power source apparatus as defined in claim 1, wherein the additional function unit is an output abnormal detection unit having means for producing a signal output or a display output of the result in the case of detecting that at least any one of plural DC outputs are abnormal.

8. A power source apparatus as defined in claim 1, wherein the additional function unit is a branching unit having a terminal for branching a DC output of the module power source into plural portions to connect a load, a function of disconnecting a supply line of the module power source when an output current flowing through this terminal is detected and also this detected current reaches a setting value, a function of disconnecting the supply line of the module power source when an overvoltage from the module power source is detected, a function of reporting an abnormal state of current or voltage, and a reset function capable of releasing disconnection of the supply line.

9. A power source apparatus as defined in claim 2, wherein the additional function unit has a function of making a predetermined conversion to an AC inputted, and inputs an AC using the AC input bus line of one power source unit and also makes a predetermined conversion to this AC and inputs the AC in which this predetermined conversion is made to the AC input bus line of the other power source unit.

10. A power source apparatus as defined in claim 9, wherein the additional function unit is a separator having a function of making only a connection between the AC input bus line of one power source unit and the AC input bus line of the other power source unit.

11. A power source apparatus as defined in claim 2, wherein the additional function unit has a function of making a predetermined conversion to a DC inputted, and inputs a DC using the DC output bus line of one power source unit and also makes a predetermined conversion to this DC and inputs the DC in which this predetermined conversion is made to the DC output bus line of the other power source unit.

12. A power source apparatus as defined in claim 11, wherein the additional function unit is a series connection unit having a series connection function of connecting a minus side line of the DC output bus line of one power source unit to a plus side line of the DC output bus line of the other power source unit.

13. A power source apparatus as defined in claim 1, wherein the additional function unit is an uninterruptible power supply unit having a DC bus line for making connection to the connector connection means and backup means for backing up the power source units of the module power source through this DC bus line.

14. A power source apparatus as defined in claim 13, wherein the backup means has DC supply means for supplying a DC inputted to the DC bus line to a load, charging means for making step-up and step-down conversions of the DC to charge a battery, and discharging means for supplying the DC from the battery to the load at the time of a power failure and a peak load.

15. A power source apparatus as defined in claim 13, wherein the backup means has DC supply means for supplying a DC inputted to the DC bus line to a load, charging means for making step-up and step-down conversions of the DC to charge a battery, DC power source supplement means for accumulating the DC in a capacitor as electrical energy, and discharging means for emitting the electrical energy from the capacitor and supplementing a DC from the battery and supplying the DC to the load at the time of a power failure.

16. A power source apparatus as defined in claim 13, wherein the backup means has DC supply means for supplying the DC inputted to the DC bus line to a load, charging means for making step-up and step-down conversions of the DC to charge a battery, and discharging means for making a step-down conversion of a DC from the battery and supplying the DC in which this step-down conversion is made to the load through the DC output bus line of the power source units at the time of a power failure and a peak load.

17. A power source apparatus as defined in claim 1, wherein the additional function unit is an output characteristic improvement unit comprising an output characteristic improvement circuit for stabilizing an output voltage of the module power source.

18. A power source apparatus as defined in claim 17, wherein the output characteristic improvement circuit has a step-up circuit for supplying an output voltage of the module power source from the power source unit of the output end side of the module power source and stepping up this output voltage, and a series regulator circuit for stabilizing the output voltage stepped up by this step-up circuit and outputting this stabilized output voltage as the output voltage of the module power source.

19. A power source apparatus as defined in claim 18, wherein the step-up circuit supplies an output voltage of the module power source through the DC output bus line of the power source unit of the output end side of the module power source.

20. The power source apparatus according to claim 1 wherein each power source unit has:
a power source circuit;
adjusting means for adjusting an output voltage from the power source circuit;
switching means for performing on-off control of an adjusting operation of the adjusting means; and
control means for setting a reference adjustment value with reference to an output voltage value associated with the power source unit in which the adjusting operation of the adjusting means is in an on control state by the switching means out of the power source units inside the module power source while off control of the adjusting operation of the adjusting means is performed by the switching means and adjusting the output voltage from the power source circuit based on this reference adjustment value.

21. A power source apparatus as defined in claim 20, wherein the reference adjustment value is set to an average value of output voltage values set to each power source unit inside the module power source.

22. A power source apparatus as defined in claim 20, wherein the reference adjustment value is set to the lowest output voltage value of output voltage values set to each power source unit inside the module power source.

23. A power source apparatus as defined in claim 20, wherein the reference adjustment value is set to the highest output voltage value of output voltage values set to each power source unit inside the module power source.

24. A power source apparatus as defined in claim 20, wherein each power source unit has output current balance monitoring means for monitoring an output current from other power source units, and reference adjustment value detection means for detecting the reference adjustment value based on a monitor result from this output current balance monitoring means.

25. A power source apparatus as defined in claim 20, wherein each power source unit has overvoltage protection means for setting an overvoltage value associated with an output voltage from the power source circuit and stopping and controlling the present output voltage when the present output voltage value exceeds the overvoltage value.

26. A power source apparatus as defined in claim 24, wherein each power source unit has overvoltage protection means for setting an overvoltage value associated with an output voltage from the power source circuit and stopping and controlling the present output voltage when the present output voltage value exceeds the overvoltage value.

27. A power source apparatus as defined in claim 20, wherein each power source unit has a switch for performing off control of an adjusting operation of the adjusting means by the switching means inside the power source unit connected when a normal connection between the power source units is made, and on control of the adjusting operation of the adjusting means is performed by the switching means in response to a switching manipulation of the switching means.

28. A power source apparatus as defined in claim 24, wherein each power source unit has a switch for performing off control of an adjusting operation of the adjusting means by the switching means inside the power source unit connected when a normal connection between the power source units is made, and on control of the adjusting operation of the adjusting means is performed by the switching means in response to a switching manipulation of the switching means.

29. A power source apparatus as defined in claim 27, wherein each power source unit has a switch for performing off control of an adjusting operation of the adjusting means by the switching means inside the power source unit connected when a normal connection between the power source units is made, and on control of the adjusting operation of the adjusting means is performed by the switching means in response to a switching manipulation of the switching means.

30. A power source apparatus as defined in claim 2, wherein the additional function unit has an interface with the outside.

31. A power source apparatus as defined in claim 3, wherein the additional function unit has a function of inputting an external AC to make a predetermined conversion, and is constructed so as to supply the AC in which the predetermined conversion is made to the power source units using the AC input bus line.

32. A power source apparatus as defined in claim 30, wherein the additional function unit has a function of inputting an external AC to make a predetermined conversion, and is constructed so as to supply the AC in which the predetermined conversion is made to the power source units using the AC input bus line.

33. A power source apparatus as defined in claim 3, wherein the additional function unit has a function of making a predetermined conversion to a DC inputted, and is constructed so as to input the DC using the DC output bus line of the power source units and supply the DC in which the predetermined conversion is made to a load.

34. A power source apparatus as defined in claim 2, wherein the additional function unit is an output abnormal detection unit having means for producing a signal output or a display output of the result in the case of detecting that at least any one of plural DC outputs are abnormal.

35. A power source apparatus as defined in claim 3, wherein the additional function unit is an output abnormal detection unit having means for producing a signal output or a display output of the result in the case of detecting that at least any one of plural DC outputs are abnormal.

36. A power source apparatus as defined in claim 2, wherein the additional function unit is a branching unit having a terminal for branching a DC output of the module power source into plural portions to connect a load, a function of disconnecting a supply line of the module power source when an output current flowing through this terminal is detected and also this detected current reaches a setting value, a function of disconnecting the supply line of the module power source when an overvoltage from the module power source is detected, a function of reporting an abnormal state of current or voltage, and a reset function capable of releasing disconnection of the supply line.

37. A power source apparatus as defined in claim 3, wherein the additional function unit is a branching unit having a terminal for branching a DC output of the module power source into plural portions to connect a load, a function of disconnecting a supply line of the module power source when an output current flowing through this terminal is detected and also this detected current reaches a setting value, a function of disconnecting the supply line of the module power source when an overvoltage from the module power source is detected, a function of reporting an abnormal state of current or voltage, and a reset function capable of releasing disconnection of the supply line.

38. A power source apparatus as defined in claim 3, wherein the additional function unit has a function of making a predetermined conversion to an AC inputted, and inputs an AC using the AC input bus line of one power source unit and also makes a predetermined conversion to this AC and inputs the AC in which this predetermined conversion is made to the AC input bus line of the other power source unit.

39. A power source apparatus as defined in claim 3, wherein the additional function unit has a function of making a predetermined conversion to a DC inputted, and inputs a DC using the DC output bus line of one power source unit and also makes a predetermined conversion to this DC and inputs the DC in which this predetermined conversion is made to the DC output bus line of the other power source unit.

40. A power source apparatus as defined in claim 2, wherein the additional function unit is an uninterruptible power supply unit having a DC bus line for making connection to the connector connection means and backup means for backing up the power source units of the module power source through this DC bus line.

41. A power source apparatus as defined in claim 3, wherein the additional function unit is an uninterruptible power supply unit having a DC bus line for making connection to the connector connection means and backup means for backing up the power source units of the module power source through this DC bus line.

42. A power source apparatus as defined in claim 2, wherein the additional function unit is an output characteristic improvement unit comprising an output characteristic improvement circuit for stabilizing an output voltage of the module power source.

43. A power source apparatus as defined in claim 3, wherein the additional function unit is an output characteristic improvement unit comprising an output characteristic improvement circuit for stabilizing an output voltage of the module power source.

44. A power source apparatus as defined in claim 21, wherein each power source unit has output current balance monitoring means for monitoring an output current from other power source units, and reference adjustment value detection means for detecting the reference adjustment value based on a monitor result from this output current balance monitoring means.

45. A power source apparatus as defined in claim 22, wherein each power source unit has output current balance monitoring means for monitoring an output current from other power source units, and reference adjustment value detection means for detecting the reference adjustment value based on a monitor result from this output current balance monitoring means.

46. A power source apparatus as defined in claim 23, wherein each power source unit has output current balance monitoring means for monitoring an output current from other power source units, and reference adjustment value detection means for detecting the reference adjustment value based on a monitor result from this output current balance monitoring means.

47. A power source apparatus as defined in claim 21, wherein each power source unit has overvoltage protection means for setting an overvoltage value associated with an output voltage from the power source circuit and stopping and controlling the present output voltage when the present output voltage value exceeds the overvoltage value.

48. A power source apparatus as defined in claim 22, wherein each power source unit has overvoltage protection means for setting an overvoltage value associated with an output voltage from the power source circuit and stopping and controlling the present output voltage when the present output voltage value exceeds the overvoltage value.

49. A power source apparatus as defined in claim 21, wherein each power source unit has a switch for performing off control of an adjusting operation of the adjusting means by the switching means inside the power source unit connected when a normal connection between the power source units is made, and on control of the adjusting operation of the adjusting means is performed by the switching means in response to a switching manipulation of the switching means.

50. A power source apparatus as defined in claim 22, wherein each power source unit has a switch for performing off control of an adjusting operation of the adjusting means by the switching means inside the power source unit connected when a normal connection between the power source units is made, and on control of the adjusting operation of the adjusting means is performed by the switching means in response to a switching manipulation of the switching means.

51. A power source apparatus as defined in claim 23, wherein each power source unit has a switch for performing off control of an adjusting operation of the adjusting means by the switching means inside the power source unit connected when a normal connection between the power source units is made, and on control of the adjusting operation of the adjusting means is performed by the switching means in response to a switching manipulation of the switching means.

52. A power source apparatus as defined in claim 26, wherein each power source unit has a switch for performing off control of an adjusting operation of the adjusting means by the switching means inside the power source unit connected when a normal connection between the power source units is made, and on control of the adjusting operation of the adjusting means is performed by the switching means in response to a switching manipulation of the switching means.

* * * * *